US011539817B1

(12) United States Patent
Perez

(10) Patent No.: US 11,539,817 B1
(45) Date of Patent: Dec. 27, 2022

(54) ADAPTIVE AUTHENTICATION AND NOTIFICATION SYSTEM

(71) Applicant: C/HCA, Inc., Nashville, TN (US)

(72) Inventor: Gabriel O. Perez, Nashville, TN (US)

(73) Assignee: C/HCA, Inc., Nashville, TN (US)

( * ) Notice: Subject to any disclaimer, the term of this patent is extended or adjusted under 35 U.S.C. 154(b) by 95 days.

(21) Appl. No.: 16/586,376

(22) Filed: Sep. 27, 2019

Related U.S. Application Data

(60) Provisional application No. 62/737,482, filed on Sep. 27, 2018.

(51) Int. Cl.

| | |
|---|---|
| *H04L 69/00* | (2022.01) |
| *H04L 9/40* | (2022.01) |
| *H04L 41/0803* | (2022.01) |
| *H04L 41/12* | (2022.01) |
| *H04L 51/56* | (2022.01) |
| H04L 67/01 | (2022.01) |

(52) U.S. Cl.
CPC .......... *H04L 69/03* (2013.01); *H04L 41/0803* (2013.01); *H04L 41/12* (2013.01); *H04L 51/56* (2022.05); *H04L 63/08* (2013.01); *H04L 67/01* (2022.05)

(58) Field of Classification Search
CPC .......... H04L 69/03; H04L 51/56; H04L 67/01
See application file for complete search history.

(56) References Cited

U.S. PATENT DOCUMENTS

| | | | |
|---|---|---|---|
| 5,735,285 | A | 4/1998 | Albert et al. |
| 6,385,589 | B1 | 5/2002 | Trusheim et al. |
| 6,952,181 | B2 | 10/2005 | Karr et al. |
| 7,644,168 | B2 | 1/2010 | Grieff et al. |
| 7,742,762 | B1 | 6/2010 | Biere et al. |
| 7,853,241 | B1 | 12/2010 | Harrison |
| 8,005,692 | B2 | 8/2011 | Karkanias et al. |
| 8,954,472 | B1 | 2/2015 | Chapman et al. |

(Continued)

OTHER PUBLICATIONS

Non-Final Office Action dated Jul. 3, 2017, for U.S. Appl. No. 15/476,243, all pgs.

(Continued)

*Primary Examiner* — Abdulkader M Alriyashi
(74) *Attorney, Agent, or Firm* — Kilpatrick Townsend & Stockton LLP

(57) ABSTRACT

Systems, methods, and machine-readable media for processing data transmissions from a plurality of client devices to create composites for transmission to destination addresses are provided. Communications via a network may be received from a set of devices. Each communication may include a digital identifier corresponding to a destination specification. The communication may be processed to identify the digital identifier and to identify the destination specification. A data portion may be selected from the communication and cached. A second format may be identified as corresponding to a second communication medium, where the second format is different from a first format of the communication. A composite may be created according to the second format. The composite may include the selected data portion and the destination specification. The composite formatted according to the second format may be transmitted toward an endpoint device in accordance with the destination specification.

20 Claims, 17 Drawing Sheets

(56) References Cited

U.S. PATENT DOCUMENTS

| | | | |
|---|---|---|---|
| 9,203,814 | B2 | 12/2015 | Perez et al. |
| 9,906,532 | B2 | 2/2018 | Perez et al. |
| 9,973,455 | B1 | 5/2018 | Fowler et al. |
| 10,505,935 | B1 | 12/2019 | Perez et al. |
| 10,542,004 | B1 | 1/2020 | Perez et al. |
| 2002/0016719 | A1 | 2/2002 | Nemeth et al. |
| 2002/0065685 | A1 | 5/2002 | Sasaki et al. |
| 2003/0215092 | A1 | 11/2003 | Dick |
| 2004/0249674 | A1 | 12/2004 | Eisenberg et al. |
| 2005/0063365 | A1 | 3/2005 | Boban |
| 2005/0076110 | A1 | 4/2005 | Mathew et al. |
| 2005/0151640 | A1 | 7/2005 | Hastings |
| 2007/0067185 | A1 | 3/2007 | Halsted |
| 2008/0294507 | A1 | 11/2008 | Reiner |
| 2009/0037224 | A1 | 2/2009 | Raduchel |
| 2009/0113560 | A1 | 4/2009 | Kori et al. |
| 2009/0274286 | A1* | 11/2009 | O'Shaughnessy ............ H04M 3/42365 379/201.12 |
| 2010/0169424 | A1* | 7/2010 | Gustafsson ............ H04L 51/14 709/206 |
| 2011/0129131 | A1 | 6/2011 | Avinash et al. |
| 2012/0089481 | A1 | 4/2012 | Iozzia et al. |
| 2012/0124146 | A1* | 5/2012 | Hsiao ............ H04L 51/36 709/206 |
| 2012/0165620 | A1 | 6/2012 | Tanis et al. |
| 2012/0180122 | A1 | 7/2012 | Yan et al. |
| 2012/0182924 | A1 | 7/2012 | Gaines et al. |
| 2012/0215560 | A1 | 8/2012 | Ofek et al. |
| 2013/0173305 | A1 | 7/2013 | Hyde et al. |
| 2013/0218599 | A1 | 8/2013 | Highley |
| 2014/0022080 | A1 | 1/2014 | Mayoras, Jr. |
| 2014/0067427 | A1 | 3/2014 | Demopulas |
| 2014/0074509 | A1 | 3/2014 | Ararasingham et al. |
| 2014/0081667 | A1 | 3/2014 | Joao |
| 2014/0180711 | A1 | 6/2014 | Kamen et al. |
| 2015/0149560 | A1* | 5/2015 | Lee ............ H04L 51/066 709/206 |
| 2015/0244687 | A1 | 8/2015 | Perez et al. |
| 2016/0027289 | A1* | 1/2016 | Hargis ............ G16H 80/00 340/286.07 |

OTHER PUBLICATIONS

Notice of Allowance dated Dec. 28, 2017, for U.S. Appl. No. 15/476,243, all pgs.

Non-Final Office Action dated Apr. 30, 2015, for U.S. Appl. No. 14/630,393, 13 pages.

Non-Final Office Action dated Jun. 28, 2017, for U.S. Appl. No. 14/954,249, 36 pages.

Notice of Allowance dated Oct. 20, 2017, for U.S. Appl. No. 14/954,249, 15 pages.

Notice of Allowance dated Jul. 29, 2015, for U.S. Appl. No. 14/630,393, all pages.

First Action Interview Pilot Program Pre-Interview Communication dated Jan. 11, 2019, for U.S. Appl. No. 15/896,788, 8 pgs.

First Action Interview Office Action Summary dated Feb. 11, 2019, for U.S. Appl. No. 15/896,788, 6 pgs.

Notice of Allowance dated Jul. 17, 2019, for U.S. Appl. No. 15/896,788, all pgs.

Notice of Allowance dated Sep. 5, 2019, for U.S. Appl. No. 15/980,575, all pgs.

* cited by examiner

ADAPTIVE AUTHENTICATION AND NOTIFICATION SYSTEM

CROSS-REFERENCE TO RELATED APPLICATION

This application claims the benefit of and priority to U.S. Provisional Application No. 62/737,482, filed Sep. 27, 2018, which is hereby incorporated by reference in its entirety for all purposes.

TECHNICAL FIELD

This specification relates in general to notification systems and, but not by way of limitation, to message listening and adaptive authentication and notification creation and routing.

BACKGROUND

Providing effective notifications under changing conditions of transmitters, receivers, and the devices, applications, and systems therebetween, while maintaining protection of sensitive information, may prove difficult using conventional systems. Generating effective notifications while protecting sensitive information may promote overall resource access and process performance. Therefore, there is a need in the art for improvements that address the limitations and technical challenges that have limited conventional systems. This and others needs are addressed by the present disclosure.

BRIEF SUMMARY

Certain embodiments of the present disclosure relate generally to notification systems and, in particular but not by way of limitation, to message listening and adaptive authentication and notification creation and routing.

In one aspect, a server system to process data transmissions from a plurality of client devices to create composites for transmission to destination addresses is disclosed. The server system may include one or a combination of one or more network interfaces, memory configured to store computer-executable instructions, and one or more processing devices in communication with the one or more network interfaces and the memory. The one or more processing devices may be configured to execute the computer-executable instructions to perform operations including one or a combination of the following. A first set of one or more communications may be received via a network from a first set of one or more devices. The first set of one or more communications may include a digital identifier corresponding to a destination specification. The first set of one or more devices may correspond to one or more client devices communicatively couplable to the server system. For each communication of the first set of one or more communications, one or a combination of the following may be performed. The communication may be processed to identify the digital identifier. The communication may be processed to identify the destination specification based at least in part on the digital identifier. A data portion may be selected from the communication and cached. A second format may be identified as corresponding to a second communication medium, where the second format is different from a first format of the communication. A composite may be created according to the second format identified as corresponding to the second communication medium. The composite may include the selected data portion and the destination specification. Transmission of the composite formatted according to the second format toward an endpoint device in accordance with the destination specification may be caused, where the destination specification corresponds to the endpoint device.

In another aspect, a method for processing data transmissions from a plurality of client devices to create composites for transmission to destination addresses is disclosed. The method may include one or a combination of the following. A first set of one or more communications via a network may be received by a server system from a first set of one or more devices. The first set of one or more communications may include a digital identifier corresponding to a destination specification. The first set of one or more devices may correspond to one or more client devices communicatively couplable to the server system. For each communication of the first set of one or more communications, one or a combination of the following may be performed. The communication may be processed to identify the digital identifier. The communication may be processed to identify the destination specification based at least in part on the digital identifier. A data portion may be selected from the communication and cached. A second format may be identified as corresponding to a second communication medium, where the second format is different from a first format of the communication. A composite may be created according to the second format identified as corresponding to the second communication medium. The composite may include the selected data portion and the destination specification. Transmission of the composite formatted according to the second format toward an endpoint device in accordance with the destination specification may be caused, where the destination specification corresponds to the endpoint device.

In yet another aspect, one or more machine-readable storage devices for storing machine-executable instructions are disclosed. The executable instructions, when executed by one or more processing devices, may cause the one or more processing devices to perform operations including one or a combination of the following. A first set of one or more communications via a network may be received from a first set of one or more devices. The first set of one or more communications may include a digital identifier corresponding to a destination specification. The first set of one or more devices may correspond to one or more client devices communicatively couplable to the one or more processing devices. For each communication of the first set of one or more communications, one or a combination of the following may be performed. The communication may be processed to identify the digital identifier. The communication may be processed to identify the destination specification based at least in part on the digital identifier. A data portion may be selected from the communication and cached. A second format may be identified as corresponding to a second communication medium, where the second format is different from a first format of the communication. A composite may be created according to the second format identified as corresponding to the second communication medium. The composite may include the selected data portion and the destination specification. Transmission of the composite formatted according to the second format toward an endpoint device in accordance with the destination specification may be caused, where the destination specification corresponds to the endpoint device.

In various embodiments, the first format of the communication may correspond to a first communication medium via which the communication was received. In various embodiments, the first communication medium may be different from the second communication medium. In various embodiments, at least one of the one or more network interfaces may be monitored to detect one or more transmissions via one or both of the second communication medium and the destination specification, the one or more transmissions indicative of endpoint device operations mapped to the destination specification. In various embodiments, based at least in part on the monitoring, detected endpoint device operations may be mapped to the destination specification, a set of observation data of the detected endpoint device operations mapped to the destination specification may be developed, and attributes for the destination specification may be learned based at least in part on the developed set of observation data of the detected endpoint device operations mapped to the destination specification.

In various embodiments, a second set of one or more communications via the network may be received from the first set of one or more devices and/or a second set of one or more devices. The second set of one or more communications may include one or both of the digital identifier and a different digital identifier. For each communication of the second set of one or more communications, one or a combination of the following may be performed. The communication may be processed to identify one or both of the digital identifier and the different digital identifier. The communication may be processed to identify at least part of a respective set of observation data from amongst a plurality of sets of observation data based at least in part on the digital identifier and/or the different digital identifier. Each respective set of observation data may be mapped to a unique set of destination specifications. A composite may be created according to a third format identified as corresponding to a third communication medium, where the third format is different from the first format and the second format. The composite may include another extracted data portion and a third destination specification. Transmission of the composite formatted according to the third format toward the endpoint device in accordance with the third destination specification may be caused.

In various embodiments, for each communication of the second set of one or more communications, one or a combination of the following may be performed. A set of one or more identification rules specified by a stored protocol specification may be accessed. The set of one or more identification rules may include criteria for selecting a particular communication medium from a plurality of different communication media and for selecting a particular destination specification from a plurality of destination specifications. The third communication medium and the third destination specification may be selected based at least in part on the respective set of observation data, the set of one or more identification rules, and the criteria. The creating the composite according to the third format identified as corresponding to the third communication medium may be based at least in part on the selecting.

In various embodiments, the attributes may include time-based attributes for the destination specification as a function of time. In various embodiments, the set of observation data may be for an chronicle of the detected endpoint device operations mapped to the destination specification. The processing the communication may include identifying the chronicle from amongst a plurality of chronicles based at least in part on the digital identifier and/or the different digital identifier. Each chronicle of the plurality of chronicles may be mapped to a unique set of destination specifications. The at least partially analyzing at the set of observation data may include analyzing chronicle to select the third communication medium and the third destination specification based at least in part on the set of one or more identification rules and the criteria. In various embodiments, a particularized pattern of endpoint activity mapped to the destination specification may be determined based at least in part on analyzing the set of observation data stored in the chronicle to correlate the detected endpoint device operations with one or more of corresponding locations, corresponding times, and/or corresponding device operations.

In various embodiments, one or more network interfaces may be monitored to detect a set of transmissions via one or both of a plurality of communication media and a plurality of destination specifications. The set of transmissions may be indicative of endpoint device operations mapped to individual destination specifications of the plurality of destination specifications. Based at least in part on the detected set of transmissions, the set of observation data for the chronicle of detected endpoint device operations may be developed. The chronicle may be mapped to the plurality of destination specifications. The monitoring the one or more network interfaces may include the monitoring the at least one network interface of the one or more network interfaces. The plurality of communication media may include the particular communication medium. The plurality of destination specifications may include the destination specification.

In various embodiments, one or both of the plurality of communication media and the plurality of destination specifications may be ranked based at least in part on one or a combination of recency, time of day, time to respond, responsiveness to a particular transmitter, and/or security attributes. In various embodiments, each of the one or more devices may be configured to run a client application. At least one of the one or more devices may be configured to initiate at least one communication of the first set of one or more communications upon detection of a trigger event. In various embodiments, the trigger event may correspond to a user command to transmit the at least one communication.

In various embodiments, the trigger event may correspond to user input that does not correspond to an explicit user command transmit the at least one communication. The trigger event may correspond to the user input conforming to a report protocol. In various embodiments, the user input may include one or more values, one or more access operations, and/or one or more commands conforming to criteria specified by the report protocol. The trigger event may correspond to a determination that the user input conforms to the criteria. In various embodiments, the digital identifier may indicate the destination specification.

In various embodiments, the causing transmission of the composite formatted according to the second format toward the endpoint device may include transmitting the composite toward an intermediary device to cause the intermediary device to transmit the composite toward the endpoint device in accordance with the destination specification. In various embodiments, the causing transmission of the composite formatted according to the different format toward the endpoint device in accordance with the destination specification may include transmitting the composite toward a carrier system to make the composite available for authenticated access via the destination specification. In various embodiments, the one or more transmissions indicative of endpoint device operations mapped to the destination specification may indicate endpoint availability via the one or both of the particular communication medium and the destination specification. In various embodiments, the monitoring the one or more network interfaces to detect the one or more transmissions via one or both of the particular communication medium and the destination specification may include monitoring for a response from the endpoint device responsive to the composite.

In various embodiments, the monitoring the one or more network interfaces to detect the one or more transmissions via one or both of the particular communication medium and the destination specification may include monitoring for a status indicator corresponding to an application run by the endpoint device. The status indicator may indicate one or a combination of: one or more operations by the endpoint device, that the composite was one or both of received and accessed by the endpoint device, that the endpoint device is one or both of online and active via the application run by the endpoint device, and/or that the endpoint device was last detected as one or both of online and active via the application run by the endpoint device. In various embodiments, the monitoring the one or more network interfaces to detect the one or more transmissions via one or both of the particular communication medium and the destination specification may include monitoring for an indication from an intermediary device that the composite was or was not successfully delivered for access by the endpoint device.

In various embodiments, auto-discovery services may be performed to learn an endpoint device and configure the endpoint device for interaction with the adaptive system when the need for doing so is detected. In the case that the endpoint device is not recognized by the adaptive system, a need for endpoint configuration may be determined and endpoint configuration processes may be initiated. In various embodiments, adaptive directory services may be provided to identify the third communication medium and the third destination specification as a best method to reach a receiver corresponding to the endpoint device.

In various embodiments, a plurality of contact vectors for a receiver corresponding to the endpoint device may be determined. The last known contact vector or the current contact vector for the receiver may be identified from the plurality of contact vectors. The selecting the third communication medium and the third destination specification may be based at least in part on the identifying from the plurality of contact vectors what is the last known contact vector or the current contact vector for the receiver. In various embodiments, the selecting the third communication medium and the third destination specification may be based at least in part on enforcing security consistency rules. In various embodiments, the selecting the third communication medium and the third destination specification may be based at least in part on a mapping of appropriate routes to receivers.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Various embodiments in accordance with the present disclosure will be described with reference to the following appended drawings.

DETAILED DESCRIPTION

Figure 1A:
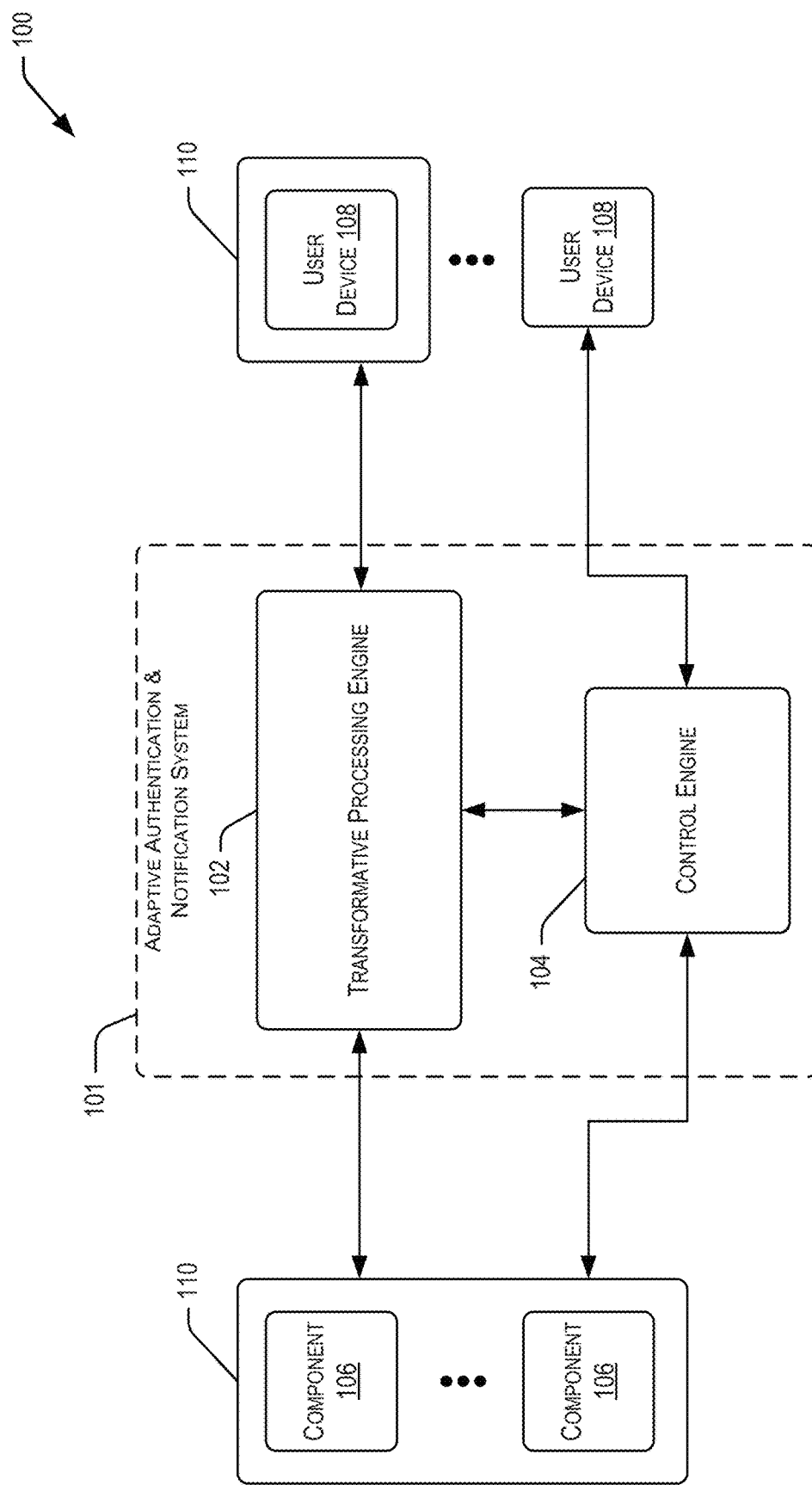
FIG. 1A is an example block diagram of a interaction system with an adaptive authentication and notification system, in accordance with embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It is understood that various changes may be made in the function and arrangement of elements without departing from the spirit and scope of the disclosure as set forth in the appended claims.

In certain aspects, disclosed embodiments of an adaptive system may provide for a federated messaging platform that allows for integration with various client applications and products, where each may correspond to a different proprietary platform, software, equipment, formats, and/or the like. Disclosed embodiments of the adaptive system may include a plurality of virtual pipes or domains, and may handle electronic communications from each endpoint device and/or application with a receiving service and a router subsystem that receive, inspect, validate, convert, and translate messages in order to create messages to route to the appropriate communication channel and receiver.

Disclosed embodiments may route inbound messages, route outbound messages, modify messages to create customized messages, and generates customized messages. Disclosed embodiments may transform received messages to conform to the protocols of the various communication channels used to reach the receivers. In some embodiments, for each communication medium (e.g., SMS, MMS, instant messaging, iMobile, PatientKeeper, email, fax, voice, one-on-one chat sessions, group chatrooms, and/or the like), a controller and router may receive a message packet, inspect the message payload, convert the packet to the appropriate payload for the channel (e.g., based on the aggregator that is being used, which may have intermediary-specific requirements, format, language of queries/responses, error codes, validations, and/or the like), and route the packet to the appropriate lane for the specific communication medium.

Disclosed embodiments may provide for auto-discovery services to learn an endpoint device and configure the endpoint device for interaction with the adaptive system when the need for doing so is detected by the adaptive system. In the case that the endpoint device is not recognized by the adaptive system, the adaptive system may determine a need for endpoint configuration and may initiate endpoint configuration processes. This phase may, for example, correspond to an endpoint device requesting initialization and configuration setup for communication services provided by the adaptive system. The adaptive system may perform integration processes to enable the endpoint device integrate with the adaptive system and interact with the adaptive system.

In certain aspects, disclosed embodiments may provide adaptive directory services to identify and confirm designated receivers, and to identify and employ the best method/mode to reach receivers. Further, the adaptive directory services may learn how to simplify message sending from client applications (e.g., an app need only provide a message payload with a specified receiver), identify best method/mode to reach receivers, and automatically employ the best method/mode. A router of the adaptive system may utilize machine learning to learn the best methods/modes for particular receivers based on past interactions with the receivers.

In certain aspects, disclosed embodiments may be presence intelligent. Having received a message for a particular receiver, the adaptive system may determine a plurality of contact options/vectors for the receiver and identify from the plurality of contact options/vectors what is the last known contact option/vector or the current contact option/vector for the receiver. With personas, the adaptive system may send a message to wherever a receiver is logged in.

In certain aspects, disclosed embodiments may enforce security consistency. By way of example, sending a message from a secure channel/app (e.g., iMobile) to a non-secure channel (e.g., SMS) may be prohibited and/or re-routed to a secure channel. Thus, security mismatches may be determined and messages may be permitted, rejected, or re-routed at the perimeter. The re-routing may be automatic with notifications to the transmitter, or re-routing may be only upon transmitter confirmation of recommended rerouting. Further, some embodiments of the adaptive system may allow for sending a message from a secure channel to a non-secure channel only when the adaptive system determines that the message does not contain protected health information.

Disclosed embodiments of the adaptive system may map appropriate routes/vectors and may restrict certain messages to resources assigned to a load. The adaptive system may determine whether a receiver designated for a message has a need to know. If the designated receiver is not assigned to the load and otherwise has no relationship to the load, then the message may be blocked. Optionally, a response may be sent back to the transmitter that the endpoint is not secure, with an option to redirect via secure route if available.

Disclosed embodiments of the adaptive system may support receiving a message that requires one or more responses from the receiver with a state-based operational sequence. When a message parameter specifies that one or more responses are required, the adaptive system may spin up an agent to monitor for the one or more responses from the message receiver. The agent may wait for a certain time to receive the requested response(s). When a response is received, the adaptive system may pull the payload packet and route it back to the client application for consumption. The messages may have a time to live (e.g., expiration) and require a specific answer in order to be considered by the adaptive system. Other messages outside of the time and/or responding with a wrong or otherwise unsatisfactory answer, may be ignored. While some of the messages may be bi-directional, some of the messages may be unidirectional messages (e.g., a status update sent from the adaptive system to an endpoint).

Disclosed embodiments of the adaptive system may support sending messages that require multiple responses from a receiver. When a message parameter specifies that one or more responses are required, the adaptive system may spin up an agent to monitor for the one or more responses from the message receiver. A queue may be managed such that, when, for example, there are 10 queries for particular receiver, but an agent is still waiting for response from query 1, the other 9 are held for sending serially. However, the adaptive system may identify a higher-priority message, bump it up out of line, and reroute it through a different communication means (e.g., a different phone number, channel, etc.). This allows the contracts on the open queries to be maintained, while avoiding confusion with a second query coming from the same application via the same means (e.g., multiple queries from the same number).

Referring first to FIG. 1A, a block diagram of an embodiment of an interaction system 100 with an adaptive authentication and notification system 101 is illustrated. In various embodiments, the adaptive authentication and notification system 101 may at least partially include one or both of a transformative processing engine 102 and a control engine 104.

Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity (e.g., person) near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Evolution (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, web-server premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102.

Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client customer, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 1B:
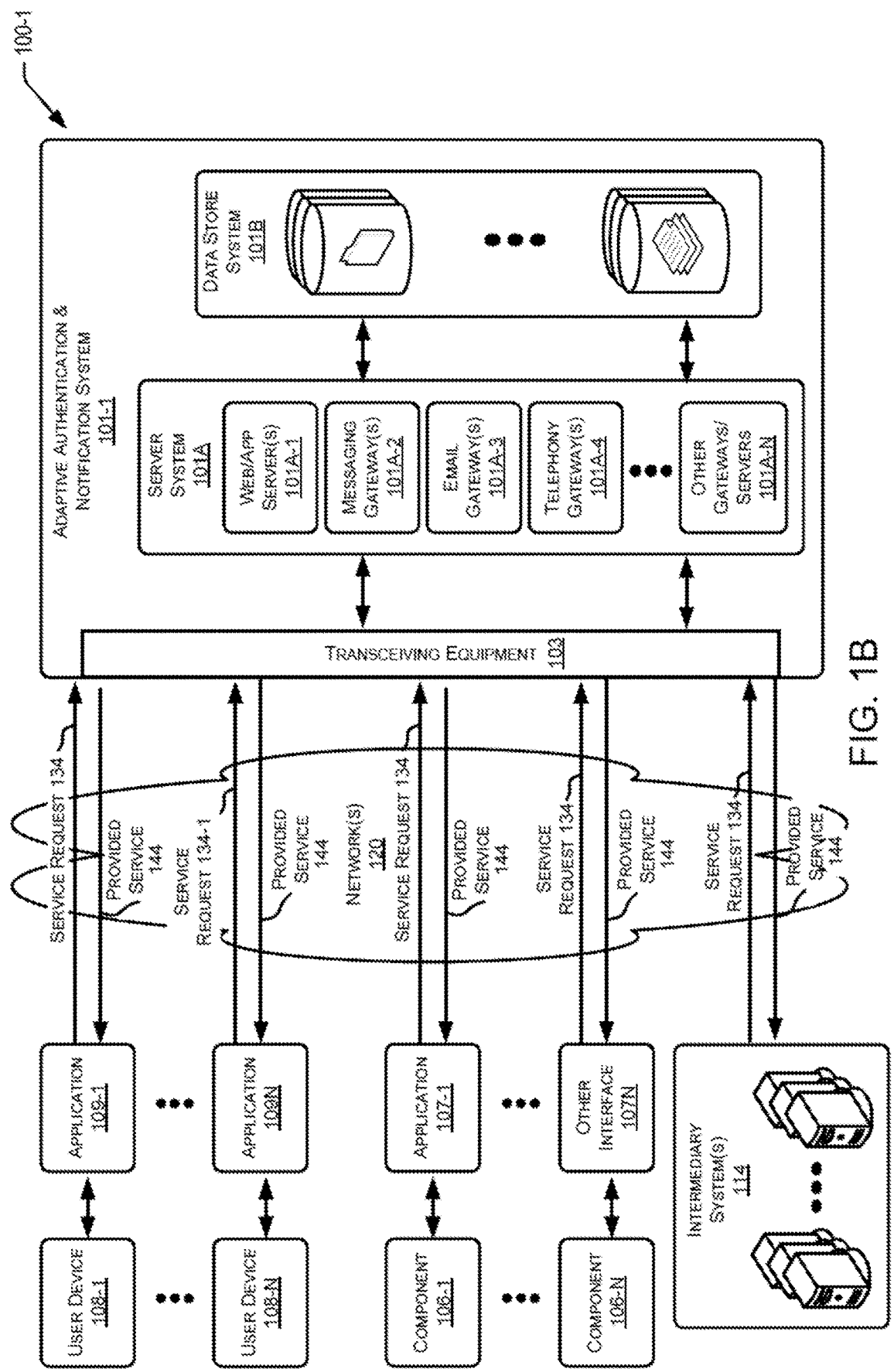
FIG. 1B is an example block diagram of a distributed network for implementing certain embodiments of the adaptive authentication and notification system, in accordance with embodiments of the present disclosure.

FIG. 1B depicts a simplified diagram of a distributed network 100-1 for implementing certain embodiments of the adaptive authentication and notification system 101 in accordance with present disclosure. The adaptive system 101 may be communicatively coupled with the one or more user devices 108 and the one or more components 106 via one or more networks 120, one or more of which may be remotely located from the adaptive system 101. The one or more user devices 108 and the one or more components 106 may be configured to execute and operate via various applications 109, applications 107, and/or other interfaces 107 in order to interface with system 101. The connections between the one or more components 106 and the one or more user devices 108 and the transformative processing engine 102 and the control engine 104 may include any suitable network connection.

In various embodiments, the one or more networks 120 may include one or a combination of any type of network that may support data communications using any of a variety of available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Zigbee, Bluetooth® (a family of standards promulgated by Bluetooth SIG, Inc.), Bluetooth Low Energy, Near Field Communication (NFC), and the like. Merely by way of example, network(s) 120 may be local area networks (LAN), such as one based on Ethernet, Token-Ring, and/or the like. Network(s) 120 also may be wide-area networks, such as the Internet. Networks 120 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 120. In various embodiments, the applications and other interfaces 109, 107 may include one or a combination of applications such as web browsers, direct messaging applications, email applications, short message service (SMS) applications, multimedia message service (MMS) applications, instant messaging applications, fax applications, voice applications, video applications, proprietary client messaging applications such as iMobile and PatientKeeper, and/or other suitable messaging service applications or other interfaces.

In the illustrated simplified example, the adaptive system 101-1 may include a server system 101A and a data store system 101B. Various aspects of the server system 101A and data store system 101B are elaborated upon with respect to FIG. 1B and the subsequent figures. In various embodiments, the server system 101A may be adapted to run one or more services or software applications. In some embodiments, these services may be provided as web-based or cloud services or under a Software as a Service (SaaS) model to the user devices 108 and/or the components 106. The user devices 108 and/or the components 106 may in turn utilize one or more client applications to interact with the server system 101A to utilize the services provided by these components. The server system 101A may run any suitable operating system and may also run any of a variety of additional server applications and/or mid-tier applications, such that server system 101A may include one or a combination of web servers, HTTP (hypertext transport protocol) servers, Internet Information Services servers, FTP (file transfer protocol) servers, CGI (common gateway interface) servers, JAVA® servers, database servers, and/or the like. Exemplary database servers include without limitation those commercially available from Oracle, Microsoft, Sybase, IBM (International Business Machines), and the like. In the illustrated example, the server system 101A may include one or more web and/or application servers 101A-1, one or more messaging gateways 101A-2, one or more email gateways 101A-3, one or more telephony gateways 101A-4, one or more other gateways and/or other types of servers 101A-N, such as an application gateway to interface with different servers.

The data store system 101B may include one or more databases that may reside in a variety of locations. By way of example, one or more databases may reside on a non-transitory storage medium local to (and/or resident in) the server system 101A. Alternatively, databases may be remote from the adaptive system 101A and in communication with the adaptive system 101A via a network-based or dedicated connection. In one set of embodiments, databases may reside in a storage-area network (SAN). Similarly, any necessary files for performing the functions attributed to the adaptive system 101A may be stored locally on the adaptive system 101A and/or remotely, as appropriate. In one set of embodiments, the databases of the data store system 101B may include relational databases that are adapted to store, update, and retrieve data in response to SQL-formatted commands.

As disclosed further herein, the adaptive system 101-1 may be configured to have a service-oriented architecture and may be configured to provide service-oriented web services to endpoint devices (e.g., the user devices 108 and/or the components 106). For example, the adaptive system 101-1 may provide web-based services that facilitate the sending and receiving of messages and/or other communications to endpoints on behalf of client applications 109, 107 and interfaces 107. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server system 101A and the user devices 108 and/or the components 106. With various embodiments, the client applications 109, 107 and interfaces 107 may be any application or interface that supports HTTP. SSL or TLS may use HTTP or HTTPS to provide authentication and confidentiality. In other examples, web services may be implemented using REST over HTTPS with the OAuth open standard for authentication, or using the WS-Security standard which provides for secure SOAP (e.g., Simple Object Access Protocol) messages using Extensible Markup Language (XML) encryption. The server system 101A may include specialized hardware for providing secure web services. For example, the hardware may include secure network appliances having built-in features such as hardware-accelerated SSL and HTTPS, WS-Security, and firewalls. Such specialized hardware may be installed and configured in front of web servers of the server system 101A so that any external devices may communicate directly with the specialized hardware.

Endpoint devices may transmit service requests 134 via the one or more networks 120. The application 107, 109 of a given endpoint device may be configured to send the service requests 134, which, for example, may be application programming interface (API) calls to the web service to pass payloads for sending with messages. The service requests 134 may be HTTP calls that may or may not be made via web interface. For example, with some embodiments, as long as the endpoint device has a command line interface, the endpoint device make the HTTP calls corresponding to the service requests 134.

The particularized service request 134 may specify a requested type of message. For example, in various embodiments, the types of messages may include short message service (SMS), a multimedia message service (MMS), an instant messaging service, text-to-voice, text-to-conference (read a text over phone then join to conference), text-to-chat, iMobile, PatientKeeper, email, fax, voice, chat, and/or the like. In some embodiments, the requested type of message may not be explicitly specified by the particularized service request 134, but the adaptive system 101 may infer the requested type of message from the digital identifier and/or the destination specification. For example, when the digital identifier specified by the particularized service request 134 corresponds to the destination specification (e.g., the digital identifier is an email address of the intended receiver), the adaptive system 101 may infer the requested type from the digital identifier (e.g., that an email message is requested when the digital identifier is an email address).

The adaptive system 101 may receive the service requests 134 via transceiving equipment 103. Responsive to the service requests 134, the adaptive system 101 may provide services 144. The provided services 144 may include transmitting messages on behalf of the requesting endpoint. As such, in some cases, the provided services 144 may include unidirectional messages such that the requesting endpoints do not receive responsive messages from receiving entities. However, in other cases, the provided services 144 may include bidirectional messages such that the requesting endpoints do not receive responsive messages from receiving entities. In still other cases, the provided services 144 to particular endpoints may be messages resulting from service requests 134 of other endpoints such the particular endpoints did not originate the corresponding service requests 134.

The adaptive system 101 may extract a data portion from a particularized service request 134. For example, a particularized service request 134 may include a payload, which may be a JSON payload or may be in another suitable format. The adaptive system 101 may inspect the payload and ensure that payload is appropriate for communication medium requested and/or selected by the adaptive system 101. In so doing, the adaptive system 101 may select/extract data from the payload in whole or in part. In various embodiments, the adaptive system 101 may selectively store the extracted data (e.g., in a L1, L2, L3, or other cache, a local RAM, a database, or another data store).

With the extracted data portion, the adaptive system 101 may create an electronic composite according to a particular format identified as corresponding to a particular communication medium and that is different from the format of the service request 134. For example, the electronic composite may be formatted according to SMS, MMS, an instant messaging, email, chat, and/or the like protocol format corresponding the communication medium requested and/or selected. The created electronic composite may include the extracted data portion and the destination specification identified the adaptive system 101.

Accordingly, in providing the services 144, the adaptive system 101 may create and transmit electronic composites via the transceiving equipment 103 and the one or more networks 120 to other endpoint devices (e.g., by way of applications 107) and/or to intermediary systems 114 that send, or make corresponding communications accessible, to other endpoints. When communications are to be sent to entities are to be sent to entities inside the interaction system 100, electronic composites may be transmitted by way of applications 107, in some embodiments. In some embodiments, the intermediary systems 114 may be external to the interaction system 100. In some embodiments, electronic composites may be transmitted to the intermediary systems 114 when communications are to be sent to entities outside of the interaction system 100. In some examples, an intermediary system 114 may include a message vendor that may be configured to provide notifications to users via the user devices. For example, the message vendor may a third-party which receives requests from the system 101 and generates notifications that may be received by the users devices. For example, the message vendor may provide notifications to the user device by accessing an address of the user device and generating a notification using one or more message services. The notification may be sent by the message vendor using a short message service (SMS), a multimedia message service (MMS), an instant messaging service, or any other suitable messaging service. The message vendor may receive the address of the user device from the adaptive system 101. In some examples, the adaptive system 101 may perform one or more operations on the communications to the message vendor in order to comply with message vendor restrictions, such as character restrictions on numbers and types of characters.

In some embodiments, the one or more components 106 and the one or more user devices 108 may communicate with the transformative processing engine 102 and the control engine 104 via one or a combination of a specified information format, protocol, encryption technique, language, and/or the like. However, in various embodiments, the one or more components 106 and the one or more user devices 108 may communicate with the transformative processing engine 102 and the control engine 104 via different information formats, different proprietary protocols, different encryption techniques, different languages, different machine languages, and the like. As will be discussed with reference to FIG. 2, the transformative processing engine 102 may be configured to receive these many different communications from the one or more components 106, and in some examples from the one or more user devices 108, in their native formats and transform them into any of one or more formats. The received and/or transformed communications may be transmitted by the adaptive system 101 to one or more other devices (e.g., the control engine 104, an entity device, and/or another user device 108) and/or locally or remotely stored. In some examples, the transformative processing engine 102 receives data in the HL7 format or conforming to any other suitable format and/or may be configured to transform received data to conform with the HL7 format.

The adaptive system 101 may provide for a federated messaging platform that allows for integration with various client applications and products, where each may correspond to a different proprietary platform, software, equipment, formats, and/or the like. The adaptive system 101 may include a plurality of virtual pipes or domains, and may handle electronic communications from each endpoint device and/or application with a receiving service and a router subsystem that receive, inspect, validate, convert, and translate messages in order to create messages to route to the appropriate communication channel and receiver. The adaptive system 101 may function as a single message turntable between endpoint devices. In effect, such functioning reduces the number of point-to-point connections between communicating endpoint devices. Thus, each endpoint device may direct messages through the adaptive system 101 instead of going directly to other endpoint devices, servers, services, etc. This funneling allows the adaptive system 101 to monitor and log the traffic.

In various embodiments, the adaptive system 101 may route inbound messages, route outbound messages, modify messages to create customized messages, and generates customized messages. The adaptive system 101 may transform received messages to conform to the protocols of the various communication channels used to reach the receivers. In some embodiments, for each communication medium (e.g., SMS, MMS, instant messaging, iMobile, Patient-Keeper, email, fax, voice, and/or the like), a controller and router may receive a message packet, inspect the message payload, convert the packet to the appropriate payload for the channel (e.g., based on the aggregator that is being used, which may have intermediary-specific requirements, format, language of queries/responses, error codes, validations, and/or the like), and route the packet to the appropriate lane for the specific communication medium.

Figure 1C:
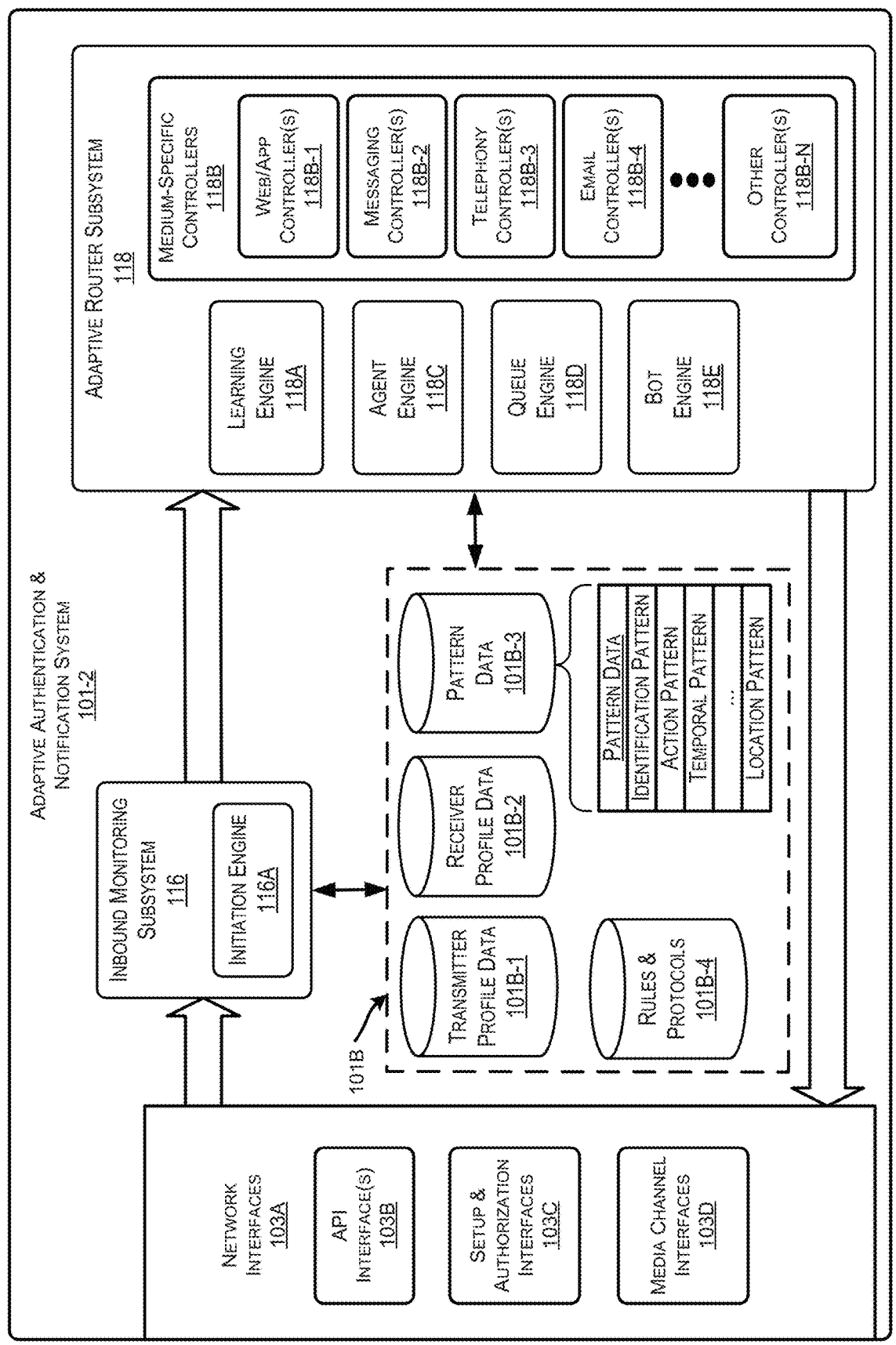
FIG. 1C is an example block diagram of certain aspects of the adaptive authentication and notification system, in accordance with embodiments of the present disclosure.

FIG. 1C depicts a diagram of certain aspects of the adaptive authentication and notification system 101 in accordance with present disclosure. The adaptive system 101 may be configured to manage one or more sub-modules, engines, components, and/or services directed to examples disclosed herein. While these aspects may be illustrated in the figures and may be described as performing discrete operations sometimes with reference to the flow charts, it should be understood that such are example configurations and other configurations performing other operations and/or similar operations as those described herein may be implemented according to the techniques described herein. For example, other engines, whether embodied in software or hardware, may perform the same operations or other operations and may be implemented in a similar fashion or according to other configurations.

The adaptive system 101 may include a plurality of various network interfaces 103A. The network interfaces 103A may include one or more API interfaces 103B to transmit to and/or receive communications from one or a combination of user devices 108, components 106, and/or intermediary system 114 using APIs. For example, as disclosed herein, the user devices 108 and components 106 may interact with the adaptive system 101 through API calls, e.g., when send service requests 134. The network interfaces 103A may include one or more setup and authorization interfaces 103C that facilitate the initial configuration setup processes disclosed further herein. Further, the network interfaces 103A may include one or more media channel interfaces 103D to transmit to and/or receive communications from one or a combination of user devices 108, components 106, and/or intermediary system 114 using various media channels.

Providing a service-based approach to message generation, customization, and routing, the adaptive system 101 improves over existing methods (e.g., direct messaging node to node). Node-to-node messaging, for example, may require hard-coded rules that must be updated each time changes are made to network nodes. Using the service-based approach, once an address or other identifier has been updated or added to a list of addresses, messages may be received and provided to the entities represented by the addresses. Disclosed embodiments of the adaptive system 101 may provide adaptive directory services to identify and confirm designated receivers, and to identify and employ the best method to reach receivers. Further, the adaptive directory services may learn how to simplify message sending from client applications (e.g., an app need only provide a message payload with a specified receiver), identify best method to reach receivers, and automatically employ the best method. As disclosed further herein, an adaptive router subsystem 118 may utilize machine learning to learn the best methods/modes for particular receivers based on past interactions with the receivers. Furthermore, as disclosed herein, using the service-based approach, the adaptive system 101 reduce the likelihood of accidental disclosure of confidential or other private information.

Among other things, the adaptive system 101 may include an inbound monitoring subsystem 116, in addition to the adaptive router subsystem 118. In various embodiments, the inbound monitoring subsystem 116 and the adaptive router subsystem 118 may be separate, integrated, or one and the same portion of the adaptive system 101. In some embodiments, the inbound monitoring subsystem 116 and the adaptive router subsystem 118 may correspond to a set of servers that other servers interact with through API calls.

The inbound monitoring subsystem 116 may be configured to provide a receiving service to receive and process inbound communications from endpoint devices and the intermediary system 114. The adaptive system 101 may process the service requests 134 received from the endpoint devices, which may include the adaptive system 101 (e.g., the inbound monitoring subsystem 116) using a handshake protocol with a particular application 107, 109 to authenticate a particular endpoint. The inbound monitoring subsystem 116 may include an initiation engine 116A that may be configured to handle initial communications corresponding to service requests 134. To this end, the initiation engine 120 may be configured to receive a request from an endpoint device. The initiation engine 116A may be a machine-learning engine that provides auto-discovery services to learn an endpoint device and configure the endpoint device for interaction with the adaptive system 101 when the need for doing so is detected by the initiation engine 116A. With a service request 134 from a particular endpoint device, the initiation engine 116A may perform an endpoint configuration check. The endpoint configuration check may include the initiation engine 116A determining whether the endpoint device has previously interacted with the adaptive system 101 at least partially by searching endpoint device data records maintained by the adaptive system 101 to identify preexisting records for the particular endpoint device.

In the case that the endpoint device is recognized as properly configured for interacting with the adaptive system 101, the initiation engine 116A may initiate further processing of the request 134. However, in the case that the endpoint device is not recognized by the adaptive system 101, the initiation engine 116A may determine a need for endpoint configuration and may initiate endpoint configuration processes. This phase may, for example, correspond to an endpoint device requesting initialization and configuration setup for communication services provided by the adaptive system 101. In various embodiments, the endpoint device may include one or more gateways and/or APIs that define protocols and routines for interfacing with system 101. In some embodiments, the initiation engine 116A may perform discovery to determine existence of a description file and/or API document or request/pull the description file and/or API document from the endpoint device. If a description file and/or API document is available, the initiation engine 116A may receive and process it to determine configuration needed. By way of example, if an endpoint API follows an industry standard where the endpoint device provides a description file of its services, then the description file may be uploaded to the adaptive system 101. The initiation engine 116A may consume the description file and learn how to send messages going forward. If a description file and/or API document is not available, the initiation engine 116A may, in some embodiments, specify integration actions needed to performed by the endpoint device.

The integration processes may, in various embodiments, include transmitting one or a combination of an API document, an API translation profile, a code portion, module, a plug-in, an application, a software development kit (SDK), and/or the like for installation and use by the endpoint device to translate the protocols and routines of the endpoint device to integrate with the adaptive system 101 and allow communication with the adaptive system 101 (e.g., by way of API calls). In some embodiments, the adaptive system 101 may deploy and cause installation of the same. In addition or in alternative, the adaptive system 101 may specify, with one or more notifications, procedures needed to be initiated at the endpoint for full installation and configuration for interacting with the adaptive system 101. Accordingly, the adaptive system 101 may learn, adapt, and configure endpoint devices for interaction with the adaptive system 101.

With an endpoint device properly configured for interacting with the adaptive system 101, the initiation engine 116A may initiate further processing of the request 134. The adaptive system 101 (e.g., the inbound monitoring subsystem 116) may process a particularized service request 134 to determine an explicit or implicit intent of the particularized service request 134. In some embodiments, the initiation engine 116A may perform such processing; in some embodiments, the adaptive router 118 may perform such processing. With the processing, the adaptive system 101 may identify a digital identifier and to identify a destination specification based at least in part on the digital identifier. Each service request 134 may be structured according to a set of one or more protocols. The particularized service request 134 may include a digital identifier corresponding to a destination specification. In some instances, the digital identifier may be the destination specification. For example, a digital identifier and destination specification may include one or a combination of a telephone number, an office code, a telephone number extension, a fax number, an email address, a URL, a user identification (ID), a chatroom identifier, an application identifier, an IP address, a MAC address, another device identifier, and/or the like.

In some instances, the digital identifier may not be the destination specification or may not be a complete or fully correct destination specification, but the adaptive system 101 may map the digital identifier to one or more corresponding destination specifications. For example, the digital identifier may include one or a combination of a name of an individual, another identifier of an individual (e.g., an employee identification, a user ID, etc.), only a partial destination specification that would require additional input to complete the destination specification before a communication may be transmitted with the destination specification (e.g., part of a telephone number, an extension without prefix numbers, a partial email address, or only part of one of the other types of destination specifications), an incorrect destination specification (e.g., one or more digits of the intended destination specification are incorrect, omitted, and/or are added unnecessarily), and/or the like. With such instances, the adaptive system 101 may map the digital identifier to one or more corresponding destination specifications. Thus, various digital identifiers may be indicative of one or more destination specifications.

The adaptive router 118 may include a learning engine 118A that may employ an ongoing learning mode to confirm, correct, and/or refine determinations made for the entity-particularized pattern data 101B-3 for particular transmitters and receivers. In alternative embodiments not illustrated, the learning engine 118A and the features facilitated by the learning engine 118A may be remote from the adaptive router 118 and may be remote from the system 101 (e.g., being implemented by an intermediary system 114). The learning mode may be based at least in part on taking into account transmitter profile data 101B-1 mapped to receiver profile data 101B-2, which may be part of a feedback loop. The feedback may be used for training the system to heuristically adapt conclusions, profiles, correlations, attributes, triggers, patterns, and/or the like. The learning engine 118A may map one or a combination of various transmitter metrics and receiver metrics to transmitter entities and/or receiver entities. For instance, the learning engine 118A may observe a particular identified entity using a particular endpoint device to communicate to a particular receiver at a particular time and within a particular context. The learning engine 118A may observe numerous instances of such communications metrics mapped to particular entities and may develop the entity-particularized pattern data 101B-3 based at least in part on correlating the communications metrics to particular transmitters and receivers. The learning engine 118A may be that an analysis engine that employs machine learning to process the observation data and derive the particularized pattern data 101B-3. The learning engine 118A may be configured to employ deep learning to process the observation data and derive the particularized pattern data 101B-3. Accordingly, the learning engine 118A may facilitate machine learning or, more specifically, deep learning, to facilitate creation, development, and/or use of particularized pattern data 101B-3. The learning engine 118A may be configured to perform any one or combination of features directed to matching or otherwise correlating the observation data—such as that described below with respect to the endpoint device profile data, communications profile data, and temporal profile data—with transmitter entities and/or receiver entities. The learning engine 118A may include a reasoning module to make logical inferences from a set of the detected and differentiated data to infer one or more patterns of activity for particular transmitters and/or receivers generally. A pattern-based reasoner may be employed to use various statistical techniques in analyzing the data in order to infer particularized pattern data 101B-3 from the observation data. A transitive reasoner may be employed to infer relationships from a set of relationships related to the observation data. In various embodiments, the system automatically establishes and develops the particularized pattern data 101B-3.

The transmitter profile data 101B-1 may include particularized profiles for a plurality of entities tracked, aggregated, consolidated, and learned on a per-entity basis and mapped to particular entities corresponding to particular transmitting endpoint devices. Each particularized profile may correspond to a tracked, aggregated, and consolidated set of records for a particular entity that has utilized the adaptive system 101. With respect to a particular entity, transmitter profile data 101B-1 may include one or a combination of endpoint device profile data, communications profile data, temporal profile data, and/or the like. The learning engine 118A may include logic to implement and/or otherwise facilitate any taxonomy, classification, categorization, correlation, mapping, qualification, scoring, organization, and/or the like features disclosed herein. In various embodiments, the learning engine 118A may be configured to analyze, classify, categorize, characterize, tag, and/or annotate endpoint device profile data, communications profile data, temporal profile data, and/or the like. The learning engine 118A may employ one or more artificial intelligence (machine learning or, more specifically, deep learning) algorithms to perform pattern matching to detect patterns of communications metrics of the transmitters and receivers.

The endpoint device profile data may include tracked, aggregated, consolidated, and learned device data to facilitate detection, recognition, differentiation, configuration, and/or capabilities of endpoint devices mapped to particular entities corresponding to transmitters. The endpoint device profile data may include correlated data sets of one or a combination of configuration data, description files, API document that do not it something else it looks like. You s, endpoint device types, specifications, and identifiers, digital identifiers, destination specifications, and/or the like. The learning engine 118A may map multiple endpoint devices, along with the pertinent sets of endpoint device profile data, to a single endpoint entity when the learning engine 118A detects that the single endpoint entity utilizes the multiple endpoint devices. The receiver profile data 101B-2 may likewise include one or a combination of the aforementioned aspects mapped to particular entities corresponding to receivers. Thus, for example, the learning engine 118A may map various data sets of the transmitter profile data 101B-1, the receiver profile data 101B-2, and/or the particularized pattern data 101B-3 to the single endpoint entity utilizes the multiple endpoint devices. This may allow for the rerouting features disclosed herein.

The communications profile data may include tracked, aggregated, consolidated, and learned device action data to facilitate detection, recognition, and/or differentiation of communications mapped to particular entities and endpoint device profile data sets. The endpoint device profile data may include correlated data sets of one or a combination of modes and media channels used, digital identifiers, destination specifications, type of service requests, types of message transmitted (e.g., selected pre-generated message templates or custom created messages), whether responses are requested of receivers, types of receivers correlated to such communication aspects, endpoint device locations correlated to such actions (e.g., geolocation, access point location, network location, site location, floor location, section location, etc.), device use correlated to the aforementioned communication aspects, and/or the like. The learning engine 118A may map multiple sets of data corresponding to communication aspects to a single endpoint entity when the learning engine 118A detects that the single endpoint entity utilizes the multiple communication aspects. The receiver profile data 101B-2 may likewise include one or a combination of the aforementioned aspects mapped to particular entities corresponding to receivers and message reception acknowledgements and/or other indicators, message access acknowledgements and/or other indicators, and responses transmitted by the receivers.

The temporal profile data may include tracked, aggregated, consolidated, and learned device temporal data to facilitate detection, recognition, and/or differentiation of temporal aspects of communications mapped to particular entities, endpoint device profile data sets, and communications profile data sets to facilitate chronotyping of the operations of entities. For example, the chronotyping of the operations of entities may include creating temporally keyed pattern data of operations mapped to the entities as a function of time and correlating the pattern data to devices, digital identifiers, destination specifications, communication media/method, and/or the like used by the entities. To refine the chronotyping, the temporal profile data may include correlated data sets of one or a combination of time of day information, time of week information, time of year information, time of month information, holiday information, and/or the like correlated to the aforementioned actions and devices. To further refine the chronotyping, the receiver profile data 101B-2 may likewise include one or a combination of the aforementioned aspects mapped to particular entities corresponding to receivers and message reception acknowledgements and/or other indicators, message access acknowledgements and/or other indicators, and responses transmitted by the receivers. To still further refine the chronotyping, such temporal profile data for receivers may include one or a combination of the aforementioned aspects mapped to availability information (e.g., the presence attributes disclosed herein), promptness of responsive actions after receiving messages, response rates, and/or the like correlated to the aforementioned device and communication aspects mapped to particular transmitting entities.

Having generated, developed, and/or otherwise used the transmitter profile data 101B-1 and/or the receiver profile data 101B-2 to develop the particularized pattern data 101B-3, the learning engine 118A may use the particularized pattern data 101B-3 to identify and automatically employ the best method to reach receivers. In some embodiments, the adaptive system 101 may not automatically employ the best method to reach a particular receiver, but may identify the best method to reach receivers, then transmit notification to the transmitting endpoint device to cause an identification of the best method along with one or more user-selectable options to accept or reject transmission of the indicated message via the best method. Upon receiving acceptance of the best method, the system 101 may then employ the best method to transmit a corresponding message. However, upon receiving rejection of the best method, the system 101 may then employ either an originally requested method (in cases where the transmitting endpoint device indicated a requested method with the service request) or another method (e.g., the next best method).

According to an initial screening protocol, the learning engine 118A may perform an initial screening of service requests match the service requests known transmitter profiles and/or receiver profiles. When a service request is processed and a digital identifier is identified from the service request, the system 101 may determine whether the service request corresponds to a first impression for the transmitter and/or the receiver. For example, the system 101 may determine that the endpoint device transmitting the service request does not correspond to a known transmitter profile, in which case, the system 101 may create a new transmitter profile for the corresponding entity and begin developing transmitter profile data 101B-1 for the entity. As another example, the system 101 may determine that the service request does not correspond to a known receiver profile, in which case, the system 101 may create a new receiver profile for the corresponding entity and begin developing receiver profile data 101B-2 for the entity.

As part of the initial screening protocol, the learning engine 118A may determine one or more destination specifications corresponding to service requests. When a service request is processed and a digital identifier is identified from the service request, the system 101 may identify a corresponding destination specification which is either included in the service request (either as the digital identifier itself separately from the digital identifier, as disclosed herein) or is determined by the system 101 based at least in part on the digital identifier. When the system 101 detects that a given service request does not include a destination specification, the system 101 may determine one or more corresponding destination specifications using the digital identifier and the transmitter profile data 101B-1, the receiver profile data 101B-2, and/or the particularized pattern data 101B-3.

The learned communications profile data may allow for the intelligent messaging features disclosed herein that take into account learned aspects of receivers and channels based at least in part on mapped transmitters. For example, having learned aspects of receivers and channels mapped to particular transmitters, the learning engine 118A may identify options for receivers and channels that are particular to a transmitter. The system 101 may allow for simplified messaging features where a transmitter transmitting a service request need not specify a destination specification because the system 101 may map the service request to a particular transmitter based at least in part on the communications profile data. For example, the service request may only indicate a digital identifier corresponding to a receiver, without specifying a destination specification. In some instances, that may correspond to identifying a name or other identifier of an entity corresponding to the receiver without fully specifying a phone number, address, or other destination specification for the receiver. The learning engine 118A may map the digital identifier to one or more learned destination specifications for the receiver based on the learned communications profile data may include patterns of transmissions from the particular transmitter to a particular receiver. Such patterns may include the transmitter sending communications to the receiver with a frequency that satisfies a certain frequency threshold. Such patterns may further include the transmitter sending communications to the receiver according to certain temporal patterns and corresponding chronotypes based at least in part the temporal data disclosed herein. Such patterns may further include the content of communications directed from the transmitter to the intended receiver, which content may include one or more keywords when the corresponding communications are sent to the receiver with a frequency that satisfies the frequency threshold. Such data may further include the transmitter directing communications to the receiver via one or more particular media channels. Accordingly, even when the service request does not specify an intended receiver and/or unintended channel, the learning engine 118A may match device data and/or other identification data for the transmitter, action data for the transmitter, temporal data for the transmitter, and/or other communications profile data for the transmitter to a particular receiver into a particular media channel.

Furthermore, the adaptive system 101 may provide for intelligent simplified messaging features that allow for a transmitter of a service request to rely on the artificial intelligence of the system 101 in order to recognize an intent for the service request without specifying all the details that would otherwise be needed. While the identification of a destination specification may be based at least in part on the service request explicitly identifying the destination specification, alternatively or additionally, the identification of a destination specification may be based at least in part on the learning engine 118A performing a search of the communications profile data storage for one or more destination specifications mapped to a digital identifier specified by the service request and/or another identifier of the transmitting entity and/or endpoint device. Additionally, the adaptive system 101 may provide for intelligent auto-correction to automatically correct an incomplete and/or incorrectly specified digital identifier and/or destination specification provided by a service request. When the digital identifier of a service request does not exactly match a previously learned digital identifier and/or destination specification mapped to the transmitter, the learning engine 118A may determine a close match to a previously learned digital identifier and/or destination specification mapped to the transmitter and, if not mapped to the transmitter, mapped to one or more previously learned receivers.

To facilitate such simplified messaging and/or auto-correction features, the learning engine 118A may generate indexes at least portions of the communications profile data. Digital identifiers and destination specifications may be stored in the indexes and may be linked to profiles for particular transmitters for particular receivers. The indexes may allow for approximate string matching at least partially based on decomposition of strings, such as into n-grams or words, and building inverted lists based on the decompositions. In some embodiments, inverted lists may be based on tokens or other identifiers associated with the n-grams or words. In some embodiments, similarity of strings may be measured in terms of similarity of the respective n-grams, words, and/or identifiers. In some embodiments, one or more inverted lists for each n-gram corresponding to the digital identifiers and/or destination specifications may be created and may be associated with the digital identifiers and/or destination specifications. The digital identifiers and/or destination specifications may be decomposed into n-gram sets of various sizes in order to facilitate the similarity matching. An inverted list for a given n-gram may include any and/or all instances of strings from a plurality of strings that contain the n-gram. In some embodiments, a list may include identifiers of strings, in lieu of actual strings, for mapping to actual strings. This may improve efficiency. The string identifiers may be unique identifiers.

The learning engine 118A may employ similarity measures between multiple strings to allow for fuzzy matching. The learning engine 118A may process one or more characters of a digital identifier and/or a destination specification corresponding to a particular service request and parse the one or more characters into sets of n-grams for comparison with one or more indexes. For example, the characters of an incomplete and/or incorrectly specified digital identifier and/or destination specification in a particular service request may be processed and decomposed into n-grams. The sets of characters may be compared to index entries to assess similarity using any suitable algorithm. Some embodiments may identify intersections between multiple sets and assigned a similarity score based on the extent of n-gram intersections between index entries and the incomplete and/or incorrectly specified digital identifier and/or destination specification, with a greater extent of an intersection of common characters indicating a greater degree of potential similarity between corresponding sets. Accordingly, the learning engine 118A may be enabled to use the indexes to perform digital identifier and/or destination specification matching that is not too strict. The learning engine 118A may initiate such fuzzy searching only when an exact match for a digital identifier and/or a destination specification corresponding to a particular service request is not found based on the learned communications profile data.

Accordingly, the learning engine 118A may determine a number of contact options/vectors for particular receiver corresponding to a service request. The set of contact options/vectors may be a function of a previously learned pattern of communications from the corresponding transmitter to the corresponding receiver, which may include temporal patterns and corresponding chronotypes of such communications, patterns of message payload characteristics/keywords, patterns of media channel selection, as well as identifiers for the intended receiver. Furthermore, determining a set of contact options/vectors for a particular receiver may be a function of the last known contact option/vectors for the receiver where an acknowledgment of the reception of a communication by the receiver has been received by the system 101, a current contact option/vectors for the receiver for an indication of the current availability of the receiver via the contact option/vectors has been received by the system 101, a previously learned pattern of time-based availability of the receiver based at least in part on a chronicle of acknowledgments of receive communications by the receiver at various times, a previously learned pattern of location-based availability of the receiver based at least in part on a mapping of acknowledgments of receive communications by the receiver at various locations, and/or the like.

The learning engine 118A may be configured to route messages destined for entities outside of the interaction system using a plurality of outbound routing rules, at least some of which may be saved in a rules database. Each outbound routing rule may include one or more preconditions, one or more assumptions, and/or one or more post-conditions relating to a type of message and/or use case. Thus, each outbound routing rule may include a collection of logic to determine to what entity the message should be routed. The learning engine 118A may also be configured to save a record of the routing of the outbound message to a record database. The record may include details about the routing. In some examples, the learning engine 118A may provide for delivery of the messages to authorized destination entities as identified by an authorized entities database, which may correspond to the receiver profile data 101B-2 in some embodiments.

The learning engine 118A may be configured to route messages destined for entities associated within or otherwise internally associated with the interaction system using a plurality of inbound routing rules, at least some of which may be saved in the rules database. Each inbound routing rule may include one or more preconditions, one or more assumptions, and/or one or more post-conditions relating to a type of message and/or use case. Thus, each inbound routing rule may include a collection of logic to determine to where the inbound message should be routed. The learning engine 118A may also be configured to save a record of details about the routing of the inbound message to the record database. In some examples, the learning engine 118A may verify whether the destination entities have been authorized. This may include accessing the authorized entities database.

Disclosed embodiments of the adaptive system 101 may enforce security consistency protocols. Use of the service-based approach may provide enhanced enterprise-level security by maintaining a centralized data storage of authorized entities that send and/or receive data with respect to the network. Consequent to execution of the initial screening protocol, the learning engine 118A may enforce one or more security protocols. In various embodiments, the learning engine 118A may be or include a security engine such that the learning engine 118A enforces one or more security protocols, or a separate security engine may enforce one or more security protocols. The security engine may evaluate rules and conditions for ensuring the security of access to the data provided via the interaction system. In some examples, these rules and conditions may be determined by administrators of the interaction system. In some examples, the security engine may provide a plurality of computer virus protection services. These services may be called up and implemented when with the processing of service requests. The rules and conditions may be based on roles, based on profiles, based on domains, and any other suitable security configuration. For example, because the interaction system may include sensitive data, the security engine may enforce a domain-based rule that protects certain sensitive information (e.g., identifying information).

As part of a security enforcement protocol, the learning engine 118A may identify at least one security attribute corresponding to a particular service request. The identification of at least one security attribute may be based at least in part on the service request. Alternatively or additionally, the identification of at least one security attribute may be based at least in part on the learning engine 118A performing a search of the data storage for profiles that have identifiers matching one or more aspects of the service request (e.g., indicators of one or a combination of the application/interface that the transmitting endpoint device, the channel by which the transmitting endpoint device transmitted the service request, the transmitter, and/or the intended receiver).

The at least one security attribute may correspond to an indication of the application/interface that the transmitting endpoint device used to originate the service request. The at least one security attribute may indicate a type and/or level of security of the application/interface. For example, the at least one security attribute may indicate a highly secure application, such as proprietary client messaging applications, iMobile and PatientKeeper, and/or a high level of security associated therewith. As another example, the at least one security attribute may indicate a non-secure application, such as SMS, and/or a low level of security associated therewith.

Additionally or alternatively, the at least one security attribute may correspond to an indication of the channel by which the transmitting endpoint device transmitted the service request to the adaptive system 101. For example, the network may be an internal network which may be local area network or a network with enterprise level security appropriate for passing information. The network may be a virtual private network or another network with added layers of security compared to an external, public, and/or open network. Accordingly, the at least one security attribute may indicate the type of network and/or a level of security of the network.

Additionally or alternatively, the at least one security attribute may correspond to an indication of the user transmitting the service request via the endpoint device to the adaptive system 101. Additionally or alternatively, the at least one security attribute may correspond to an indication of the intended receiver corresponding to the service request. For example, the intended receiver may or may not be authorized to receiver notifications that include secured information with respect to a load.

Additionally or alternatively, the at least one security attribute may correspond to an indication of whether or not service request payloads include information appropriate only for higher levels of security. In some examples, the learning engine 118A may enforce one or more information barriers to ensure that personal health information is not inappropriately shared with the other entities and/or via insufficiently secure channels. While the system 101 may include enterprise level network security which is often reliable, certain elements of the system 101 and/or interfacing media channels may not be subject to as much security scrutiny.

In some examples, the learning engine 118A may inspect service request payloads for a particular type of information (e.g., discharge information), information for a particular user, and/or the like. The learning engine 118A may determine the entity corresponding to the transmitter and/or the intended receiver is authorized to respectively transmit or receive a notification including such information. This may be a threshold determination. Determining whether the entity is authorized may include accessing entity information from the transmitter profile data 101B-1, the receiver profile data 101B-2, and/or the particularized pattern data 101B-3. In some examples, the entity information is organized into an authorized entity list that identifies entities that have previously agreed to comply with a set of guidelines regarding data security and that are authorized to send and/or receive communications corresponding to one or more users. In some examples, the authorized entity list is a whitelist. In this example, evaluating the authorized entity list to determine that the entity is authorized to send and/or receive such information or is not so authorized. This may include confirming that the entity is not located on the whitelist and/or is on a blacklist of entities prohibited from sending and/or receiving such information.

The transmitter profile data 101B-1, the receiver profile data 101B-2, and/or the particularized pattern data 101B-3 may be accessed using an identifier for the entity obtained during the evaluating of the service request, which, in various embodiments, may include the digital identifier, the destination specification, the at least one security attribute, and/or another identifier. For example, even if the service request does not indicate a particular entity to receive a message, the learning engine 118A may nevertheless determine one or more entities to receive some version of a corresponding message. For example, an identified first entity may be a second site to where the user is being transferred, a second entity may be a primary professional user who has an ongoing relationship with the user, but is not otherwise responsible for the user while the user is at either the first site or the second site.

Having identified one or more security attributes corresponding to a particular service request, the learning engine 118A may assess the one or more security attributes to determine security mismatches. In so doing, the learning engine 118A may follow one or more protocols that are based at least in part a precedence order that is a function of patterns learned regarding particular transmitters and/or receivers, specifications of service requests, and types of security attributes. By way of example, with respect to a given service request, the learning engine 118A may determine aspects pertinent to the service request that the system 101 has previously learned. In so doing, the learning engine 118A may access the transmitter profile data 101B-1, the receiver profile data 101B-2, and/or the particularized pattern data 101B-3 to determine a learned data set pertinent to the service request. For example, in some cases, based at least in part on the service request, the learning engine 118A may identify previously learned data regarding the transmitter, the intended receiver, and one or more appropriate routes/vectors mapped between the transmitter and intended receiver. In such cases, the learning engine 118A may determine if the route specified by the service request is appropriate based at least in part on the learned data set, which takes into account previously learned patterns of communications between the transmitter and the intended receiver, the authorizations of the transmitter to send communications to the intended receiver, and the appropriate routes/vectors learned about such communication. When the route specified by the service request is determined by the learning engine 118A to be appropriate as matching one or more mapped appropriate routes/vectors based at least in part on the learned data set, the learning engine 118A may direct a corresponding message via the specified route. However, when the route specified by the service request is determined by the learning engine 118A to be inappropriate as not matching one or more mapped appropriate routes/vectors based at least in part on the learned data set, the learning engine 118A may automatically reroute a corresponding message via one of the one or more mapped appropriate routes, instead of the specified route. In some embodiments, the rerouting may be done automatically without notification to the endpoint device corresponding to the transmitter.

In some embodiments, when the system 101 performs the rerouting, the system 101 may execute one-to-many communication protocols. For example, In some embodiments, the rerouting may be done only upon receiving an indication of acceptance of the rerouting from the endpoint device corresponding to the transmitter, consequent to a notification being sent by the system 101 to the endpoint device to cause one or more user-selectable options to be presented to allow for user acceptance or rejection of the rerouting. The system 101 may perform adaptive streamlining of rerouting based at least in part on the machine learning of the learning engine 118A with respect to particular transmitters and/or receivers. For example, with prima facie instances of rerouting communications from a particular transmitter (and, in some embodiments, to a particular receiver), the rerouting may be done only upon receiving an indication of acceptance of the rerouting from the endpoint device corresponding to the transmitter. With one or more subsequent instances of rerouting communications from the particular transmitter (and, in some embodiments, to the particular receiver), the system 101 may progress to the rerouting being done automatically based at least in part on the previous acceptance of the rerouting, but with a notification being sent by the system 101 to the endpoint device corresponding to the transmitter as an alert of the rerouting. Then, with additional subsequent instances of rerouting communications from the particular transmitter (and, in some embodiments, to the particular receiver), notification to the endpoint device may be dispensed with by the system 101 when the learning engine 118A has learned based on previous rerouting of communications from the particular transmitter being indicated by the transmitter as acceptable via user-selectable options. Hence, the system 101 may progress to the rerouting may be done automatically without notification to the endpoint device corresponding to the transmitter.

The execution of the one-to-many communication protocols may further include the system 101 transmitting multiple communications to a particular receiver entity as part of the rerouting. For example, in addition to rerouting an electronic and/or digital composite to the receiver via the secure channel, the system 101 may also transmit a notification to the receiver via the insufficiently secure channel originally specified by the service request, but with a sanitized communication that does not include confidential information. In some examples, the sanitized communication may correspond to a message indicating that the communication has been sent via the alternative secure channel. In some examples, the sanitized communication may include an indication of the transmitting entity. In some embodiments, the system 101 may strip confidential information (e.g., personal health information) from the electronic composite in order to create the sanitized communication, thereby sending only a portion of the electronic composite in order to provide a sanitized indication of the electronic composite (which may, in some embodiments, correspond to the sanitized version of an initial portion of the electronic composite, such as the first sentence of the message or a portion thereof).

In cases where the service request takes advantage of the system-intelligent simplified messaging features such that the service request does not need to specify, and does not specify, a particular route, the learning engine 118A may select an appropriate route/vector as matching one or more mapped appropriate routes/vectors based at least in part on the learned data set. Then, the learning engine 118A may direct a corresponding message via the selected route, again, automatically with or without notification, or upon user acceptance, in accordance with various embodiments.

According to a precedence order of the one or more of the security protocols, when the learning engine 118A determines that there are no aspects or insufficient aspects pertinent to the service request that the system 101 has previously learned to perform the above protocol processes, the learning engine 118A may perform the payload inspection in order to determine whether or not the service request payload may include information appropriate only for higher levels of security. When no such information is detected, the learning engine 118A may enforce further security protocols according to the precedence order. However, upon a determination that the service request payload may include information appropriate only for higher levels of security, the learning engine 118A may perform one or combination of three authorization verifications in a manner disclosed herein: verification that the transmitter is authorized to transmit the particular information, verification that the receiver is authorized to receive the particular information, and/or verification that the transmitter and receiver are authorized to communicate generally. For example, the learning engine 118A may map appropriate routes/vectors and may restrict certain messages to resources assigned to a load. The adaptive system 101 may determine whether a receiver designated for a message has a need to know. Upon detecting an authorization verification failure, the learning engine 118A may reject and prohibit the communication requested by the service request, with or without notification in various embodiments. For example, if the designated receiver is not assigned to the load and otherwise has no relationship to the load, then the message may be blocked.

Thus, if an anomaly is detected that relates to one of the authorized entities, the adaptive system 101 may execute a security response protocol. An example security response protocol may include terminating all connections between the authorized entity and the enterprise. In some examples, depending on the type of authorized entity, the number of connections may be hundreds, thousands, or even more. This added level of security limits the extent to which confidential user information may be disclosed.

However, in some embodiments, the system 101 may then perform an authorization operational sequence in an attempt to authorize the transmitting entity and/or the receiving entity. This may a sequence of operations to authorize an entity. In some examples, certain ones of the operations are performed in an automated manner. In some examples, the authorization operational sequence may include receiving an authorization request from the entity that requests authorization for the entity to receive data packages. The authorization may also include determining, based on the authorization request, that the entity is authorized to receive data packages. The entity may be associated with a unique entity identifier. The authorization operational sequence may also include adding the unique entity identifier to the authorized entity list. In some examples, emails or other messages may be sent to an agent of an operator of a provider network who is responsible for coordinating the authorization of entities. The agent may use a user device (e.g., the source device or other device), software tools, and/or any suitable manual processes to obtain guarantees from the entity, perform evaluations of the entity's document handling procedures, evaluate credentials of the entity, and perform any other operations to authorize the entity. In some examples, this may include coordinating with agents of the entities. Once authorized, the learning engine 118A may enforce further security protocols according to the precedence order.

According to the precedence order of the one or more of the security protocols, the learning engine 118A may detect a mismatch of type and/or level of security indicated by one or more security attributes corresponding to the application/interface of the transmitting endpoint device, the channel by which the transmitting endpoint device transmitted the service request, and/or the channel specified by the transmitting endpoint device for transmitting a corresponding message to the intended receiver. With a detection of a mismatch, the security response protocol selected by the learning engine may be a function of the number of variables. For example, in the case that the service request payload has been detected to include information requiring higher levels of security per previous security enforcement processes, communication of the confidential information may be prohibited.

In the case of confidential information being detected and the originating application/interface is detected as not secure, a response may be sent back to the transmitter indicating that the application/interface is not sufficiently secure and prompting resending the service request via a secure applications/interface. In some embodiments, the response may cause presentation of one or more user-selectable options (e.g., electronic buttons, HTTP link/hyperlinks, URLs, etc.) to prompt a user to invoke, wake up, open, and/or otherwise activate a secure application/interface with which the endpoint device is configured, to login to the system 101, and/or download code to facilitate execution of a secure application/interface in order to resend the service request and information. Additionally, an alert regarding the use of the insecure application/interface to transmit the information may be sent to a remote administratory device.

In the case of confidential information being detected and the network used originating application/interface to transmit the service request to the system 101 is detected as not sufficiently secure, a response may be sent back to the transmitter indicating that the network which the endpoint device used is not secure and prompting resending the service request via a secure network connection. In some embodiments, the response may cause presentation of one or more user-selectable options (e.g., electronic buttons, HTTP link/hyperlinks, URLs, etc.) to prompt a user to invoke, wake up, open, and/or otherwise activate a secure network connection, to login to the system 101, and/or download code to facilitate redirecting to and/or establishing a secure network connection in order to resend the service request and information. Additionally, an alert regarding the use of the insecure network connection to transmit the information may be sent to a remote administratory device.

In the case of confidential information being detected and the channel specified by the service request to communicate the information to the intended is detected as not sufficiently secure, a response may be sent back to the transmitter indicating that the channel is not secure and prompting resending and redirecting the service request toward a secure channel. Additionally or alternatively, in the case of confidential information being detected and the application used by the intended receiver is detected as not sufficiently secure, a response may be sent back to the transmitter indicating that the application is not secure and prompting resending and redirecting the service request toward a secure application. When the learning engine 118A may identify an alternative secure route/vector for reaching the intended recipient, based at least in part on previously learned routes/vectors for the intended recipient, the learning engine may automatically reroute the corresponding message with or without notifying the transmitter, as previously disclosed. However, when an appropriate alternative route/vector is not known, the system 101 may resort to the aforementioned responses to the transmitter.

However, with a detection of a security mismatch, but where the service request payload has not been detected to include information requiring higher levels of security per previous security enforcement processes, a response may be sent back to the transmitter indicating that the channel and/or the application used by the intended receiver is detected as not sufficiently secure. The response may prompt resending and redirecting the service request toward a secure channel and/or application. In some embodiments, the response may cause presentation of one or more user-selectable options to disregard and/or override the security alert and proceed with the originally specified routing of a corresponding message via the insufficiently secure channel and/or application.

Again, when the learning engine 118A may identify an alternative secure route/vector for reaching the intended recipient, based at least in part on previously learned routes/vectors for the intended recipient, the learning engine may automatically reroute the corresponding message with or without notifying the transmitter, as previously disclosed. However, when an appropriate alternative route/vector is not known, the system 101 may resort to the aforementioned responses to the transmitter and then utilize machine learning to learn from the interactions and further develop the transmitter profile data 101B-1, the receiver profile data 101B-2, and/or the particularized pattern data 101B-3 to enable artificial intelligence handling of future interactions with the transmitter and/or the receiver as disclosed herein.

In accordance with various embodiments disclosed herein, one of the engines (e.g., the learning engine 118A) may extract a data portion from a particularized service request 134, which may correspond to a JSON payload or a payload in another suitable format. In various embodiments, one of the engines (e.g., the learning engine 118A and/or one of plurality of medium-specific controllers 118B) may parse and/or otherwise inspect the payload and ensure that payload is appropriate for the communication medium requested and/or selected by the learning engine 118A and complies with one or more standards for the communication medium.

With the extracted data portion, the learning engine 118A and/or one of the plurality of medium-specific controllers 118B may create an electronic composite according to a particular format identified as corresponding to the particular communication medium requested and/or selected by the learning engine 118A. For example, the electronic composite may be formatted according to SMS, MMS, an instant messaging, email, and/or the like protocol format corresponding to the communication medium requested and/or selected. The created electronic composite may include the extracted data portion and the destination specification identified the learning engine 118A. In some embodiments, the system 101 may include the plurality of medium-specific controllers 118B, each corresponding to a particular medium and configured to create electronic composites to transmit via the channel (e.g., based on the aggregator that is being used, which may have intermediary-specific requirements, format, language of queries/responses, error codes, validations, and/or the like). Each of the plurality of medium-specific controllers 118B may correspond to one or more of the web and/or application servers 101A-1, messaging gateways 101A-2, email gateways 101A-3, telephony gateways 101A-4, other gateways and/or other types of servers 101A-N, and may route the electronic composite to the appropriate server/gateway for transmission corresponding to the communication medium requested and/or selected.

The adaptive router subsystem 118 may include an agent engine 118C that may identify types of electronic composites and features of the electronic composites and manage bidirectional communications flows. For example, the agent engine 118C may identify when a service request requires one or more responses from the receiver. In some embodiments, a message parameter of the service request may specify that one or more responses are required. The agent engine 118C may be configured to initiate agents configured to detect messages. The agents may be specific to message type, destination entity, and/or any other suitable characteristic. The agent may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. The agent engine 118C may, in some embodiments, correspond to a bot engine 118E.

When the agent engine 118C detects that a service request requires one or more responses from the receiver, the agent engine 118C may spin up an agent to monitor for the one or more responses from the receiver of the electronic composite. The agent may be configured to wait for a certain time having a time limit to detect and receive the requested and/or anticipated response(s) based on information included with the response communication(s) that may correspond to one or more content keywords, a message parameter, a digital identifier of the receiver, a digital identifier of the transmitter, and/or an indication of the destination specification recognized by the agent engine 118C upon evaluation of the response communication(s). In some embodiments, the agent engine 118C may be part of the learning engine 118A and/or otherwise may be configured to perform similar analysis functions.

When a response is received from the receiver endpoint device, the agent may notify the learning engine 118A. The learning engine 118A and/or another engine/controller may extract the payload packet from the response communication, create an electronic composite with the extracted data portion, and routes the electronic composite back toward the transmitter endpoint device for consumption. If a response is not received before the expiration of the time limit, the agent may notify the learning engine 118A, and a notification of the lack of response may be transmitted to the transmitter endpoint device that originated the service request. In various embodiments, the time limit may be initially sent by default configuration, if the service request does not specify a time limit for the response. The notification sent to the transmitting endpoint device may cause presentation of one or more user-selectable options to extend the time limit to await for a response communication. Upon receiving an indication from the transmitting endpoint device of the selection to extend the time limit for a predetermined or user-customized time, the agent may continue to await for response that extended time. In some embodiments, the learning engine 118A may determine that particular receivers have a pattern of responding within a certain time period and may automatically adjust the initial default time threshold to include one or more of the previously observed response times for a particular receiver, and may, in some embodiments, further include a buffer time. Additionally or alternatively, the learning engine 118A may determine that particular transmitters have a pattern of extending the time periods and may automatically adjust the initial default time threshold to include one or more of the previously observed extended times for a particular transmitter, and may, in some embodiments, further include a buffer time.

The adaptive router subsystem 118 may include a queue engine 118D that may provide for intelligent queueing system features. The queue engine 118D may be configured to queue electronic composites directed to particular receivers. A queue may be managed such that, when, for example, there are ten queries for particular receiver, but an agent is still waiting for response from the first query, the other nine are staged for sending serially. Electronic composite(s) may be staged in a staging cache or other data storage 101B.

However, the queue engine 118D may detect various priorities of the electronic composites based at least in part on the corresponding service requests. Message parameters of the service requests may specify priorities. Additionally or alternatively, the priorities may be determined based at least in part on information included with the service requests that may correspond to one or more content keywords, other message parameters, digital identifier of the receivers, digital identifier of the transmitters, and/or previously learned priority information gathered by the learning engine 118A. Having determined the priorities of the electronic composites, the queue engine 118D may queue the electronic composites according to the priority order. When the queue engine 118D determines that an electronic composite that would otherwise be held in staging for sending serially to a particular receiver has a higher priority than the first query with a response pending, the queue engine 118D may expedite transmission of the higher-priority electronic composite. The expediting may include transmitting the higher-priority electronic composite without staging it, even though the aforementioned agent is still waiting for response from the first query. In some instances, the transmitting the higher-priority electronic composite may include routing it through the same communication means by which the electronic composite correspond to the first query was routed. Additionally or alternatively, the transmitting the higher-priority electronic composite may include routing it through a different communication means. For example, when the priority level of the higher-priority electronic composite meets a priority threshold, the learning engine 118A may identify one or more alternative contact options/vectors for the intended receiver, one of which may be selected for the transmission of the higher-priority electronic composites via a different destination specification and/or different channel.

Disclosed embodiments of the adaptive system 101 may be architected to support bots—universally—to integrate with different chat apps to allow different technologies to communicate via different chat sources without the client app having to know how to talk to the various chat sources/bots. Further, the system 101 may provide for adaptive application impersonation with bi-directional bot communications. The adaptive router subsystem 118 may include a bot engine 118E that may be configured to one or combination of build, configure, customize, deploy, interface with, communicate with, and/or otherwise manage bots in accordance with the features disclosed herein. A bot may be a program and/or artificial intelligence corresponding to one or a combination of a chatbot, a chatterbot, a talkbot, an interactive agent, artificial conversational entity, and/or the like.

In various embodiments, the bot engine 118E may be a part of, integrated with, or otherwise correspond to the learning engine 118A and/or the agent engine 118C, or may be separate from the agent engine 118C. In some embodiments, the bot engine 118E may be configured to build bots, which may be based at least in part on selecting bot features and functions that are indexed and mapped to bot components from a library of bot components. In some embodiments, the bot components made correspond to script components or other code components, which may be script portions or other code portions executable by a bot application corresponding to a bot. Each portion may have one or more transition point or hooks configured to interface with one or more other portions, and each may be programmed to enable one or more discrete features and functions when executed with the complete bot script by a bot application.

The bot engine 118E may allow for integration of the system 101 with different chat applications to allow different technologies to communicate via different chat sources without the endpoint device having to know how to communicate directly with the various chat sources and/or bots. The bot engine 118E may further allow the system 101 to impersonate an application with a bot. To that end, the bot engine 118E may define a bot persona for a bot and may specify responsibilities and roles for the bot, which may include specifying one or more applications communicatively coupled to the bot (e.g., 17 applications monitoring communications across organizations that may require an alert from the persona regarding critical information). Each persona may have one or more roles, and each application that gets integrated into the adaptive system 101 may have one or more roles. A client application may be mapped to a persona whose role is to provide a genus of communications. The adaptive system 101 may route messages from the application to a particular technology, where the persona is exposed to the final endpoint. As one example use case out of possible many examples, a bot may monitor space on a particular server and may be configured to detect when space on the server runs critically low so that the system 101 may alert that one or more applications communicatively coupled to bot by way of the persona that there is a low-space incident about to happen in this server.

Furthermore, the bots and personas disclosed herein may facilitate the presence intelligent features of the system 101. The bots and personas may detect when various entities are logged in to certain chat sessions, for example. Indications of the logged in statuses may be passed to the learning engine 118A. the learning engine 118A may utilize such status information in determining where a person is logged in at various times, in order to facilitate the presence intelligent features disclosed herein. Thus, the system 101 may timely reroute electronic composites to receiver entities via chat sessions in response to service requests when the receiver entities when they are detected as logged in, e.g., as logged in to particular chatrooms.

The bot engine 118E may further define interaction operational sequences for the bot. The interaction operational sequences may include messages, including queries and declarative statements, to receive and process; messages, including queries and declarative statements, to send; causal triggers for messages received and responses to provide, including responsive messages to send to chatrooms, triggered/responsive messages to send to endpoint devices (including endpoint devices originating service requests and endpoint devices to alert with critical information upon system recognition of trigger events); interaction decision trees governing the aforementioned types of messages and responses; and the like. The bots may be configured to perform keyword processing to understand input/responses of a chat conversation. In various embodiments, this may be performed in conjunction with the bot engine 118E and/or the learning engine 118A, and may be performed using a natural language processing engine included therein, with the bot providing the chat conversation for further processing for keyword identification to recognize particular communication content as triggers.

The language processing of chat conversations may identify keywords as distinctive markings and may compile the keywords and correlate the keywords with keyword criteria for the purposes of characterizing each set of one or more responses and generating correlation results. Such keyword processing may be performed in real time. The keyword criteria may include keywords identified by any one or combination of words, word stems, phrase, word groupings, and/or like keyword information. The keyword criteria may include weighting assigned to words, word stems, phrase, word groupings, and/or the like. For example, a keyword may be assigned a weight according to its significance. Increased word weights may be tied to increasing probability of the intended meaning of chat in the chat conversation. The keyword criteria may correspond to one or more keyword schemas that are correlated to various chat scenarios. Thus, in some embodiments, keywords of chat instances may be matched with one or more keyword schemas, which may be correlated to various triggers for responses by the bots. Different keyword schemas may be tailored to different contexts and may be categorized by service provider category into category-specific keyword lexicons. Category-specific tags or any other suitable means of linking, for example, via a code system, may be used to associate category-specific keyword schemas to specific categories.

In some embodiments, a keyword schema may include word buckets/sets of good words, bad words, and/or neutral words, that is, keyword information indicative of a particular trigger, keywords indicative of triggering chat, and/or keywords that are not useful as indicia. The word buckets may be tailored to each category. Within each word bucket, various words may be assigned various weights according to their significance. Such word buckets may be implemented in any suitable manner, including word lists, word tables, matrices, and/or the like. And within a bucket, keywords may be organized in a rank order and/or any editable hierarchical structure according to weight. Some embodiments may have keywords organized according to decision tree, with contingencies so that only certain combinations of keywords may be considered. For example, certain keywords may only have significance if used in conjunction with other keywords, and/or not in conjunction with others. Some contingencies may be implemented so that only a threshold cumulative weight and/or keywords need be identified to recognize trigger chat instances.

The bot engine 118E and/or the learning engine 118A may adapt over time to modify inclusions in word buckets. Certain embodiments may apply a heuristic approach to adaptation. Adaptation may be based on which words are more frequently used words in certain chatrooms. Similar chat conversations may be analyzed together to find statistical characteristics of keywords used. The keywords may be ranked to assign greater weight to the more frequently used words.

Additionally, certain embodiments may provide feedback options for chat participants and/or endpoint devices regarding responses provided by the system 101. Queries and/or user-selectable options may be provided to allow chat participants and/or endpoint devices to provide feedback information about responses provided by the system 101. The feedback may be used for training the system 101 to heuristically adapt responses, chat recognition, and/or communication profiles, and, over time, accumulate, identify, and used the feedback to process bot-gathered communications more effectively.

Figure 2:
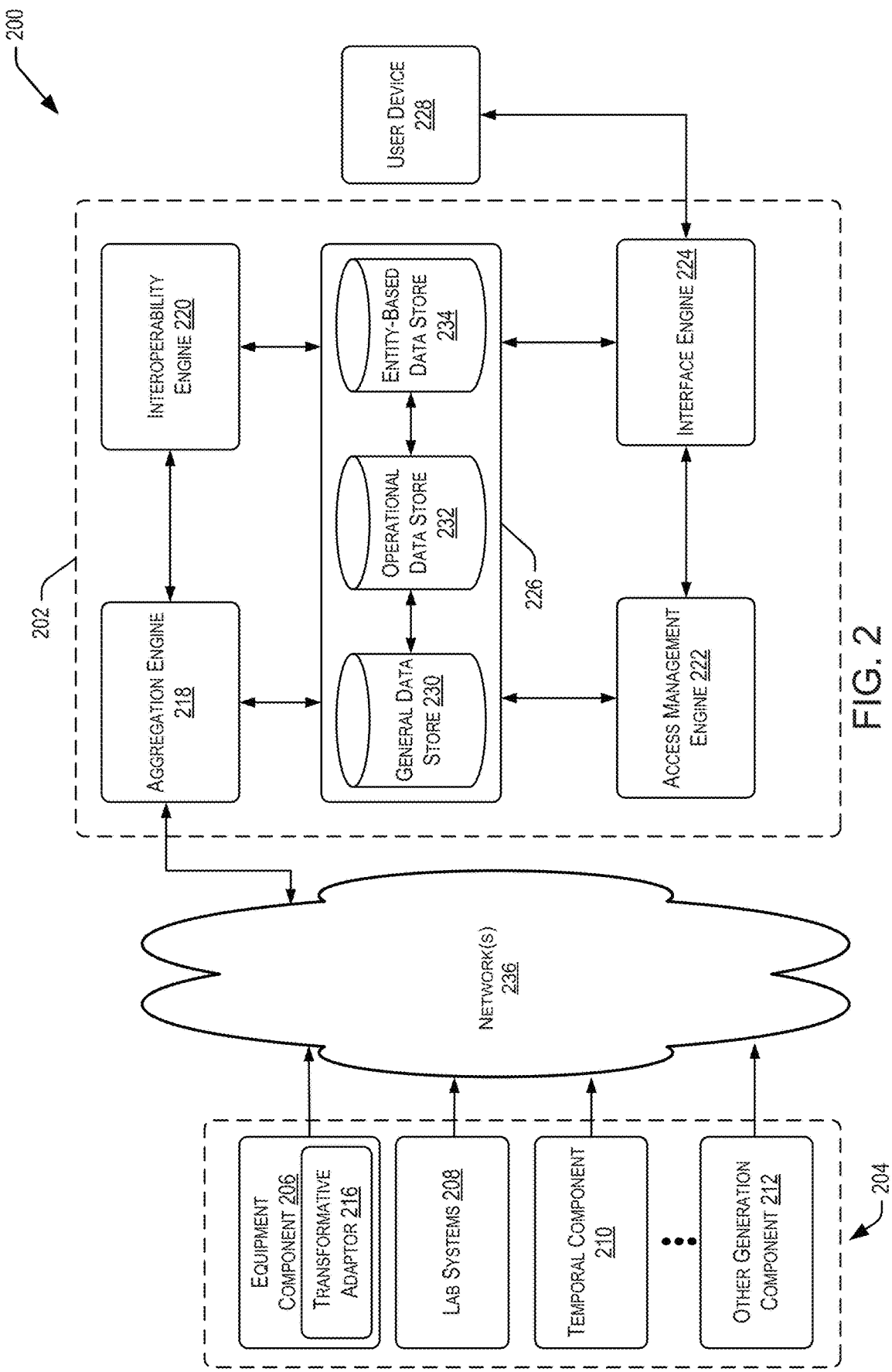
FIG. 2 is an example block diagram of certain aspects of an interaction system, in accordance with embodiments of the present disclosure.

Referring next to FIG. 2, a block diagram of an example of an interaction system 200 is shown. Interaction system 200 may include a transformative integration engine 202. Transformative integration engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation component 212. One or more generation components 204 are examples of one or more components 106 discussed with reference to other figures herein.

Generally, one or more generation components 204 may include any suitable device or system capable of generating data in the context of an interaction system. For example, the other generation component 212 may include a sensor on a door, and equipment component 206 may include a sophisticated computer-controlled laser device. In either case, each generation component generates some type of data. For example, the data provided by the sensor may be used to address security concerns or assessing heating, ventilating, and air conditioning (HVAC) costs for an institution. The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative integration engine 202 in accordance with techniques described herein may achieve this design—making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, implant, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-define or learned. Transformative integration engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative integration engine 202.

Specification component 210 may include any suitable computing devices used for operations-related purposes with respect to interaction system 200. For example, specification component 210 may be configured to schedule a resource for allocation for a particular entity during a particular time slot. Specification component 210 may monitor a schedule for the resource and may identify one or more available time slots that may be secured by a particular entity. Upon receiving a specification indication, specification component 210 may update a schedule of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative integration engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative integration engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative integration engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative integration engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, have paid a subscription fee associated with access to data store 226, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
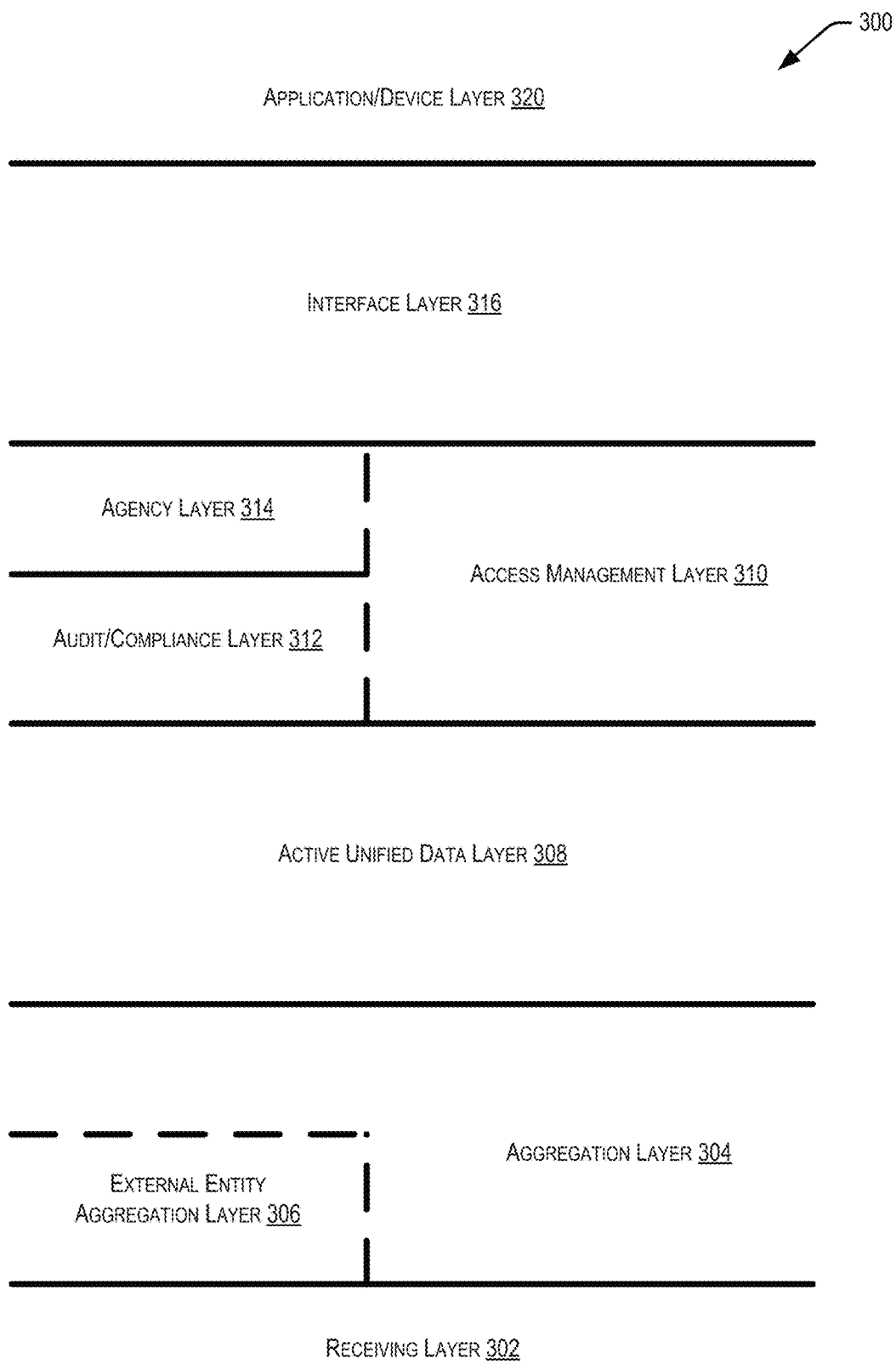
FIG. 3 illustrates a block diagram of an architecture stack, in accordance with embodiments of the present disclosure.

Turning next to FIG. 3, an architecture stack 300 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a schedule, or in any other suitable manner. In some examples, data of aggregation layer 304 may be aggregated according to input and/or rules and may aggregate across records pertaining to, e.g., a premises, entity, time period, characteristic (e.g., demographic characteristic or condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308.

Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow a governmental entity access to some elements within architecture stack 300. This may be achieved by providing the governmental entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
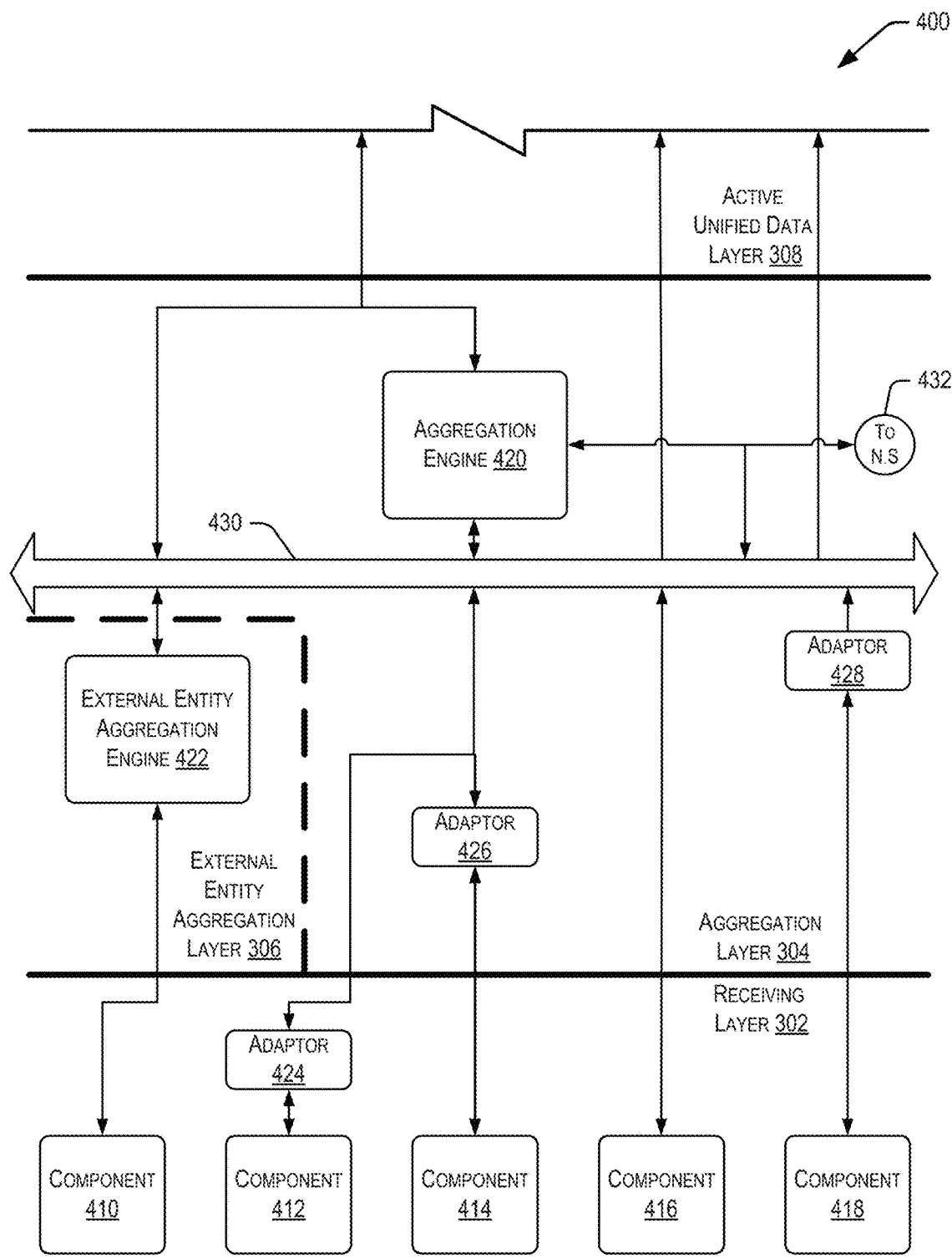
FIG. 4 illustrates a block diagram of a portion of the architecture stack, in accordance with embodiments of the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
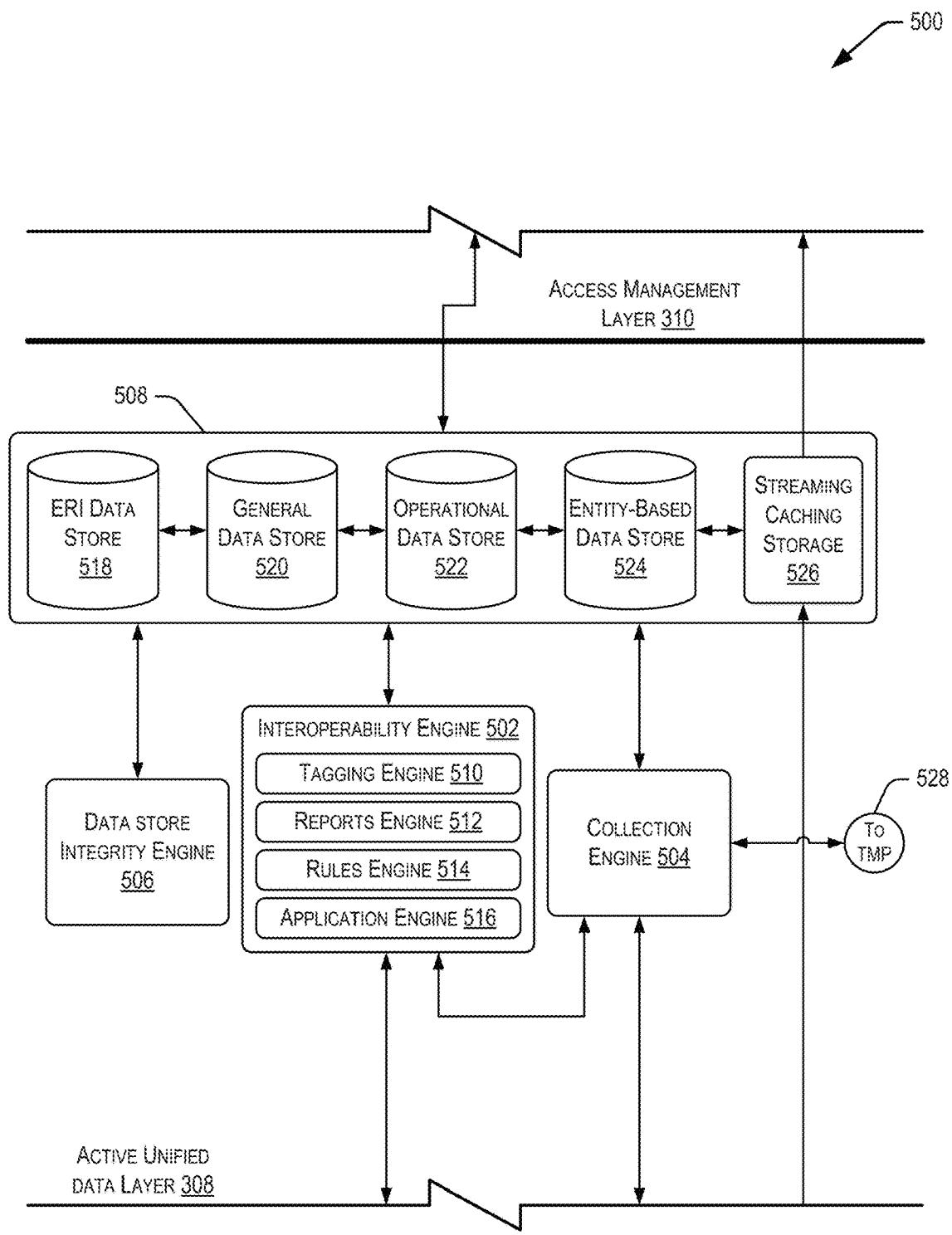
FIG. 5 illustrates a block diagram of a portion of the architecture stack, in accordance with embodiments of the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used to uniquely identify the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
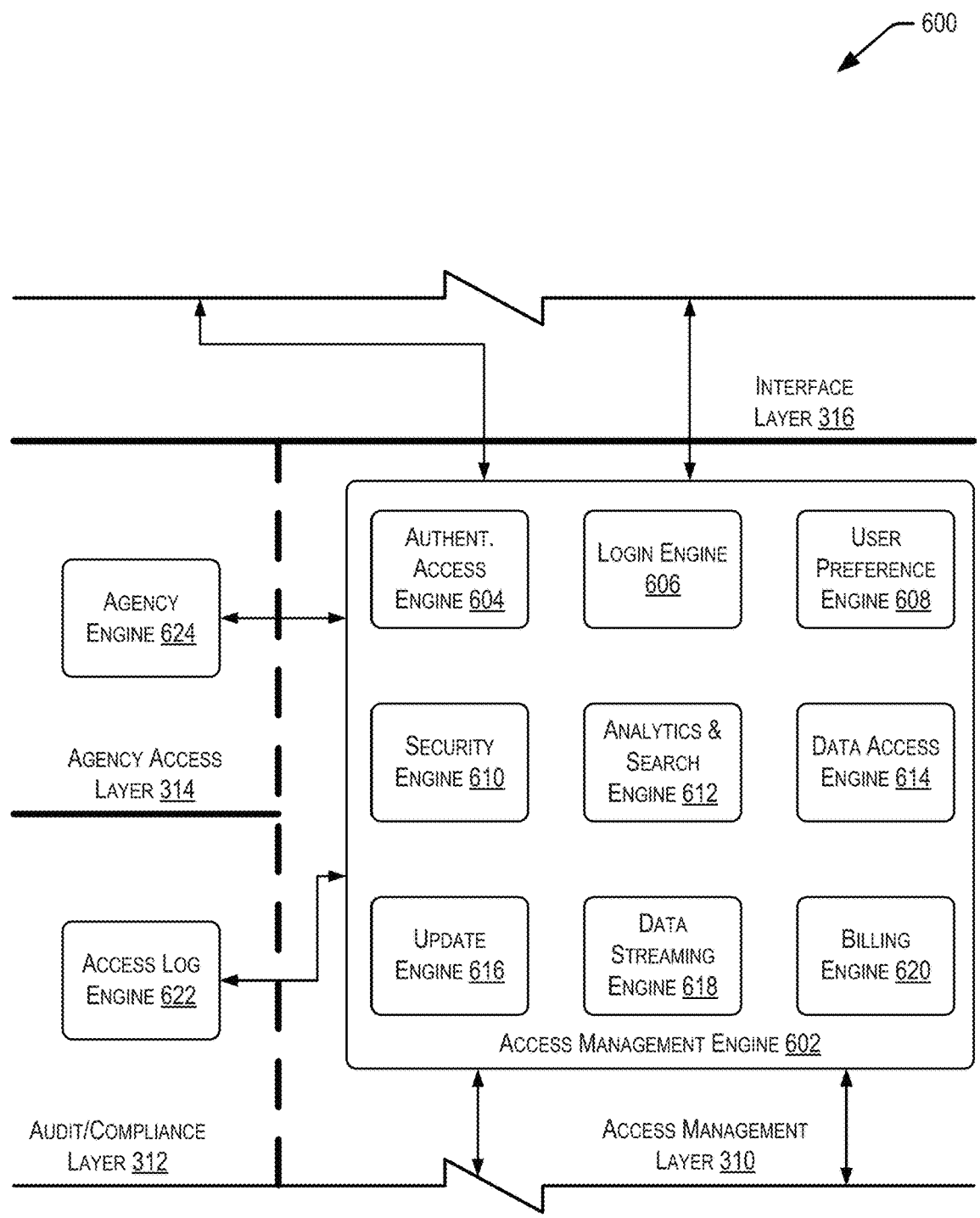
FIG. 6 illustrates a block diagram of a portion of the architecture stack, in accordance with embodiments of the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative integration engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by a government agency and/or to provide report instances of defined types of events. Thus, in some examples, a government agency uses agency engine 624 to collect data pertaining to compliance of the interaction system with one or more statutes or regulations. In some examples, a university is an agency that uses agency engine 624 to collect data pertaining to one or more studies. In some examples, agency engine 624 may identify one or more entities (e.g., governmental agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
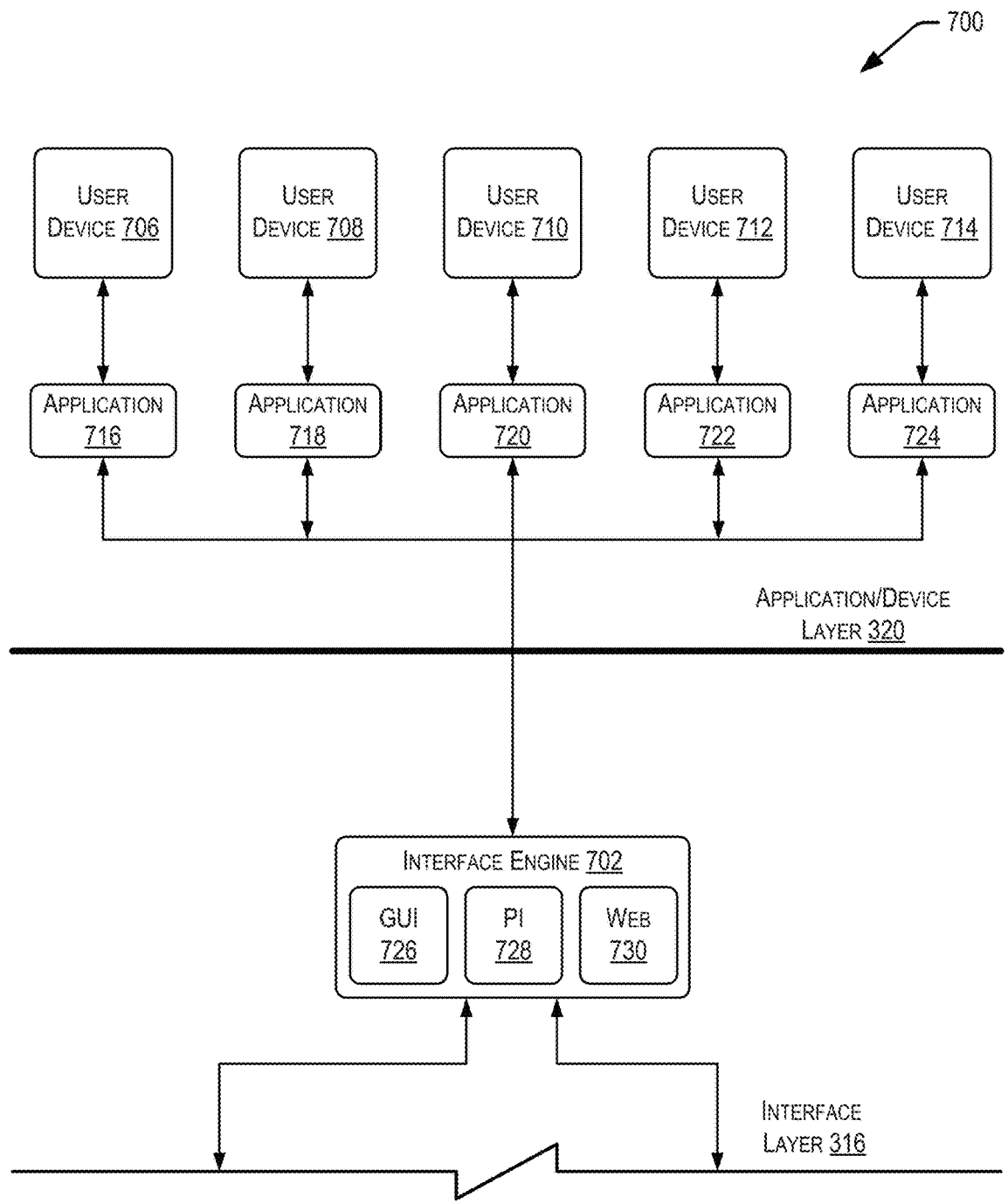
FIG. 7 illustrates a block diagram of a portion of the architecture stack, in accordance with embodiments of the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are customized for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or actions, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are customized to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and forecasting. Such operational information may include data because such data may impact operations, programming, forecasting, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
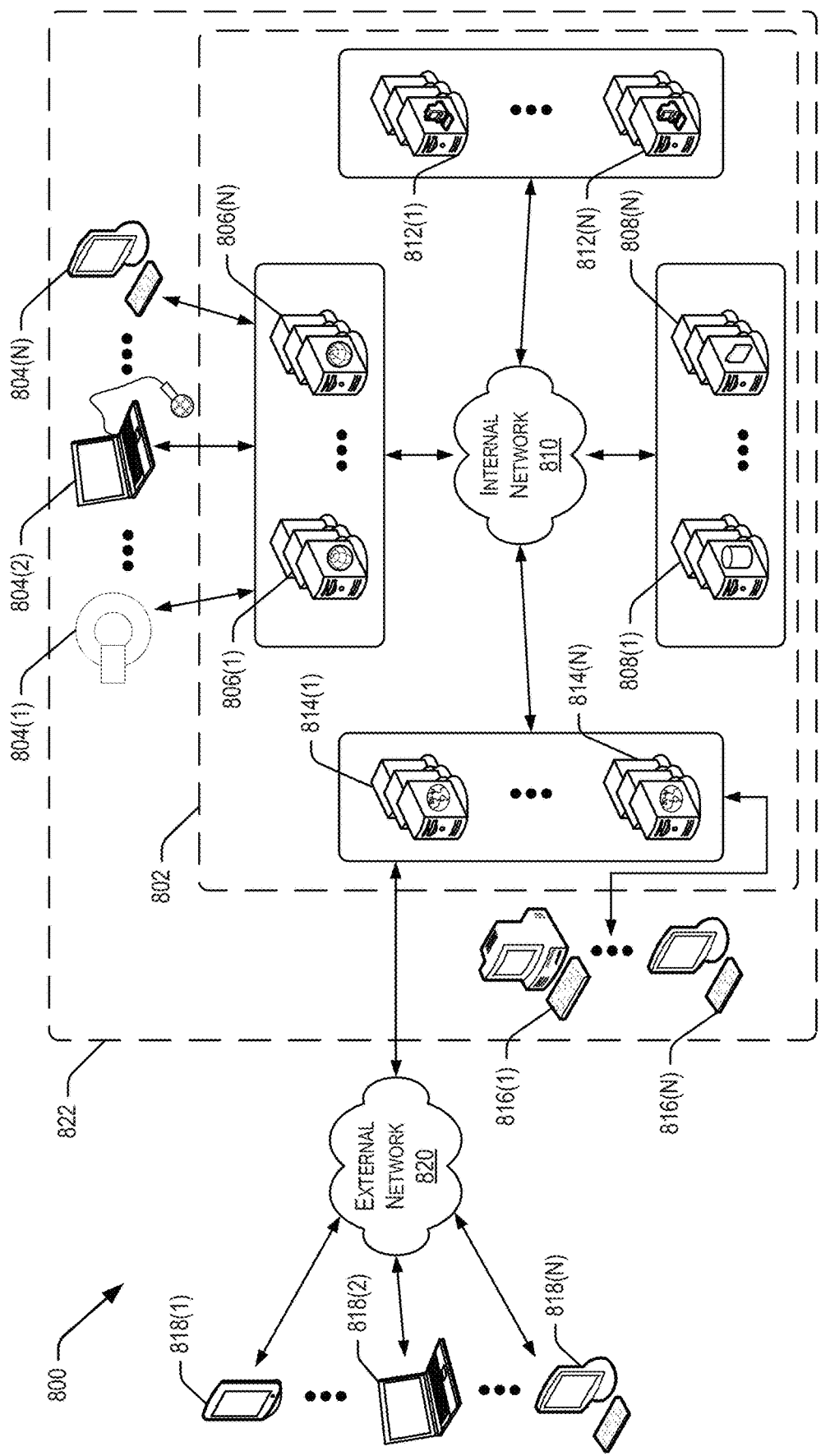
FIG. 8 illustrates a block diagram of an interaction system, in accordance with embodiments of the present disclosure.

Turning now to FIG. 8, an interaction system 800 is shown in accordance with an embodiment of the present disclosure. Interaction system 800 may include an internal system 822 including a transformative integration engine 802. The transformative integration engine 802 is an example of transformative integration engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

Various embodiments of the adaptive system 101 may facilitate monitoring performance metrics of resource-allocation systems. In various instances, resource-allocation systems may or may not be external to the premises. A multi-tier resource and load orchestration system (herein referenced as "load orchestration system") may include a process specification system configured to coordinate with resource-allocation systems to allocate resources to perform specified processes with specified loads. In some embodiments, the adaptive system 101 may include the load orchestration system. In some embodiments, the adaptive system 101 may be separate from the load orchestration system. Thus, for example, the load orchestration system or components thereof may correspond to one or more endpoint devices and one or more applications that interact with the adaptive system 101 as disclosed herein. Similarly, in various embodiments, the adaptive system 101 may include the resource-allocation systems and/or may be separate from the resource-allocation systems, which may correspond to one or more endpoint devices and/or external entities that interact with the adaptive system 101 as disclosed herein.

A resource, for example, may be a device, such as equipment, an agent, and/or the like. In some embodiments, the load orchestration system and/or another endpoint device may send a request 134 to the adaptive system 101 for transfer that identifies a load-acquisition location, a load-acquisition time, and/or a destination. In some embodiments, the request may be made via a chat window, and the bot of the adaptive system 101 may recognize request. In response, the adaptive system 101 may transmit a composite to the resource-allocation system that corresponds to a request. In some examples, such requests may be transmitted via a bot, such as a chatbot, with a corresponding persona. The resource-allocation system may accept the request, which may be detected by an agent/bot, and the performance of one or more operations assigned by the resource-allocation system may then be monitored by the adaptive system 101, with one or more agents/bots detecting data via one or more geolocation techniques, so as to identify, for example, whether the resource was on time for load acquisition and/or for operation completion, and/or whether the resource was suitable.

In a similar manner, the load orchestration system and/or other endpoint devices may send requests 134 to the adaptive system 101 for other types of resources corresponding to various operations, and the adaptive system 101 may transmit corresponding composites to a resource-allocation system. A request may include, for example, one or more operation-performance locations, one or more operation-performance times, and/or an operation duration. In some examples, such requests may be transmitted via a chat session by an agent/bot of the system 101, such as a chatbot, with a corresponding persona. The resource-allocation system may grant the request, which may be detected by an agent/bot, and the performance of one or more operations assigned by the resource-allocation system may then be monitored by the adaptive system 101, with one or more agents/bots detecting data via one or more geolocation techniques, so as to identify, for example, whether the resource was on time for operation performance and/or for operation completion, and/or whether the resource was suitable.

A metric for the resource-allocation system may be adjusted based at least in part on the performance. Such metrics may be gathered by the adaptive system 101 (e.g., the learning engine 118A) and/or the load orchestration system. In some embodiments, metrics may then subsequently be presented to users and/or used to bias selection amongst different resource-allocation systems to which requests are sent. In some embodiments, metrics may be used to adjust particularized composites transmitted by the adaptive system 101 that may, for example, resource program, among other things.

Certain embodiments may provide for orchestration to coordinate and monitor load transfers (e.g., load transfers or resource transfers) within a site. The adaptive system 101 and/or the load orchestration system may receive multiple transfer requests from endpoint devices and process the transfer requests in order to develop a transfer program (which may be a multi-transfer program) as part of a particularized composite.

Certain embodiments may provide for integral interaction of the load orchestration system and one or more resource-allocation systems by way of the adaptive system 101. The load orchestration system may identify a load (e.g., a load or a resource) and retrieve compiled data corresponding to the load. Based at least in part on the identified load and the retrieved compiled data, the load orchestration system may determine required resource specifications. In some cases, the required resource specifications may specify the resource needed to transfer the load. In some cases, the required resource specifications may specify a resource for the load. The load orchestration system may utilize the specifications to select between multiple resource-allocation systems and/or to include in requests to certain resource-allocation systems via the adaptive system 101. The load orchestration system, via the adaptive system 101, may further coordinate assignments of specific operations for the identified load to a selected resource-allocation system.

Certain embodiments may provide for dynamic monitoring of resource and operation performance statuses. In some embodiments, the resource-allocation system may provide updates to the adaptive system 101 on the real-time progression information on performing, and/or completing performance of, one or more operations with respect to the identified load, which updates may be gathered by agents/bots of the system 101. For example, a real-time location and/or a determined delay may be sent from a location data source and detected by the system 101. Based at least in part on the updates and/or or more limits specified by the load orchestration system, the adaptive system 101 and/or resource-allocation system may adjust other operations with respect to the identified load. The load orchestration system may further coordinate via the adaptive system 101 (e.g., one of the bots of the system 101) with a load manager to ensure that the load may be prepared for load acquisition at a specified load-acquisition time. In some examples, based at least in part on the updates gathered by the system 101 and/or the load orchestration system, the system 101 may transmit composites with status notifications to entities through secure channels (e.g., the iMobile secure message functionality) of the adaptive system 101 indicating a allocated load transfer.

Certain embodiments may provide for resource coordination processing for resource requests 134. In response to a resource request 134, the adaptive system 101 may transmit a corresponding request (e.g., via a bot and/or other communication means disclosed herein) for a resource to perform one or more operations may be sent out to a set of resource-allocation systems. In various embodiments, the request may include a requested load-acquisition time and/or time window for load acquisition, and an option to grant the request or an option for load acquisition at a particular time (e.g., different than the acquisition time or one within the window). When the system 101 transmits such requests the a bot and corresponding persona, such requests could be in iterative form, with a bot breaking down such requests into subcomponents with one or more queries asked by the bot being particularized to one or more of the subcomponents. Responses from resource-allocation systems may be ranked by the adaptive system 101 according to response time, ability, and/or extent to which the resource may meet a requested load-acquisition time and/or performance metrics of the resource-allocation system. In some instances, a particular resource-allocation system may be selected by the adaptive system 101 and/or the load orchestration system to handle the request based at least in part on these parameters and/or rankings.

Likewise, with such a request, the adaptive system 101 may transmit a corresponding request (e.g., via a bot and/or other communication means disclosed herein) to a transfer resource subset. For example, when an urgent request is entered, the urgent request may be sent through the bot persona to the transfer resource subset location, which may notify that an urgent message was sent. The notification may include a prompt to self-assign or execute on this request. In some embodiments, the prompt may include one or more user interface options. Then, a notification may be sent to alert that the resource has self-assigned this case and specify preparations of the load for load transfer.

Certain embodiments of the adaptive system 101 may monitor location data of resources. Various embodiments may modify metrics for resource-allocation entities, for particular resources, for particular resource types, for particular operation types, and/or the like based at least in part on the location data. For example, the adaptive system 101 may identify, by way of the monitoring bots/agents, whether a resource has arrived at a destination location or an intermediate location by a target time, an extent to which an actual or determined time differed from the target time, progression information on a destination location, and/or the like. The adaptive system 101 and/or the load orchestration system may identify a resource-allocation entity associated with the particular resource and adjust a metric of the resource-allocation entity based at least in part on the data. The metrics may subsequently be used for assignments of operations to various resource-allocation entities. For example, operations may be preferentially presented by the adaptive system 101 to or assigned to resource-allocation entities with high metrics. In various embodiments, resource-allocation entities may correspond to various resource-allocation systems, agents, and/or resources. In some embodiments, one or more resource-allocation systems may be systems of the interaction system 100 that allocate certain resources of the interaction system 100. In some embodiments, the adaptive system 101 and/or the load orchestration system may include one or more resource-allocation systems.

A variety of geolocation techniques may be used to locate a resource and a load based at least in part on data sent from devices to the adaptive system 101, which data may be gathered by the system's bots/agents in some embodiments. For example, a device may receive signals from a plurality of sources, such as global positioning system (GPS) satellites, cell phone towers, or Wi-Fi access spots. Data from the signals (e.g., identifying a source location and/or being indicative of a signal latency) may then be used to calculate a location of the device. Navigation systems may use such location estimations and identified destination locations to present information such as a route to arrive at a destination and/or an expected ready state time. While the information may be extremely useful to a user near the device, other parties may also have high interest in the data.

As additional examples, in various embodiments, RFID chips, RuBee chips, and/or the like may be on wristbands, on beds, identification badges, etc. in conjunction with exciters located throughout the site. Location affinities vary with the type of monitored resources such that varying desired levels of accuracy are required for particular resources. The desired levels of location accuracy may vary. For example, a level of affinity for monitoring equipment may not be as important. Equipment location may only require location accuracy within a few meters to, say, identify one or two sections in which the bed may be located. By contrast, a location of the load may require accuracy of location to be within a predetermined distance to identify the exact section and section partition in which the load may be located. Resource locations may be compared against programs for the resources, say a timetable or program for load requiring certain equipment included a particularized composite, to ensure proper matching against the load program. Mismatches may be flagged. Additionally, location and time metrics for various resources and loads may be collected and processed. The analysis of the metrics may indicate traffic pain points, which units have the most requests for resources, and/or the like.

In some embodiments, a allocator, which may be a component of the adaptive system 101 and/or the load orchestration system, may generate and/or access a process definition to be assigned to a resource-allocation system. A process, as used herein, may include or otherwise correspond to an operation. An operation may include, for example, transferring a load from a first location to a destination, modifying an compiled data so as to reflect a current or predicted presence (or lack thereof) of a load in a system, preparing a load for transfer, releasing a load from a system, applying a resource to a load, and/or the like. Each process may be associated with one or more performance times, which may include, for example, an absolute time, or time period at or during which (for example) it may be desired that part or all of the process may be to be completed. For example, it may be desired that a resource for a load at a time within a target time period.

In some embodiments, the allocator may generate a first signal that indicates that the system may be granting options to perform the process. The first signal may include the target time. In some examples, a user may ask in chat window for one or more transfer options, say, for example, the next available transfer option, and the bot that the adaptive system 101 has running on that window may recognize the query. Responsive to the signal/query(s), the adaptive system 101 may transmit a request, directly or indirectly via the load orchestration system, to each of one or more resource-allocation systems, which are configured to control resources capable of performing processes. By way of example, the adaptive system 101 may ask in respective chat windows for entities of the one or more resource-allocation systems if resource X is available at target time Y. Then, the adaptive system 101 may receive respective responses, e.g., via the chat windows. In some cases, the adaptive system 101 may receive a respective signal from each of a subset (e.g., an incomplete or complete subset) of the set that may include a provisional grant of an assignment of the process. Thus, each response may correspond to indication that a resource managed by the associated resource-allocation system may be available to perform the process in accordance with the target time. In some embodiments, the adaptive system 101 may relay the responses to a allocator. The adaptive system 101 and/or the allocator may then select a resource-allocation system to which the process may be assigned, and the adaptive system 101 may transmit another signal to the selected system that may be indicative of the assignment.

In some embodiments, the adaptive system 101 and/or the allocator may select between resource-allocation systems with regard to identifying systems to receive the first signal and/or to identifying a system to be assigned the process. This selection may be biased based at least in part on a respective metric of each of one or more systems. The metric may be based at least in part on performance characteristics of previously assigned processes, such as whether a particular portion (or all) of a process was completed by a target time or within a target time (e.g., time window). The same or a different metric may also relate to, for example, a current or previous delay or reliability of responding to indications of grants of availabilities for processes or assignments of a process. In a similar manner, the adaptive system 101 and/or the allocator can, in certain embodiments, select between particular resources based at least in part on a respective metric of each of one or more resources, which may be used to bias the selection.

In some instances, the adaptive system 101 and/or the allocator further identifies a type of process-performing resource (e.g., an operation-performing resource) suited to handle a particular process by, e.g., identifying a characteristic of a load in the process and mapping the load characteristic to a resource type. For example, an identifier of a load to be in a process may be used to retrieve an compiled data that associates the load identifier along with an indication as to whether any particular capabilities are required for appropriate performance of the process. The selection (regarding which system(s) are to receive the first signal and/or which system may be assigned the process) may further be based at least in part on data indicating which systems manage at least one resource of the identified type. Once a process has been assigned to a resource-allocating system, the adaptive system 101 and/or the allocator may maintain communication with the resource-allocating system so as to monitor data pertinent to actual or expected progression of completion of the process. This progression information may reflect how timely particular resources were positioned and/or prepared to grant loads of assigned processes.

Certain embodiments may provide for the adaptive system 101 communicating a transfer program to expose pertinent information about transfers to a load or another user. For example, the adaptive system 101 may transmit a load's timetable to the load and a manager. Status notifications could be sent from the adaptive system 101 to the load device to update status regarding timetable, ETA, etc.

Figure 9:
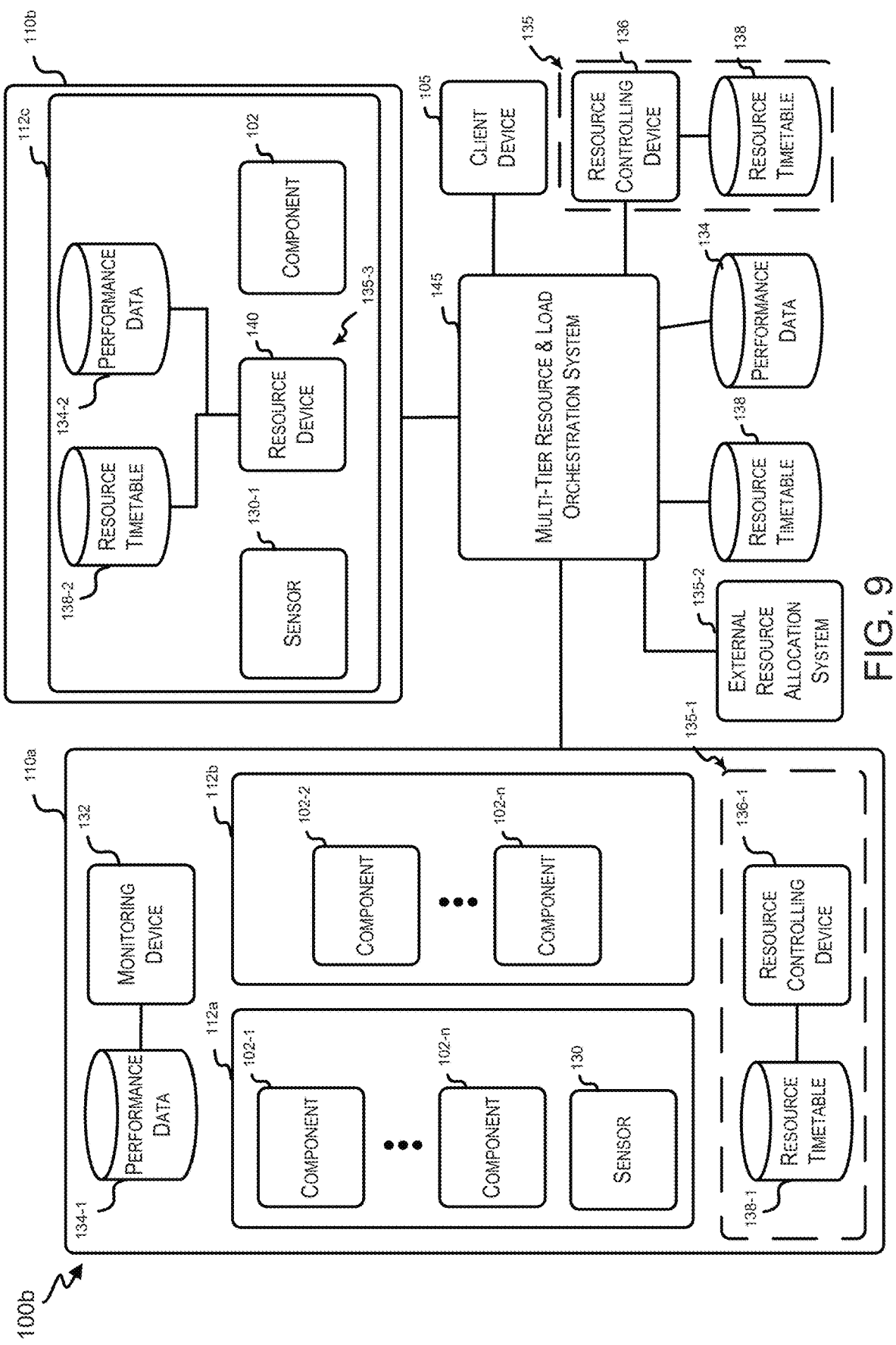
FIG. 9 illustrates a block diagram of an interaction system of an interaction system, in accordance with embodiments of the present disclosure.

Referring next to FIG. 9, illustrated is a block diagram of an interaction system 101-3 of the interaction system 100, in accordance with certain embodiments of the present disclosure. In various embodiments, the interaction system 101-3 may be entirely or partially included in the adaptive system 101 or may be entirely or partially separate from but communicatively coupled with the adaptive system 101. Generally, in the interaction system 101-3, data may be generated at one or more of the system components 102 and/or the user devices 104. The depicted instance shows two sites 110a, 110b. Other embodiments may include any different number of sites. In one instance, each of the sites 110a, 110b corresponds to or may include one or more premises. In another instance, the sites 110a, 110b may correspond to sections of a presmises. Each site 110 may include one or more units 112. In the depicted instance, a first site 110a may include two units 112a and 112b, and a second site 110b may include one unit 112c.

Each unit 112 may correspond to a particular space (e.g., as defined by geographic coordinates, altitude, a floor, a section number, etc.). Units within a site (e.g., 112a and 112b) may be geographically separated from each other, such as being within or being different sections. In one instance, each of at least some units 112 within a site may be of a same or similar type; may be configured for a same or similar type of use and/or may have one or more same or similar specifications or characteristics (e.g., dimensions, sizes, or intra-unit components). In one instance, each of at least some units 112 within a site may be of different types, may be configured for different types of use and/or may have one or more different specifications or characteristics. In one instance, a unit (e.g., each of one, more, or all of units 112a-112c) may be an operating section.

Within each unit may be one or more components 102 and/or one or more sensors 130. In various embodiments, a given component 102 and/or sensor 130 may, or may not, be fixed in place (i.e., stationary), restrained to limit mobility or fully movable. A component 102 may include, for example, an anesthetic machine, operating section table, light or monitor stand (e.g., that may include one or more displays to display sensor data). A component 102 may be configured to be used by an operator or user.

A sensor 130 may include, for example, a sensor configured to monitor a characteristic of an ambient environment (e.g., motion, light, temperature or humidity) or a characteristic of a load (e.g., a heart rate, blood pressure or oxygen). In one instance, a sensor 130 may be a sensor coupled to a component 102. For example, a sensor 130 may be configured to detect whether an added weight has been placed on part of a component. As another example, a sensor 130 may be included within an electronic tag reader component so as to detect electronic tag signals (e.g., a RFID signal, RuBee signal) from the electronic tag/transponder, which may be excited by signal emitted from an antenna of the electronic tag reader component. As yet another example, a sensor 130 may be included within an equipment-monitoring component so as to detect equipment tags. As still another example, a sensor 130 may include a receiver to receive signals from one or more signal sources (e.g., GPS satellites or Wi-Fi access points) to enable identifying a location of a device coupled to or including the sensor.

A component 102 and/or sensor 130 may be configured to transmit electronic communications to one or more other electronic devices, which may include transmitting requests 134 to the adaptive system 101 upon trigger events as disclosed herein. The electronic communications may be transmitted to the adaptive system 101 as requests 134, for example, upon detecting a new type of signal (e.g., detecting a presence of a new device); at regular times or intervals; upon receiving a request; and/or upon detecting that a transmission condition has been satisfied. The electronic communication may be transmitted to a device that may be near or remote from the component and/or sensor. The electronic communication may include (for example) sensor-collected data, inputs received at a component, an indication that an event has been detected, an indication that a transmission condition has been satisfied, an identifier of the component or sensor, and/or a location of the component or sensor. The electronic communication may be transmitted, for example, over a wireless network, Wi-Fi network, short-range network, Bluetooth network, local area network, and so on, as disclosed with various embodiments herein.

A site 110 may also include a monitoring device 132, which may monitor a use characteristic of a resource (e.g., a unit or component). The use characteristic may include, for example, when, how or by whom a resource may be being used. In various instances, monitoring device 132 may or may not be located within a unit 112 and/or site 110. In some instances, monitoring device 132 may be configured to receive input (e.g., from an authorized user), which may indicate a use characteristic (e.g., that a allocated or unallocated use may be beginning or has ended, a time that a use has started or completed, an entity engaged in a use, and so on).

In some instances, the monitoring device 132 may be (e.g., via a wireless or wired connection) connected to one or more components 102 and/or one or more sensors 130. Such connections may enable monitoring device 132 to calculate a usage characteristic. For example, one or more intensity values (or a processed version thereof) from a light sensor or motion sensor may be compared to a boundary value, and it may be determined that a unit may be not being used if the value(s) are below a boundary value. As another example, it may be calculated that a unit may be in use so long as a particular type of component may be detected as being within the unit. As yet another example, it may be calculated that a unit may be in use when signals from a badge reader indicate that at least one person remains in the unit.

The monitoring device 132 may manage and update performance data store 133. Performance data store 133 may include performance data for, e.g., particular resource-allocation systems, particular resources, data resource types, components, units, sites, entities (e.g., clients), and/or use types. The performance data may include historical performance data (e.g., efficiency, timeliness, transitions times, duration, time, use type, etc., of one or more uses) and/or statistics based thereupon, and/or any other type of performance data suitable for embodiments disclosed herein. Thus, for example, performance data 134 may indicate, for a unit, use type, and client, an average and variability of a duration of use of the unit by the client for the use type. Additional examples are disclosed further herein. Performance data store 133 may, but need not, be part of monitoring device 132. In some instances, performance data store 133 may be remote from monitoring device 132, one or more units, one or more components and/or one or more sites to which it pertains. In one instances, performance data store 133 may be in the cloud.

The interaction system 101-3 may entirely or partially include and/or be communicatively coupled to one or more resource-allocation systems 135. In some embodiments, a load orchestration system 145 may include one or more of the resource-allocation systems 135. In some embodiments, one or more of the resource-allocation systems 135 may correspond to third-party resource-allocation systems 135-2. A third-party resource-allocation system 135-2 may be in control of certain resources external to the sites 110. Further, the third-party resource-allocation system 135-2 may be in control of any other resources external to the sites 110 (e.g., equipment).

In some embodiments, one or more of the resource-allocation systems 135 may include controlling devices 136. Each controlling device 136 may manage and update a resource timetable for one or more resources (e.g., component or unit). The timetable may indicates that particular blocks of times have been assigned to (or held for) particular entities or uses and/or that other particular blocks of times remain available for assignment. An assigned block may include or may be associated with one or more buffer time periods, such as a buffer time period to prepare a resource and/or a buffer time period to restore (e.g., clean) a resource.

In one instance, a controlling device 136 may be located within a site or unit that may include, controls or may be a resource pertaining to a resource timetable. In one instance, a controlling device 136 may be located remote from a site or unit that may include, controls or may be a resource pertaining to a resource timetable. In some instances, a single resource device 140 may act both as a monitoring device 132 and controlling device 136. In some instances, a single resource-allocation system 135 may act both as a monitoring device 132 and controlling device 136.

The controlling device 136 may be configured to locally detect user input or to receive communications that identify user input, where the user input may identify a parameter for the resource timetable and/or a request. In some embodiments, the user input may be entered via a chat session, be recognized by one of the bots of the adaptive system 101 which, in turn, may transmit corresponding communications to the load orchestration system 145. In some embodiments, the user input may be transmitted via the request 134 to the adaptive system 101 which, in turn, may transmit corresponding communications to the load orchestration system 145.

As one example, one or more detected parameters may identify a start time, end time, duration, entity, or client and/or use type (e.g., surgery or procedure type) for a time-block assignment. The controlling device 136 may then execute a verification process that a time block consistent with the parameter(s) may be available within a timetable and may generate an assignment of the time block to the client and/or for the use type. Generating the assignment may include updating a resource timetable data store 138 (e.g., which may be included within and/or remote from controlling device 136) so as to reflect the assignment and/or change an availability status of the assigned time period. Generating the assignment may also include or may trigger transmitting a communication to another device (e.g., a client device 105 or load orchestration system 145) which may, in some embodiments, be transmitted by the adaptive system 101 consequent to reception of a request 134 corresponding to the assignment and/or bought recognition of chat messaging corresponding to the assignment. The communication may identify one or more parameters of the assignment.

As another example, a request may include a request to identify general availabilities that correspond to identified times. As yet another example, a request may include a request to identify time periods available for a particular entity, which may include general availabilities and time periods being held for that entity. As yet another example, the monitoring device 132 may receive a communication that identifies one or more parameters for a proposed assignment. The monitoring device 132 may present information corresponding to the proposed assignment via a user interface and may detect input indicating whether it has been granted. If so, the assignment may be generated. If not, a response communication may be transmitted indicating this lack of granting, which may also include one or more other time blocks proposed for assignment. Again, the communications may be brokered by the adaptive system 101 in accordance with the features disclosed herein.

The load orchestration system 145 may communicate with one or more: the adaptive system 101, and other elements directly or indirectly via the adaptive system 101 such as components 102, client devices 105, sensors 130, monitoring devices 132 and/or controlling devices 136. The load orchestration system 145 may itself manage and/or update a performance data store 133 and/or resource timetable data store 138. In some instances, part or all of one or both of these data stores may mirror other corresponding data stores (e.g., located at and/or controlled by devices at one or more sites). For example, the load orchestration system 145 may receive periodic communications (e.g., that may, but need not, be responsive to requests for such) from one or more controlling devices 136 and/or monitoring devices 132 that identify an update of a timetable associated with a particular site, unit or resource or an update of usage data associated with a particular entity, use type, site, unit or resource. The load orchestration system 145 may update a corresponding data structure in a mirrored resource timetable data structure and/or usage data structure.

In one instance, the load orchestration system 145 may communicate with an independent server or device that controls resource timetables (e.g., by receiving communications from a plurality of controlling devices controlling individual resource timetables and by updating an aggregated data structure to reflect current assignments and availabilities). Such communications may enable the load orchestration system 145 to efficiently query multiple resource timetables and/or identify availabilities.

The load orchestration system 145 may facilitate handling of assignment requests, timetable management, and/or resource assignments. For example, the load orchestration system 145 may receive an electronic request, directly or indirectly via the adaptive system 101, from a client device 105 to generate an operation assignment. Assigning a client-associated operation to a resource may include, for example, reserving a space and/or resource usage for the client for a designated time period such that the client may perform an operation at the space during the designated time period. The client device 105 may correspond to a user device. The client device 105 may be configured to transmit and receive communications over a network, such as over a Wi-Fi network and/or short-range network. In various instances, a client may be associated with multiple client devices 105 or a single client device 105. The client device 105 may include a device configured to receive user input that identifies specification constraints and/or preferences for the electronic request. Each client device 105 may be associated with additional data that may be added to a request (e.g., before transmission or after receiving the request). The electronic request may, but need not, include or be associated with one or more parameters, such as a time or time period, geographic location (e.g., of a client device or requested unit or resource), use type, and/or operation-assignment duration.

The load orchestration system 145 may query a local or remote data store to identify usage data associated with at least one of the parameters. For example, the query may be to identify a maximum and minimum time of previous uses associated with a client and a use type corresponding to the request. As another example, the query may be to identify a percentage of instances in which a usage duration of a unit exceeded a requested usage duration for a particular client corresponding to the request. As yet another example, the query may be to identify all usage durations associated with a particular use type and site corresponding to the request and with a recent time period, so as to enable the load orchestration system 145 to generate a use statistic (e.g., a median use time).

Based at least in part on the usage data, the load orchestration system 145 may determine whether and/or how to transform the request. For example, if usage data indicates that an actual usage time may be likely to exceed a requested usage time, the requested usage time may be transformed into a new requested usage time based at least in part on the usage data. The new requested usage time may then be used to identify any availabilities in resource timetables that sufficiently correspond to the request. A determination as to whether an actual usage time may be likely to exceed a requested usage time may include determining whether an actual usage time has exceeded a requested usage time for at least a boundary value percentage of past instances or determining whether a statistic generated based at least in part on actual usage time exceeds a statistic generated based at least in part on requested usage time (e.g., an average or median time). Thus, in various instances, a requested usage time may be transformed into a new requested usage time in all instances or in a conditional manner.

A new requested usage time may be identified as corresponding to a usage statistic. For example, a new requested usage time may be identified by identifying an average (or median or percentile mark) extent to which previous requested usage times differed from corresponding actual usage times and factoring a requested usage time of the present request by the average. As another example, a machine-learning technique (e.g., a neural network) may be used to generate an explicit or hidden relationship between inputs (e.g., request parameters and/or resource timetables) and a new requested usage time. As yet another example, a fixed relative (e.g., 15%) or absolute (e.g., 30 minute) addition may be added to the requested usage time when it may be determined that the requested usage time may be to be transformed.

The load orchestration system 145 may then facilitate assigning a resource in response to the request. The facilitation may include generating and transmitting a transformed request to one or more controlling devices 136 directly or indirectly via the adaptive system 101. In some instances, the transformed request may include modified and/or additional parameters as compared to a request received from a client request. For example, a transformed request may include a request with a new requested usage time.

The facilitation may include identifying an availability in a resource timetable for the request. For example, the load orchestration system 145 may query a resource timetable data store 138 that may be local to and/or controlled by the system to identify availabilities in a timetable of a resource that would correspond to the request (e.g., and transformed usage data). If multiple corresponding availabilities are identified, the load orchestration system 145 may (in some instances) select a single availability based at least in part on a selection technique (e.g., to bias or select based at least in part on how soon the availability may be, how geographically close the resource may be to a location associated with the electronic request, a client preference, and so on). Whether a single availability or multiple availabilities are identified, the load orchestration system 145 may transmit a communication to a controlling device 136 that identifies information associated with the request and the availability(ies) and/or a communication to client device 105 that identifies information associated with the availability(ies) (e.g., a time, resource identifier, resource location, resource specification, etc.).

The one or more controlling devices 136 (e.g., to which a transformed request may be transmitted and/or for which timetables are considered to identify request-corresponding availabilities) may include, for example, a device corresponding to each of one or more specifically identified resources in a request from a client, a device corresponding to each of one or more resources satisfying a location criterion (e.g., being located within a defined absolute or relative distance from a location associated with the request or client device), a device corresponding to each of one or more resources having a specification corresponding to an operation type (e.g., usage type) associated with the request, a device corresponding to one or more entities having an affiliation matching an affiliation associated with the request, and so on.

The interaction system 101-3 facilitates coordinated monitoring and updating of multiple timetables and usage data. The load orchestration system 145 may thus be configured to process multiple independently managed timetables to identify a resource availability for a particular request. Further, compilation of usage data may enable usage statistics to be aggregated across data stores with respect to particular single or multiple indices (e.g., clients, operation types, time periods, etc.) to improve the accuracy of the statistics. Further, network configuration between devices may improve the efficiency of responding to a client request: the load orchestration system 145 may routinely monitor multiple and diverse resource timetables and usage data, such that it may send request parameters to controlling devices in a targeted and informed manner, so as to avoid unsatisfactory responses triggering a long communication iteration with devices. Further yet, the transformation of requested usage time based at least in part on empirical usage data promotes efficient assignments of resources.

Figure 10:
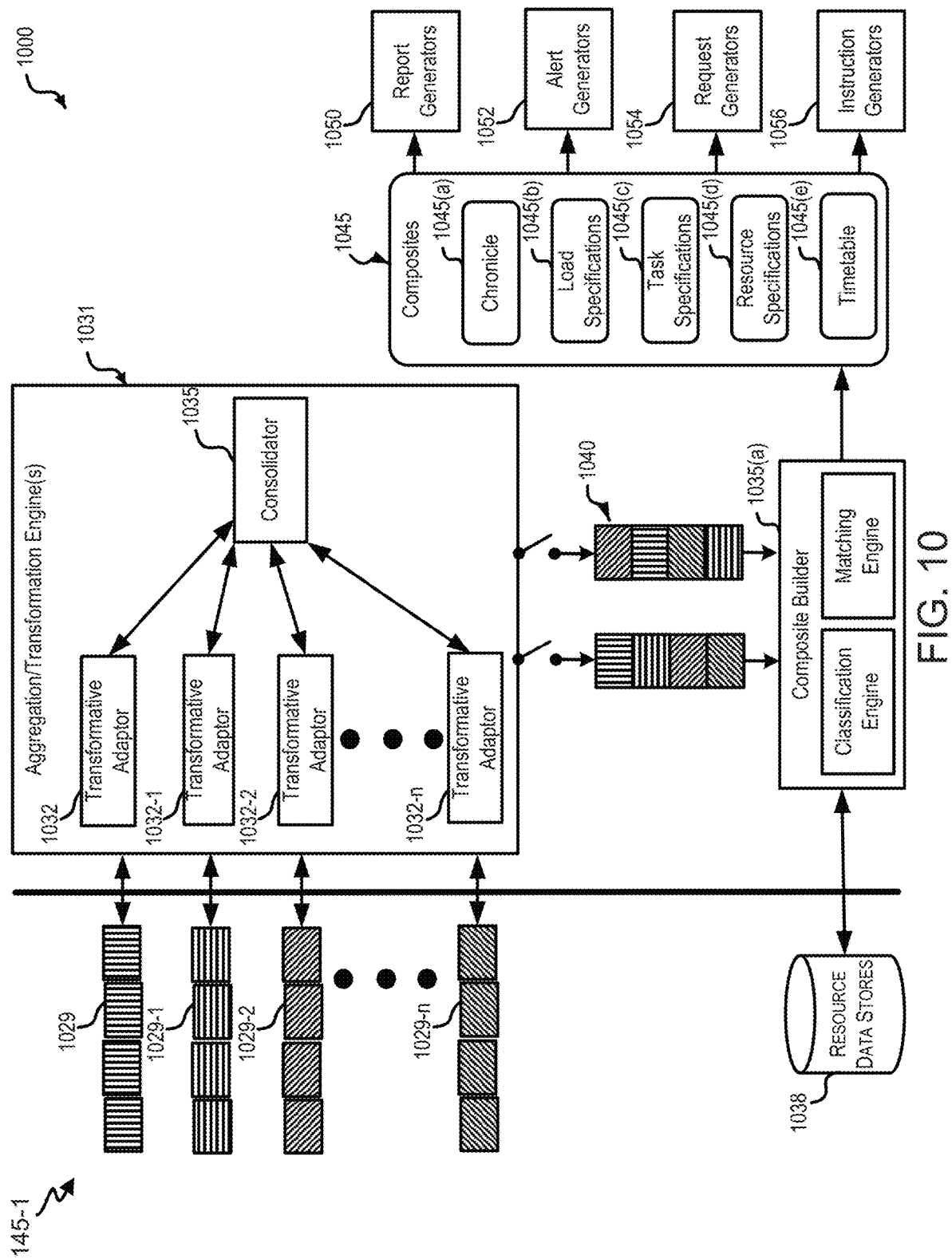
FIG. 10 illustrates a diagram of a portion of a load orchestration system, in accordance with embodiments of the present disclosure.

Turning next to FIG. 10, illustrated is a diagram that depicts a portion of the load orchestration system 145 according to certain embodiments of the present disclosure. The load orchestration system 145 may include one or more aggregation and/or transformation engines 1031. In various embodiments, the aggregation and/or transformation engines 1031 may correspond to a single, integral engine or separate engines working in conjunction. The aggregation/transformation engines 1031 may transform, translate, or otherwise adjust data collected.

The aggregation/transformation engines 1031 may utilize any one or combination of the interfaces disclosed above as one or more content acquisition interfaces configured to allow the aggregation/transformation engines 1031 to gather data 1029 from data sources corresponding to any one or combination of the sources of data such as resource data, location data, and/or the like disclosed herein to facilitate the load orchestration features disclosed herein. The data 1029, which may include multiple data streams, may be received via one or more networks, such as a local area network, a Wi-Fi network, or the Internet, from multiple sources (e.g., from a single site or multiple sites), such as a component or user device that collects at least some of the data included in each data element based at least in part on inputs detected at the device or measurements made by a sensor of the device. In some instances, the data may be collected immediately, or with some delay (e.g., so as to be at an end of a data-collection effort) appended to a data stream transmitted directly or indirectly to the engines 1031. In some instances, collected data may be locally or remotely stored and subsequently retrieved (e.g., by a same or different device) to append to a stream. A managing server may then, at a defined time or upon detecting a defined type of event (e.g., receiving a data request or detecting a boundary value size of a data stream), retrieve the stored data and append the data (e.g., in raw or processed form) to a stream. Thus, a source of a stream may be a single component or user device or an intermediate device or system that collects data from multiple components and/or user devices.

The received data 1029 may include individual data elements, which may correspond to data collected with respect to requests to perform one or more operations, requests for resources to perform one or more operations, requested load-acquisition times and/or time windows for load acquisition, actual load-acquisition times, operation performance statuses, resource statuses and availabilities, time data corresponding to resource availabilities, location data and time data corresponding to locations of resources at particular times, location data and time data corresponding to locations of loads at particular times, time data corresponding to load availabilities and needs, load specifications, operation specifications, and/or the like to facilitate various features of load orchestration disclosed herein. In various embodiments, the data 1029 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, or any number of different sources may be merged together with data generated internally, data previously received, data from third parties, etc.

By way of example, the aggregation/transformation engines 1031 may identify which data and records are about the same load, resource, entity, and/or the like, and may merge attributes from different sources into preliminary composites 1040 and particularized composites 1045 that may be used by the load orchestration system 145 as a basis for operations provided with respect to the particular load, resource, entity, and/or the like. In some embodiments, a particularized composite 1045 may include or otherwise facilitate a transfer and resource-allocation program for a particular load. For example, a load may need to go from the ER to a section in the in-load setting, then from the section to radiology, then back to the section, and then back home. Hence, the load may require multiple different transfers, and may further require multiple types of resources for the transfer and needs such as administration of testing devices, treatment devices, and/or the like. When the load may be in ER and it may be known that the load may be to be admitted, a transfer and resource-allocation program for the load may be built so that the load's locations and resource needs at various points in time may be allocated.

The load orchestration system 145 may, in some embodiments, include a multi-server system that may include specialized data-pulling engines and stream processing engines (e.g., each engine being a server or processing core). According to certain embodiments, with data-pulling engines, at least some of the data may be actively gathered and/or pulled from one the or more data sources, for example, by accessing a third party repository and/or by "crawling" various repositories. A stream processing engine may be specialized so as to include, for example, stream processors and fast memory buses. In some embodiments, data elements of the received data 1029 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls.

In some embodiments, the data 1029 acquired may be in different formats, according to different data standards, in different document structures, including different types of data, etc. The data 1029 may then be transformed, translated, or otherwise adjusted by the engines 1031. For example, acquired data may be converted from a first format to a second format using one or more conversion rules, which may be user-defined, heuristic, and/or machine-learned. In some embodiments, the engines 1031 may perform similar operations with respect to other data generated by elements of the architecture. In some embodiments, the aggregation and/or transformation engines 1031 may correspond at least in part to one or more of transformative processing engine 108, control engine 106, aggregation engine 218, 420, third party aggregation engine 422, and/or interoperability engine 502.

In some embodiments, the aggregation and/or transformation engines 1031 may include one or more transformative adaptors 1032. In some embodiments, one or more transformative adaptors 1032 may be associated with the content acquisition interfaces to effect the transformations. The transformative adaptors 1032 may be implemented, in various embodiments, in hardware and/or software. In some embodiments, a transformative adaptor 1032 may include a hardware device and/or software component that transforms, translates, converts, or otherwise adjusts the acquired data 1029. In some embodiments, the one or more transformative adaptors 1032 may correspond at least in part to one or more of adaptors 424, 426, 428.

In some embodiments, various processors and/or layers within the load orchestration system 145 may be specialized to perform various types of operations. For example, a first set of processors may be configured to transform the data 1029 within a stream in real-time (e.g., to produce data in a standard format and/or one that corresponds to an alert, notification, and/or report protocol) and detect (e.g., based at least in part on data included in a header of a data element) whether the transformed data may include one or more particular types of data. In various embodiments, the first set of processors may utilize the transformative adaptors 1032 to effect the transformation and/or may further transform the data beyond first-stage transformations by the transformative adaptors 1032.

The aggregation/transformation engines 1031 may process manifold data sets that may, for instance, come from different sources or the same source, for example, by way of one or more updates to data previously provided by a particular source, and the consolidator 1035 may consolidate the data sets to form a preliminary composite 1040. The consolidation may include applying one or more filtering techniques (or one or more filters) to the data sets, organizing, categorizing, qualifying, and/or comparing the sets of information; detecting, identifying, and/or handling errors/discrepancies; identifying redundancies; removing redundancies; discarding data irrelevant to composite developing for particular loads, resources, and operations; and/or otherwise processing the data sets. The consolidator 1035 may determine whether each element may include a data pattern that may be consistent with one or more defined protocols. A protocol may define a data pattern as one that may include, for example, one or more particular data elements and/or types of data elements. The consolidator 1035 may identify one or more applicable protocols (e.g., based at least in part on source identifier, metadata, a current time, a stream identifier, etc.).

In some embodiments, the consolidation may be performed upon detection of one or more particular data elements 1029. One or more first-stage processors of the engines 1031, which may correspond to the consolidator 1035, may form one or more preliminary composites 1040 from consolidated data. The one or more first-stage processors may transmit the one or more preliminary composites 1040 (or replicated versions thereof) to one or more second-stage processors, which may correspond to a composite developer 1035(*a*). The composite developer 1035(*a*), which may or may not be integral with the engines 1031 in various embodiments, may develop particularized composites 1045. The composite developer 1035(*a*) may be configured to perform extraction, apply a rule to process the extracted data element, request, and/or retrieve supplemental data from a remote data source 1038, and/or develop composites 1045 with the supplemental data. Further, in some embodiments, the composite developer 1035(*a*) may include a classification engine and a matching engine configured to facilitate classifying and matching features disclosed herein.

The one or more data stores 1038 may correspond to any one or combination of the data stores disclosed herein. In some embodiments, the composite developer 1045(*a*) may pull from the data stores 1038 stored composites 1045, previously created by the composite developer 1035(*a*), to update the stored composites 1045 based at least in part on data 1029 newly received and processed. In some embodiments, the composite developer 1045(*a*) may pull from the data stores 1038 data pertinent to the composite 1045 to supplement data 1029 newly received and processed in order to create and/or update the composite 1045. In some embodiments, the supplemental data may include, for example, template data and/or data previously collected and pertinent to forming a chronicle 1045(*a*), load specifications 1045(*b*), operation specifications 1045(*c*), resource specifications 1045(*d*), and/or a timetable 1045(*e*). Thus, the composite developer 1045(*a*) may use previously stored data and newly collected data 1029 to form and update the composites 1045.

In some embodiments, the composite developer 1035(*a*) may transform the preliminary composites 1040 into understandable data, information, and/or content so that the composites 1045 contains the transformed data for surfacing at client devices as alerts, notifications, and/or reports. The composite developer 1035(*a*) may identify protocols for alerts, notifications, and/or reports. The various protocols may include one or more general conditions of applications, such as ones that specify for which time periods, sites, locations, data sources, and/or client devices for which the protocol may be to apply. The various protocols may include a flag definition that may specify what types of data indicate that information corresponding to a data element may be to be reported. For example, a flag definition may include an identification of each of one or more composites and/or one or more values associated with each of the one or more composites. The one or more values may include, for example, a numeric, textual or categorical value. The one or more values may include a boundary value and/or define a bound for a closed or open range. Thus, for example, a corresponding value included in a data element may be determined to be consistent with the one or more values if it may be within a range (or outside the range—depending on how the protocol may be defined) or exceeds the boundary value in a particular direction (e.g., may be above or may be below the boundary value). As another example, a corresponding value included in a data element may be determined to be consistent with the one or more values if it may be the same as one (or all) of the one or more values.

In some embodiments, the composite developer $1035(a)$ may attenuate, blur, and/or remove particular elements of the preliminary composites $1040$. Blurring an element may include, for example, assigning a numeric composite value to a numeric bin, scrambling letters, assigning a numeric composite value to a functional category, etc. As another example the composite developer $1035(a)$ may selectively permit particular elements to pass according to one or more rules and/or based at least in part on what data may be required to develop the composites $1045$, an original source of a data element, a value (e.g., identifying a location, time stamp, or institution) associated with the data element, a destination, a current time, and/or the like.

In various embodiments, a particularized composite $1045$ may include manifold components. The manifold components may include one or more of a chronicle $1045(a)$, load specifications $1045(b)$, operation specifications $1045(c)$, resource specifications $1045(d)$, and/or a timetable $1045(e)$. The engines $1031$ may create and/or update a chronicle $1045(a)$.

A chronicle $1045(a)$ may include temporally keyed and/or demarcated index of past and current data with respect to a particular load. The chronicle $1045(a)$ may, for example, include time-annotated events pertinent to the load chronologically indexed since origination of the load within the interaction system $100$. For example, the chronicle $1045(a)$ may be created upon admission of a load, and may be developed with transfers to a section, arrival of a resource, processing by a resource, transfers to different units or sites for particular treatments or tests, and/or the like. Load specifications $1045(b)$ may include specifications of load identifiers, load characteristics, a medially pertinent history feature, resource needs, a condition, a symptom, a diagnosis, a time, a test, test result, and/or the like.

Operation specifications $1045(c)$ may include request parameters specifying requested operations (e.g., with an operation type) and corresponding time constraints or time windows for performance of the operations (e.g., particular times, time ranges, and/or the like). The request parameters may include geographic parameters (e.g., identifying a location associated with a load, such as a current location, a destination, a load-acquisition location, and/or the like; or a location constraint, such as a location, distance boundary value, calculated transfer-time boundary value, or zip code). For example, a requested operation may correspond to a transfer of a load between sites or units within a site. In some instances, a requested operation may further specify particular operations to be performed on the particular load, such as procedures, tests, treatments, and/or the like. In some instances, the operation specifications $1045(c)$ may specify one or more operational sequences and/or one or more decision trees for a number of operations requested, prescribed, and/or ordered for a particular load.

Resource specifications $1045(d)$ may include request parameters specifying one or more particular resources needed to effect operations specified by the operation specifications $1045(c)$ for the particular load specified by the load specifications $1045(b)$. The request parameters may include requested usage time specifications, resource constraints (e.g., pertaining to location, configurations, component availability, size and/or site affiliation); and/or one or more usage parameters. Timetable $1045(e)$ may include a composite timetable that correlates resource availabilities, resources request times, load locations and corresponding times, and operations times with respect to a particular load.

The composite developer $1035(a)$ may update one or more of the manifold composites, and, hence, the composites $1045$, in real time, periodically, or when triggered by certain events with respect to the particular load. The composite developer $1035(a)$ may generate one or more feeds of particularized composites $1045$ transferred to one or more data stores $1038$ and/or one or more additional processors of the allocator $1000$. The one or more additional processors may be configured to provide one or more report generators $1050$, alert generators $1052$, request generators $1054$, and/or report generators $1056$. The generators may utilize orchestration rules to process at least portions of the composites $1045$ and generate content for transmissions to effect various embodiments disclosed herein.

The combined data and content may be transmitted to one or more destinations. An address of a destination (e.g., an IP address) may be specified within a rule and/or protocol. Filtered and/or unfiltered, supplemented, and/or un-supplemented data elements may be transmitted to a destination via a discrete and/or continuous transmission. Exemplary types of transmission include, for example, transmission via messages (e.g., email messages, SMTP, or faxes), or file transfer (e.g., via FTP, SSH or other file transfer protocol). A transmission may include one to a single or to multiple defined destinations and/or, in some instances, a broadcast transmission. A transmission may occur, for example, repeatedly, continuously and/or upon detecting a particular event. An event may include, for example, a particular time, passage of a particular time period since a last transmission, detecting one (or a boundary value number) of data elements ready for transmission, and/or receiving a request for the data.

Figure 11:
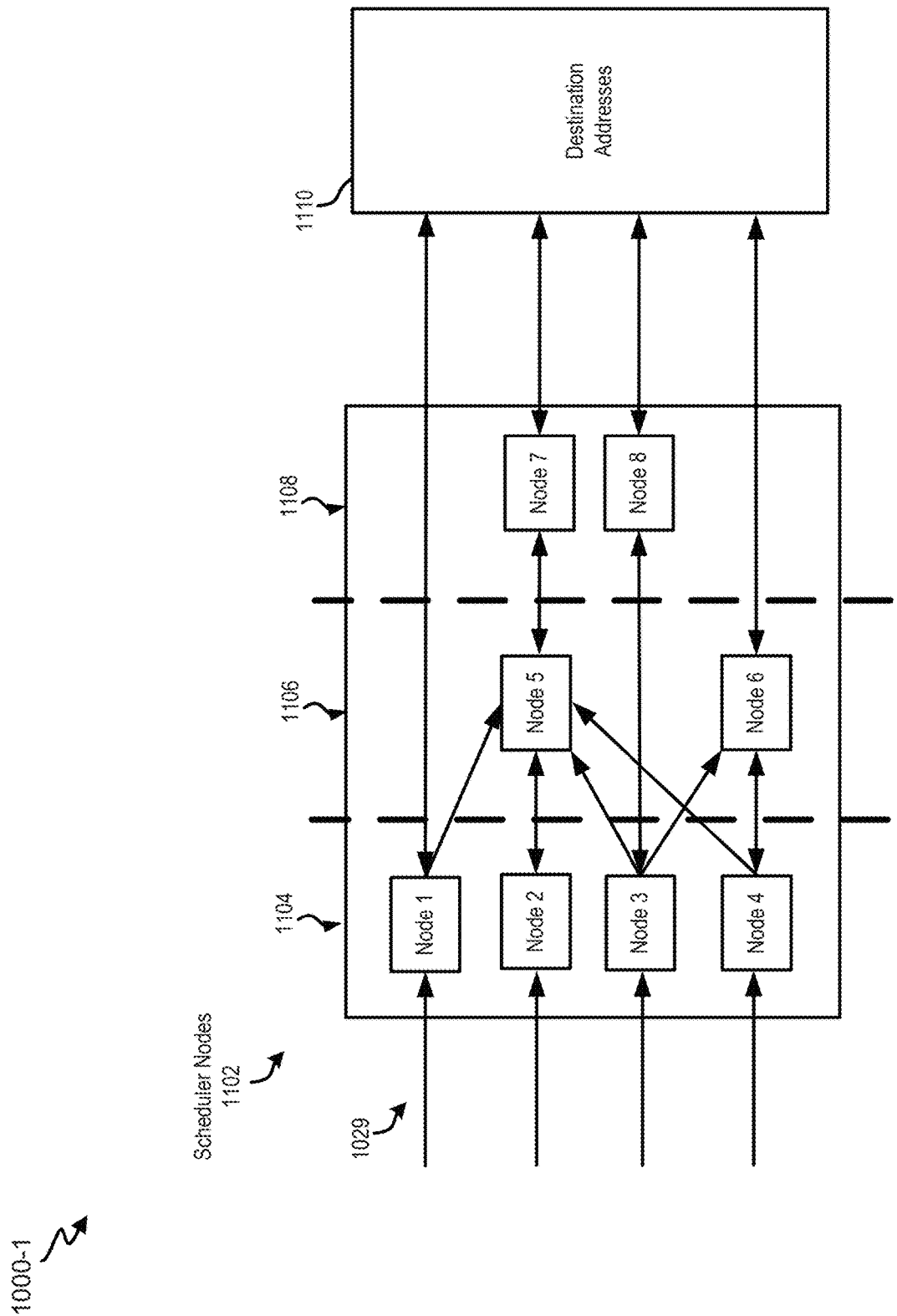
FIG. 11 illustrates a processing flow for a scheduler, in accordance with embodiments of the present disclosure.

FIG. 11 shows an illustration of a processing flow across processing nodes for the allocator $1000$, in accordance with certain embodiments of the present disclosure. The allocator $1000$ may be implemented by the adaptive authentication and notification system $101$ (e.g., the inbound monitoring system $116$ and/or the adaptive router system $118$) in some embodiments. As depicted, a plurality of data elements $1029$ (which may be in streams) are received. The allocator $1000$ may assign each data stream or individual data elements to a processing node from amongst a set of allocator processing nodes $1102$, which may be of the stream processing engine in some embodiments. In some embodiments, each processor node in set of allocator processing nodes $1102$ may include an independent processor and/or network address relative to other nodes in the set. Some or all of the nodes in the set may be co-located or physically distributed.

In some embodiments, the allocator processing nodes $1102$ may include a first node layer $1104$ that performs initial processing of data elements. In the depicted instance, nodes $1$ through $4$ are in the first layer $1104$. In some embodiments, the first node layer 1104 may correspond to the aggregation/transformation engines 1031. The allocator 1000 may identify a node to which to assign a data element or stream based at least in part on, for example, a current or past memory or processor usage of each of one or more nodes; a processing latency of each of one or more nodes; a backlog of each of one or more nodes; and/or a dedication of each of one or more nodes.

Each of one, more, or all nodes in set of nodes 1102 may be configured to perform one or more particular processing operations. For example, nodes 1 through 4 may be configured to assess data in each data element to detect a specified data element. Such processing may be performed, for example, based at least in part on pattern recognition, computing data checksums (e.g., using a defined pattern), generating data products, performing if statements or searches, performing logic operations, etc. Different nodes may be configured to monitor for different data, which may be specified with different protocols.

In some instances, irrespective of whether the particular data may be detected, first-level nodes may route data elements to one or more destination addresses 1110. The one or more destination addresses 1110 may correspond to a destination specifications of devices, systems, and/or data stores that are physically separate from set of nodes 1102, such as client devices 105, resource-allocation systems 135, and/or other components communicatively coupled to the load orchestration system 145.

When a first-level node detects a presence of particular data in a data element, the node may send pertinent data (e.g., data element or replicate thereof or extracted data) to one or more nodes in a second layer 1106. In some embodiments, the second layer 1106 may correspond to the composite developer 1035(*a*). When a second-level node detects a presence of particular data in a data element, the node may send pertinent data (e.g., data element, extracted data or an identifier of a data element) to a node of the third layer 1108. In some embodiments, the third layer 1108 may correspond to one or more of the report generators 1050, the alert generators 1052, the request generators 1054, and/or the report generators 1056. The third-level nodes may collect data and generate content to include in reports, alerts, requests, instructions, and/or other communications suitable for embodiments disclosed herein. The third-level nodes may organize, process and/or filter collected data so as to conform with a transfer protocol, type of transmission and/or configuration of a destination device. For example, a report may be generated using a schema associated with a destination device. A third-level node may further transform data from one standard (e.g., a base standard) to another (e.g., one associated with a destination). The third-level nodes may cause transmission or storage instantly or upon detecting an event.

Accordingly, a multi-layer distributed processing system may be used to process data (e.g., streaming data and/or messaging data) in real-time. A layered node organization may facilitate minimally disrupting a stream (e.g., with regard to transmission latency and/or order disruption) and utilizing parallel processing to quickly detect and report select data. The framework may be also scalable, as nodes may be added to a set when additional data streams are incoming and/or when a density of data elements per stream increases.

Referring again to FIG. 10, the load orchestration system 145 may orchestrate operation-performing resources and operation specifications particularized to individual loads in various ways according to various embodiments. The allocator 1000 may receive a set of electronic communications 1029 directly or indirectly via the adaptive system 101 from one or more client devices 105. The set of electronic communications may include a digital identifier of an individual load. For example, in some embodiments, the digital identifier of the individual load may correspond to any suitable load identifier (e.g., name, Social Security number, address, account, etc.). In some embodiments, the digital identifier of the individual load may correspond to any suitable resource identifier (e.g., equipment identifier etc.). The allocator 1000 may identify, create, and/or develop composites 1045 using such digital identifiers to associate the composites 1045 with particular loads. For example, the engines 1031 and/or the composite developing 1035(*a*) may retrieve, from one or more compiled data and based at least in part on the digital identifier of the individual load, confidential information associated with the individual load The confidential information may include one or more attributes corresponding to one or more of: an indication of a set of one or more conditions of the individual load; an indication of a set of one or more operations associated with the individual load; and/or an indication of equipment (which may be referenced as being included in auxiliary resources) associated with the individual load. In some embodiments, the allocator 1000 may identify requirements for an operation-performing resource customized based at least in part on i) the first set of confidential information associated with the load, ii) a first geolocation corresponding to the load, and iii) a second geolocation corresponding to the operation.

In some embodiments, the allocator 1000 may initially create a provisional composite 1045 for the individual load. For example, the provisional composite 1045 may include a program for the individual load that specifies operations, resources, locations, and a corresponding timetable. The allocator 1000 may initially create a provisional composite 1045 according to a multi-level, hierarchical rules regime, where more general rules are associated with one or more general conditions to match operations, resources, locations, and/or times, and more specific rules associated with one or more sub-conditions to match operations, resources, locations, and/or times. Certain embodiments of the allocator 1000 may employ a tree structure for the analysis. In some embodiments, the allocator 1000 may the program to an operational sequence that may be applicable contingent upon user confirmation. The operational sequence may include explanations describing the overall program, operations, resources, locations, and a corresponding timetable. With some embodiments, where additional information is required in certain circumstances, a decision tree may be presented to gather information. The operational sequence may include any one or combination of a graphical decision tree, a textual decision tree, a series of prompts configured to walk the provider through a decision tree, a flowchart, an instructional narrative, a list, and/or the like.

In various embodiments, the allocator 1000 may initially create a provisional composite 1045 for the individual load at least in part by one or combination of the following. One or more particular operations may be determined based at least in part on the set of electronic communications 1029. In some embodiments, the set of electronic communications 1029 may include an electronic request to perform one or more operations with respect to the individual load and/or a specification of one or more types of operation-performing resources. For example, the electronic request may request transfer of an individual load between two locations. In some embodiments, the set of electronic communications 1029 may simply specify a type of operation-performing resource for the individual load. In such cases, the load orchestration may include inferring a request to perform one or more operations with respect to the individual load by matching the specified type of operation-performing resource. In some embodiments, the set of electronic communications 1029 may further include one or more of an indication of a location, an indication of a procedure, and/or an indication of a condition, and the allocator 1000 may infer a request to perform the operation with respect to the individual load based at least in part on classifying the indication(s) to one or more categories and matching the one or more categories to one or more operations.

One or more operation-performance locations may be determined based at least in part on the set of electronic communications 1029. The allocator 1000 may receive a set of electronic communications 1029 directly or indirectly via the adaptive system 101 from one or more location data sources. In various embodiments, the allocator 1000 may derive location-based data from the set of electronic communications 1029, which may be at least partially from one or more of an electronic tag sensor, at least one of the one or more client devices, a resource-allocation system, and/or a monitoring device. The set of electronic communications may include location data indicative of a location of the individual load. In some embodiments, an operation and the identifying the one or more operation-performance locations are further based at least in part on a first location of the individual load and a second location inferred from the request. In some embodiments, the location data may correspond to a destination input received via the authenticated user interface facilitated via a client device 105 or another interface disclosed herein. In some instances, the destination input may correspond to an identifier of a second site, when the individual load is currently located in a first site. In other instances, the destination input may correspond to an identifier of a second location within a particular site, when the individual load is currently at a first location within the particular site.

One or more operation-performance times may be determined based at least in part on the set of electronic communications 1029. The allocator 1000 may process a temporal input received via the set of electronic communications 1029, the temporal input indicative of one or more times and/or one or more time windows. In some embodiments, the allocator 1000 may access a timetable data store to process resource timetables that indicate capacities to grant operations during particular time periods. In some embodiments, the allocator 1000 may select the operation-performing resource from a set of operation-performing resources at least in part by matching the temporal input to at least one of the capacities. The allocator 1000 may classify an operation as having an operation type according to one or more operation classification rules. The allocator 1000 may match the operation type to a type of operation-performing resource for loads classified as having one or more characteristics matching the one or more attributes defined in the compiled data and/or in the confidential information retrieved.

The composite developer 1035(a) may access performance data, from a resource data store 1038, which may include any other data stores such as a performance data store 133. The composite developer 1035(a) may identify, based at least in part on the performance data, an operation-performance duration that corresponds to one or more of the operation type, the type of operation-performing resource, the one or more operation-performance locations, and/or one or more operation-performance times. The composite developer 1035(a) may define an operation-assignment duration based at least in part on the operation-performance duration.

The allocator 1000 may transmit electronic communications directly or indirectly via the adaptive system 101 to one or more resource-controlling devices, the electronic communications including an instruction to perform the operation. For example, the allocator 1000 may detect an availability of an operation-performing resource of the type of operation-performing resource that is of a duration that is at least as long as the operation-assignment duration. The allocator 1000 may determine a performance time for the operation to be performed based at least in part on the availability of the operation-performing resource. The allocator 1000 may transmit, to at least one resource-controlling device, an instruction to perform the operation at the performance time. The allocator 1000 may modify the provisional composite 1045 for the individual load based at least in part on the performance time and the instruction to the at least one resource-controlling device, the modifying forming an updated composite 1045. The allocator 1000 may transmit, to one or more client devices, content indicating at least a portion of the updated composite 1045.

With certain embodiments, the allocator 1000 may initiate assignment actions based at least in part on provisional composite 1045. As an example, the allocator 1000 may proceed with any one or combination of steps disclosed herein to effect assignment of resources for the individual load and to initiate load transfer, along with one or more alerts to client devices in order to provide notification of actions initiated and allow for user granting, modification, or declination of the actions. The allocator 1000 may transform the provisional composite 1045 into an updated, modified, and/or confirmed composite 1045 when particular resources are assigned, when particular locations of resources and/or loads are detected, when a resource-allocation system, an individual load, a resource, a manager, and or another entity grants or confirms the program or aspects thereof directly or indirectly via the adaptive system 101, and/or when other suitable events occur so that the allocator 1000 may update, modify, and/or confirm the provisional composite 1045. In some instances, the allocator 1000 may create the provisional composite 1045, form the updated composite, and transmit content to destination addresses (e.g., instructions to resource-controlling devices) prior to receiving an explicit request to perform the operation with respect to the individual load.

In some embodiments, the allocator 1000 may process location-based data, received from one or more location data sources directly or indirectly via the adaptive system 101, that indicates a current location of the operation-performing resource, which may or may not be during operation performance (e.g., transfer) in various embodiments. The allocator 1000 may predict a timeliness of performance of the operation based at least in part on the location-based data. The allocator 1000 may access a target efficiency metric reflecting a target efficiency of operation performance. The allocator 1000 may identify a second operation identified in a flexible operation timetable, and determine a second performance time for the second operation to be performed based at least in part on the timeliness of performance of the operation predicted and the target efficiency metric. The allocator 1000 may transmit an instruction to perform the second operation at the second performance time, and may the composite 1045 for the individual load based at least in part on the second operation and the second performance time. The allocator 1000 may transmit one or more alerts to one or more client devices, content indicating at least the second operation and the second performance time. Such content may presented with a dashboard reflecting the load and resource orchestration, as well as real-time updates on load locations, load statuses, resource locations, resource statuses, timetables, ETAs, descriptive content, and/or the like.

According to certain embodiments, the allocator 1000 may provide for intelligent orchestration and selection of loads and resources based at least in part on performance metrics (e.g., efficiency metrics and/or reliability metrics), features of which are disclosed further herein. For example, resource selection may be based at least in part on a ranking of resources and/or resource-allocation systems according to the metrics. When balancing multiple loads, the allocator 1000 may triaged the loads according to triage scores. Such triaged scores may correspond to urgencies of need. Conditions of the loads may be classified according to urgencies of need and scored accordingly, with higher scores reflecting higher urgency. In such cases, the allocator 1000 may select resources of a certain type according to the performance metrics so as to assign resources and/or resource-allocation systems having higher metrics to loads classified as having more urgent needs, and to assign resources and/or resource-allocation systems having relatively lower metrics to loads classified as having less urgent needs. Thus, resource assignment may be at least partially a function of performance metrics, and current assessments of availabilities and locations of resources.

Certain embodiments may further provide for monitoring resources after assignments of the resources. For example, when a resource has been requested, the allocator 1000 may monitor real-time progression (e.g., locations) of the resource toward a load-acquisition points. The allocator 1000 may make current assessments of the progression of the resource against the time-location boundary values set according to the timetable generated by the allocator 1000. When one or more comparisons of the progression of the resource against one or more of the time-location boundary values indicate that the progression is insufficient to meet a target time, the allocator 1000 may search for, and automatically select or generates a notification with a user selectable option for, one or more alternative resources that may meet the target time or at least come closer to the target time that the current resource. In some cases, the allocator 1000 may determine alternative resources and corresponding alternative target times prior to the current resource failing to meet a progression boundary value. Accordingly, certain embodiments allow for dynamic adjustments of and alerts regarding resource programs and resource assignments with respect to individual loads, reactive to real-time monitoring of resource progression.

Figure 12:
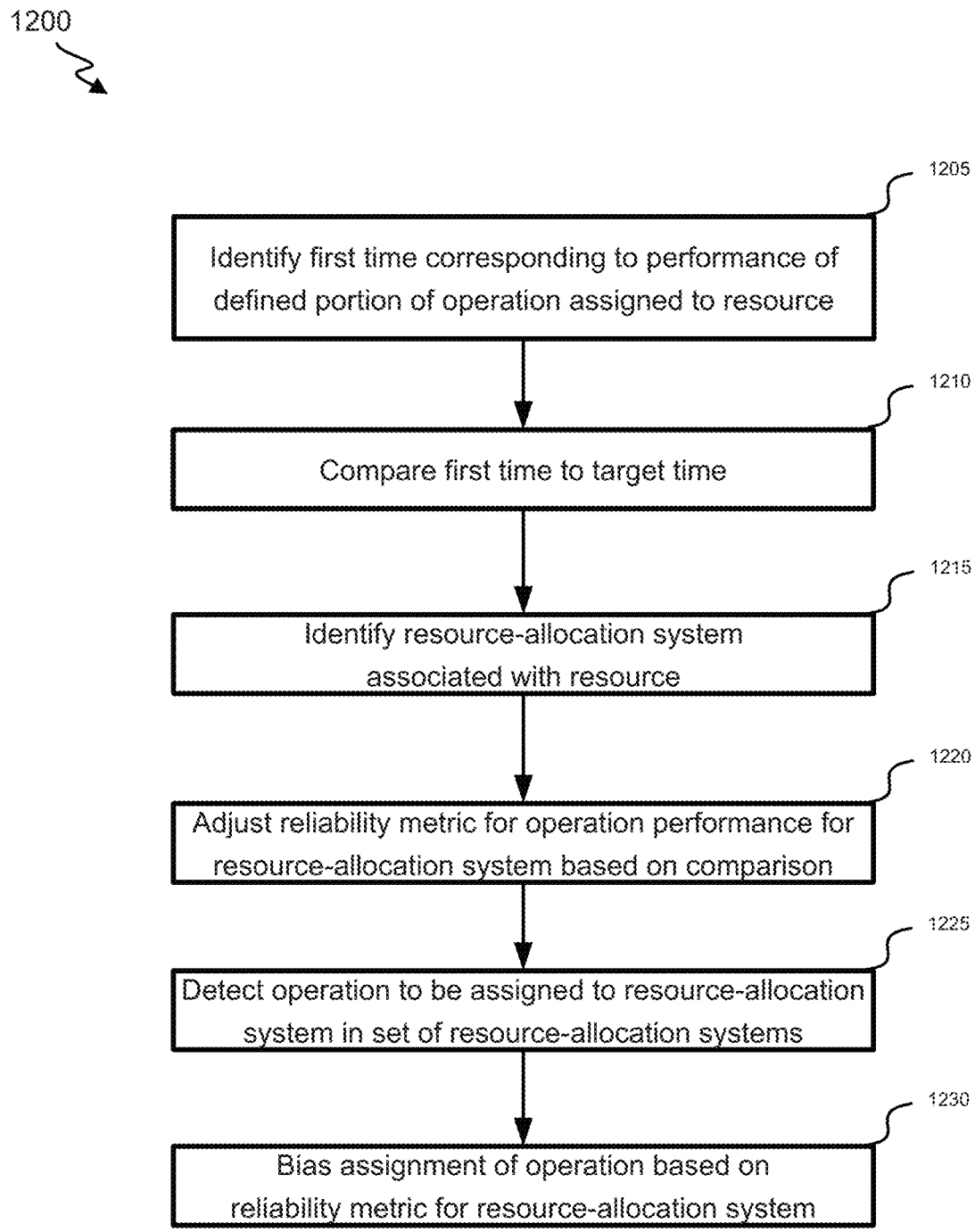
FIG. 12 illustrates a flowchart of a process for using location data of resources for management of distributions of operation assignments, in accordance with embodiments of the present disclosure.

FIG. 12 illustrates a flowchart of a process 1200 for using location data of resources for management of distributions of operation assignments, in accordance with certain embodiments of the present disclosure. The process 1200 may be performed by the adaptive system 101 and the load orchestration system 145. In some embodiments, the process 1200 may begin at block 1205 where a first time may be identified that corresponds to a performance of a defined portion of an operation assigned to a resource according to a particularized composite 1045. The first time may include an actual or calculated time at which the defined portion may be completed. In some instances, block 1205 may include determining whether the defined portion may be completed by a particular time specified by a composite 1045, and, if not, identifying when the portion may be completed (e.g., so as not to detect early completion). In some instances, early performances are also identified.

For example, the first time may identify a time at which the resource may be prepared to be made available for a load of the operation, may be actually made available for the load, has granted the load, may be applied to the load, and/or may be otherwise used for the load. In some instances, the first time relates to a time at which the resource may be located at a particular location corresponding to the operation. In some embodiments, the first time may be identified based at least in part on location monitoring of the resource. In some embodiments, a signal may be received from the resource or an intermediate system (e.g., an associated resource-allocation system or a system receiving input indicating that the portion has been completed) that identifies a location of the resource (e.g., geographic coordinates and/or whether it may be at a particular location). In some embodiments, the signal may be entered via a chat session, be recognized by one of the bots of the adaptive system 101 which, in turn, may transmit one or more corresponding communications to the load orchestration system 145. In some embodiments, the signal may be transmitted via a request 134 to the adaptive system 101 which, in turn, may transmit one or more corresponding communications to the load orchestration system 145. When the location matches a location corresponding to the portion of the operation specified by the particularized composite 1045, a first time may be defined as a time at which the signal was received and/or a time included in the signal.

At block 1210, the first time may be compared to a target time specified by the particular composite 1045. The target time may include a particular time point (e.g., time of day) or a time window (e.g., range of times or a time boundary value). The target time may include one associated with the operation and/or the portion of the operation. For example, the target time may include a time by which or during which the resource at which the resource may be to be prepared to be made available for the load, may be to be actually made available for the load, may be to grant the load, may be to be applied to the load, may be otherwise to be used for the load, and/or may be to be located at a particular location (e.g., as specified in the operation).

In some instances, a target time for completing the defined portion of the operation may be identified by the particular composite 1045. The target time may include a time at which the defined portion was allocated to be completed by the load orchestration system 145, for example, based at least in part on data corresponding to a particular operation, resource, and/or resource-allocation system. For example, an identifier of the operation may be looked up in the particularized composite 1045 so as to identify one or more target times for the operation. The operation specifications 1045(c) and/or the timetable 1045(e) may specify the target time for completing the defined portion of the operation. The comparison of the first time to the target time may include, for example, determining whether the first time preceded the target time and/or an extent to which the first time differed from the target time (e.g., a delay in completion of the defined portion). In some instances, the comparison may account for potentially intervening complications, such as traffic conditions near a location corresponding to the defined portion of the operation.

At block 1215, a resource-allocation system 135 associated with the resource may be identified. The resource-allocation system 135 may include one to which the operation was assigned by the load orchestration system 145. The resource-allocation system 135 may manage and/or coordinate a schedule for each of one or more resources. For example, the resource-allocation system may receive operation assignments from each of one or more allocators and may assign corresponding operations to appropriate resources. As one particular illustration, the resource-allocation system 135 may coordinate a schedule of one or more resources.

The resource-allocation system 135 may be identified within a received signal (e.g., identifying the first time) and/or may be determined using other information (e.g., an identifier of the operation and/or an identifier of the resource). In some embodiments, the signal may be entered via a chat session, be recognized by one of the bots of the adaptive system 101 which, in turn, may transmit one or more corresponding communications to the load orchestration system 145. In some embodiments, the signal may be transmitted via a request 134 to the adaptive system 101 which, in turn, may transmit one or more corresponding communications to the load orchestration system 145. For example, a signal may identify a particular resource and a first time at which the resource arrived at a first location as specified in an operation. The load orchestration system 145 may then look up an identifier of the resource in the performance data store 133 or another data structure that associates particular resources with particular resource-allocation systems 135. As another example, a signal may identify that a particular resource arrived at a first load-acquisition time for a particular load. The load orchestration system 145 may then look up an identifier of the load in a particularized composite 1045, the composite data stores 1038, and/or another data structure that associates load identifiers with operation identifiers and identifiers of resource-allocation systems assigned to handle the operations.

At block 1220, a reliability metric for operation performance for the resource-allocation system 135 may be adjusted based at least in part on the comparison. The reliability metric may reflect or relate to, for example, a probability that particular portions of operations assigned to the resource-allocation system 135 are completed prior to a target time and/or a statistic reflecting delays in completing the defined portion. For example, for operations that indicate that loads are to be acquired at particular locations in a resource and transferred to destination locations, the metric may include a percentage of time that the equipment was at an acquisition location prior to or at a target acquisition time or an average or median difference between a target acquisition time and actual acquisition times. Metrics may generally apply to resource-allocation system 135 or may be specific based at least in part on parameters such as resource types, particular resources, particular resource controllers, particular load-acquisition locations, types of operation portions, etc. Adjusting the metric may include, for example, updating a probability or statistic. In some instances, the updating may occur in a manner that reduces relative influence on older data. Additionally or alternatively, other performance metrics (e.g., efficiency metrics) may be utilized with the method operations disclosed herein.

At block 1225, an operation to be assigned to a resource-allocation system 135 may be detected (e.g., an operation request corresponding to the data 1029 may be received, or the composite developer 1035(*a*) may determine the operation to be a suboperation necessary to fulfill an explicit, more general operation request corresponding to the data 1029 received). The operation may include one that requires a resource, such as a resource to facilitate transferring a load (e.g., load or piece of equipment) from a first location to a destination location, or another resource to be used for the load. In some instances, data may indicate that operation-assignment relationships have been established between the load orchestration system 145 and each of a set of resource-allocation systems 135. The set of resource-allocation systems 135 may include the resource-allocation system 135 for which the reliability metric was adjusted at block 1220.

At block 1230, an assignment of the operation may be biased based at least in part on the reliability metric that was adjusted at block 1220. Effecting assignment biases may include, for example, transmitting signals identifying a potential operation assignment to an incomplete subset of the set of resource-allocation systems 135 (e.g., those with favorable metrics satisfying one or more boundary values), transmitting a signal identifying a potential operation assignment to one resource-allocation system 135 (e.g., with a favorable metric satisfying a particular boundary value) before a similar signal may be transmitted to another system 135, identifying fewer constraints for an operation in a signal transmitted to one resource-allocation system 135 as compared to a corresponding operation as identified to another system 135 and/or biasing actual operation assignments towards systems 135 with favorable metrics (e.g., when multiple resource-allocation systems 135 transmit signals corresponding to confirmation of the assignment of the operation). In some embodiments, effecting such communications may be performed by way of transmitting signals to the adaptive system 101 via a chat session and/or as a response to a communication for recognition by one of the agents/bots or via requests 134, and the adaptive system 101, in turn, may transmit one or more corresponding communications to the resource-allocation systems in accordance with the adaptive directory, formatting, and rerouting features disclosed herein. The bias may occur by implementing a ranking, order, and/or weighting. The bias may occur to favor, for example, resource-allocation systems 135 associated with reliability metrics indicating that operations previously assigned to the systems 135 (or defined portions thereof) where consistently and/or timely performed.

Figure 13:
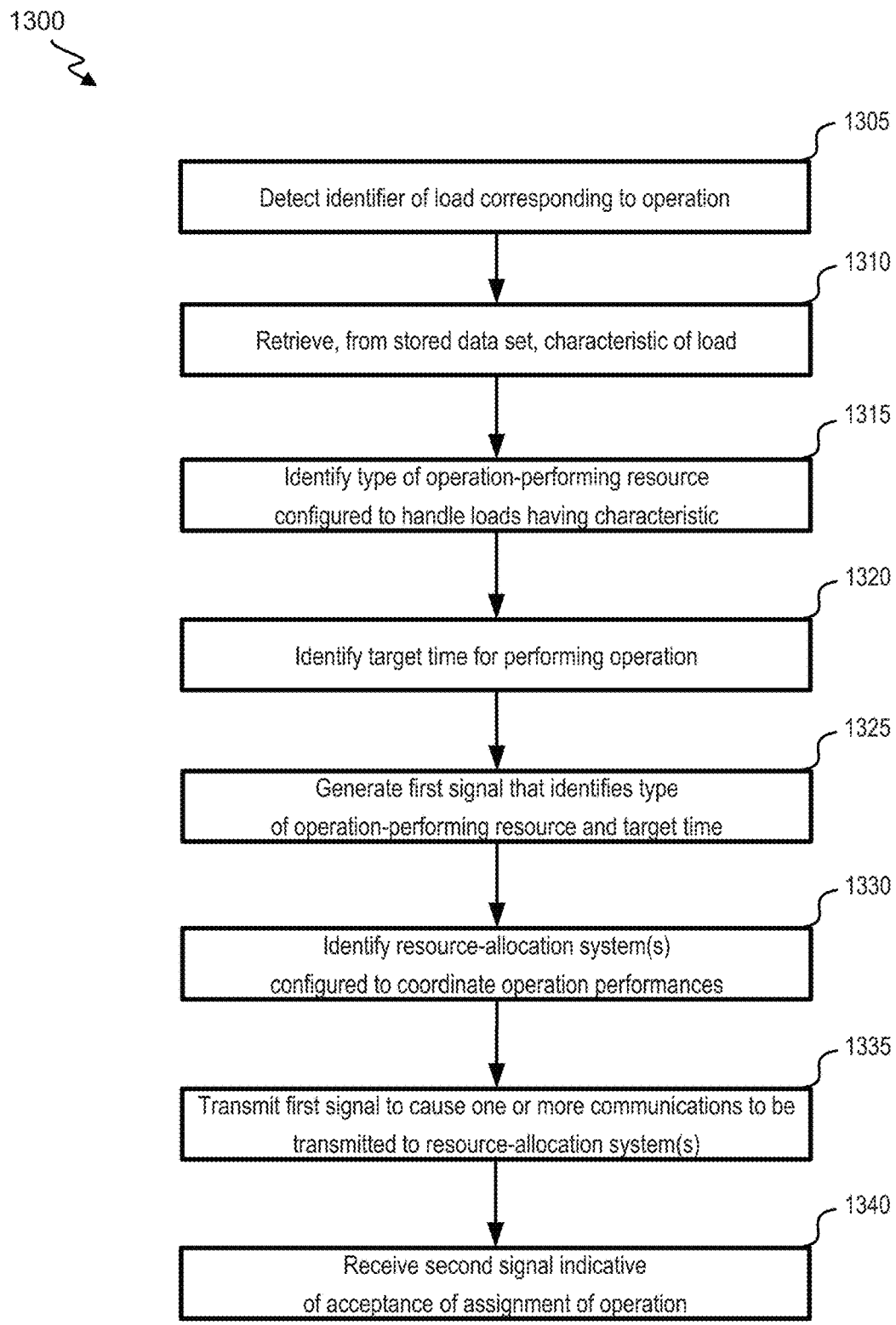
FIG. 13 illustrates a flowchart of a process for collecting operation specifications and identifying appropriate operation-performing resources, in accordance with embodiments of the present disclosure.

FIG. 13 illustrates a flowchart of a process 1300 for collecting operation specifications and identifying appropriate operation-performing resources, in accordance with certain embodiments of the present disclosure. The process 1300 may begin at block 1305 where an identifier of a load of an operation may be detected. The detection may include, for example, detecting a scan of an electronic device or electronic tag corresponding to the load, or detecting input that identifies the load. In some instances, the load may be one that may be to be transferred from a first location to a second location by a resource. In some instances, the load may be one which may be not transferred from a certain time period, but may require application of certain resources. The load may include a piece of equipment, medication, lab samples, or a load.

The identifier may be used to access an compiled data corresponding to the load. At block 1310, a characteristic of the load may be retrieved from the record. The characteristic may include a physical characteristic (e.g., a weight or dimension) or a handling requirement (e.g., appropriate temperature and/or required nearby equipment or personnel). In one instance, the characteristic identifies a degree to which a load may be stable (or instable) and/or requiring intense monitoring during transfer and/or otherwise.

At block 1315, a type of operation-performing resource configured to handle, grant, apply to, provide an operation to, and/or otherwise be used for loads having the characteristic may be identified. For example, block 1315 may include identifying a boundary value speed, size, or dimension of a resource. As another example, block 1315 may include identifying a functionality, capability, or component of a resource (e.g., that it must include a transcutaneous cardiac pacemaker or a particular medication or that a paramedic be physically available in or near the resource to control operation performance). As yet another example, block 1315 may include identifying whether an operation-performing resource must be advanced life support equipment.

At block 1320, a target time for performing at least part of the operation may be identified. For example, the target time may include a time at which it may be desired that the assigned operation may be initiated, that a resource may be available to begin performing the assigned operation, that a resource may be located at a particular location (e.g., a load-acquisition or destination) corresponding to the operation, that the resource has begun handling the load, that the resource may be at a destination location, that a defined portion of the operation has been completed, that the operation has been entirely completed, and/or the like. In some instances, a target time may be explicitly identified by an operation request corresponding to the data 1029 received. In some instances, the target time may be identified by the composite developer 1035(*a*), for example, based at least in part on specification objectives of an institution, operation parameters (e.g., how far a load must be transferred), the characteristic, and/or the like. The target time may include an absolute time (e.g., November 23 at 12 am) or a time range (e.g., November 23, 12-9:15 am).

At block 1325, a first signal may be generated that identifies the type of operation-performing resource and the target time. The first signal may correspond to an indication that an operation corresponding to data in the first signal may be requiring assignment or will be assigned. The first signal may correspond to an indication that the load orchestration system 145 may be granting indications from resource-allocation systems 135 that such resource allocations are available and/or equipped to handle the operation. In some instances, the first signal may include additional information about the operation, such as one or more geographical locations associated with the operation (e.g., an acquisition and/or destination location), an identification of an associated allocator or institution and/or a deadline for responding to the first signal.

At block 1330, one or more resource-allocation systems 135 to receive the first signal may be identified. In some instances, each of a set of resource-allocation systems 135 may be configured to control, schedule, and/or coordinate use of one or more resources. An institution corresponding to the load orchestration system 145 may have an established working relationship with an entity associated with each of the set of resource-allocation systems 135 that supports a coordinated approach for specification resources to meet priorities of the load orchestration system 145. In some instances, the load orchestration system 145 maintains and/or has access to a data store (e.g., performance data store 133 and/or resource timetable 138) that indicates, for each of the set of resource-allocation systems 135, identifying information (e.g., a name of a corresponding entity), communication-protocol information (e.g., a mode of communication or contact identifier), an identification of each type of resource coordinated by the resource-allocation system 135, a quantity of available resources (e.g., generally or of a type), a resource constraint (e.g., geographic limits as to where a resource may be used), and/or a performance metric.

In some instances, the one or more resource-allocation systems 135 may include all of the resource-allocation systems 135 in the set. In some instances, an incomplete subset may be selected. For example, the incomplete subset may include systems 135 associated with performance metrics above an absolute or relative boundary value (e.g., within the top five in a set) and/or with at least a boundary value number (e.g., 1 or within the top three amongst the set) of resources of a type matching that identified at block 1315.

At block 1335, the first signal may be transmitted to cause one or more communications to be transmitted to the identified resource-allocation systems 135. In some embodiments, such a signal may be transmitted to the adaptive system 101 via a chat session and/or as a response to a communication for recognition by one of the agents/bots or via requests 134, and the adaptive system 101, in turn, may transmit one or more corresponding communications to the resource-allocation systems in accordance with the adaptive directory, formatting, and rerouting features disclosed herein. In some instances, blocks 1330 and 1335 may be repeatedly performed, for example, because one or more communications to be initially sent to a first resource-allocation system 135. If the first resource-allocation system 135 does not respond to the one or more communications within a prescribed time period and/or declines the operation, then a second resource-allocation system 135 may be identified.

At block 1340, a second signal may be received from a resource-allocation system 135 that may be indicative of an availability to grant assignment of the operation. In some embodiments, the signal may be entered via a chat session and/or as a response to a communication, and be recognized by one of the agents/bots of the adaptive system 101 which, in turn, may transmit one or more corresponding communications to the load orchestration system 145. In some embodiments, the signal may be transmitted via a request 134 to the adaptive system 101 which, in turn, may transmit one or more corresponding communications to the load orchestration system 145. The second signal may indicate that a resource associated with the resource-allocation system 135 may be available, may identify an identifier or specification of the available resource, and/or may identify one or more times (e.g., start times, end times and/or time periods) that the resource may be available. In some instances, the second signal may include a response that, at least in part, does not match the operation. A resource-allocation system 135 may detect that such a resource may be not available during the requested time but may respond with an availability for acquisition at a particular time.

Thus, the process 1300 may include identifying resource specifications appropriate for a particular operation. Such specifications may be used to communicate the operation to select resource-allocation systems 135 likely to include resources with the identified specifications and/or to identify to resource-allocation systems 135 as to what types of resources would be required for operation performance. Efficiency of specification operations and performance of operations may thereby be improved.

Figure 14:
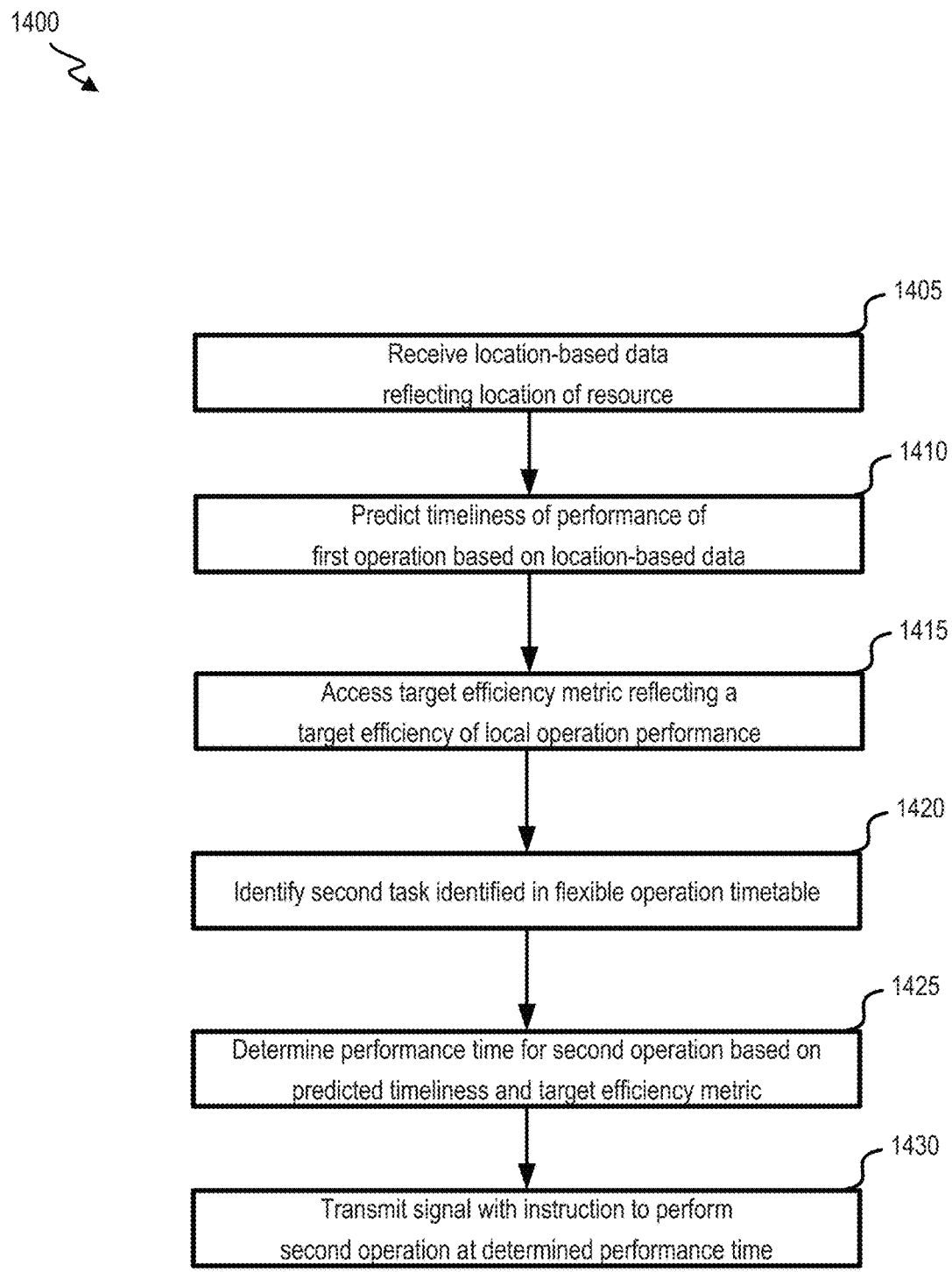
FIG. 14 illustrates a flowchart of a process for using location data of resources for electronically adjusting scheduled operations, in accordance with embodiments of the present disclosure.

FIG. 14 illustrates a flowchart of a process 1400 for using location data of resources for electronically adjusting allocated operations, in accordance with certain embodiments of the present disclosure. The process 1400 may begin at block 1405 where location-based data reflecting a location of a resource may be received by the load orchestration system 145. Some embodiments may provide for capturing and analyzing location-based data for a resource (e.g., location-based data provided by way of GPS, Wi-Fi, cellular, and/or other techniques for determining a current location of the resource). The location-based data may be received from a resource-allocation system 135 transmitting the data to the adaptive system 101 (e.g., an agent/bot configured to receive such data), which may then relay such data to the load orchestration system 145. In some embodiments, the resource-allocation system 135 may include a distributed system that may include a location-monitoring component in the resource, or it may otherwise be in communication with a location-monitoring system in the resource.

The location-based data may identify, for example, a location of the resource (e.g., a nearby reference location's or geographic coordinates) or a distance that the resource may be from a location (e.g., from a acquisition location corresponding to an operation). In some instances, the location-based data may include a time, such as an calculated arrival time (e.g., 23 minutes or at 3:10), that may be based at least in part on a location of the resource. Location-based data may be based at least in part on signals (e.g., from GPS satellites or other sources) received by a receiver in a component of or device in the resource. The location-based data may be a combination of data based at least in part on one or a combination of GPS, Wi-Fi, cellular, equipment sensor(s) such as a barometric sensor or accelerometer, RFID device signals, and/or other techniques for determining a current location of the resource.

The resource may access one or more networks through a wireless link to one or more access points, which may be of any suitable type or types and may connect the resource to the one or more networks, which may include the Internet, an intranet, a local area network, a public switched telephone network (PSTN), private communication networks, etc. For example, an access point may be a cellular base station, an access point for wireless local area network (e.g., a Wi-Fi access point), an access point for wireless personal area network (e.g., a Bluetooth access point), etc. In some embodiments, access point(s) may be used in obtaining location information for the resource.

At block 1410, a timeliness of performance of a first operation may be predicted by the load orchestration system 145 based at least in part on the location-based data. The prediction may include, for example, predicting whether all or a defined portion (e.g., an acquisition or an arrival of a resource) of an operation will be completed by a target time and/or predicting an extent to which completion of a defined portion or all of the operation will be delayed beyond a target time. In some instances, the prediction may include predicting whether a defined portion (or all) of the operation will be performed by a target time plus a defined buffer time.

At block 1415, a target efficiency metric that reflects a target efficiency of local operation performance may be accessed by the load orchestration system 145. The target efficiency metric may relate to, for example, a number of local operations (e.g., discharges) to be performed during a defined time period, spacing of operations (e.g., discharges) across a defined time period or delays between related operations (e.g., preparing a load for discharge and discharging the load). For example, a target efficiency metric may indicate that, amongst a set of loads to be discharged during a day, it may be desired that 50% of those loads be discharged before a particular time. The target efficiency metric may be identified based at least in part on stored data, input (e.g., received from an institution agent), and/or a learning technique that identifies metrics associated with positive results (e.g., positive health outcomes, such as low mortality and low readmission; high efficiency, such as attending to a large number of loads per day; low waiting times; etc.).

At block 1420, a second operation may be identified by the load orchestration system 145. In some instances, the second operation may include one that may be flexibly allocated, in that a time at which part or all of the operation may be to be performed may be adjusted. Whether an operation may be flexibly allocated may depend on, for example, whether performance of the operation has begun or a priority of the operation (e.g., where operations involving urgent health matters may be identified as inflexible). One or more operations may be identified as part of a transfer and resource-allocation program for a particular load. Hence, the one or more operations may be specified as required for one or more different transfers of the load and/or one or more other operations provided to the load.

In some instances, the second operation may include one that may be related to the first operation. For example, the first operation may include transferring a first load from a load-acquisition location to a destination, and a second operation may include discharging the first load from the load-acquisition location, an operation pertinent to preparing the first load for transfer, an operation to be provided to the load at the destination, or otherwise providing an operation that follows from the first operation. Thus, if the first operation may be delayed, it may be desirable to reschedule the related second operation so as to avoid or reduce a waiting period between the operations.

In some instances, the second operation may include on that may be or may be related to an operation that may be of a similar type as the first operation. For example, the first operation may include transferring a first load from a load-acquisition location to a destination, and a second operation may include discharging a second load from the load-acquisition location. Thus, if the first operation may be delayed, re-specifying the second operation may aid an institution in nonetheless reaching a target metric (e.g., number of discharges per time period).

At block 1425, a performance time (e.g., a target time) for the second operation may be determined by the load orchestration system 145 based at least in part on the predicted timeliness and/or target efficiency metric. For example, at block 1410, it may be predicted that the first operation will be completed 30 minutes late. A performance time of a related second operation may then be adjusted to be 30 minutes more than initially allocated. As another example, at block 1410, it may be predicted that a portion of the first operation that was initially allocated to be completed during a first time period will be completed in a second period. The performance time for a portion of the second operation may then be set to be (or to be within) the first time period.

At block 1430, a signal may be transmitted by the load orchestration system 145 with an instruction to perform the second operation (or portion thereof) at the determined performance time. In some embodiments, such a signal may be transmitted to the adaptive system 101, e.g., via a chat session and/or as a response to a communication for recognition by one of the agents/bots or via requests 134, and the adaptive system 101 may, in turn, transmit one or more corresponding communications in accordance with the adaptive directory, formatting, and rerouting features disclosed herein to, for example, a resource, a device, a resource-allocation system 135, or other device or system that facilitates performance of an operation. In some instances, the signal may include an option to confirm, grant, and/or reject the instruction. Thus, by monitoring location-based data of resources, a schedule involving multiple operations, resources and/or entities may be dynamically reconfigured to promote achievement of target metrics even when faced with delays.

Figure 15:
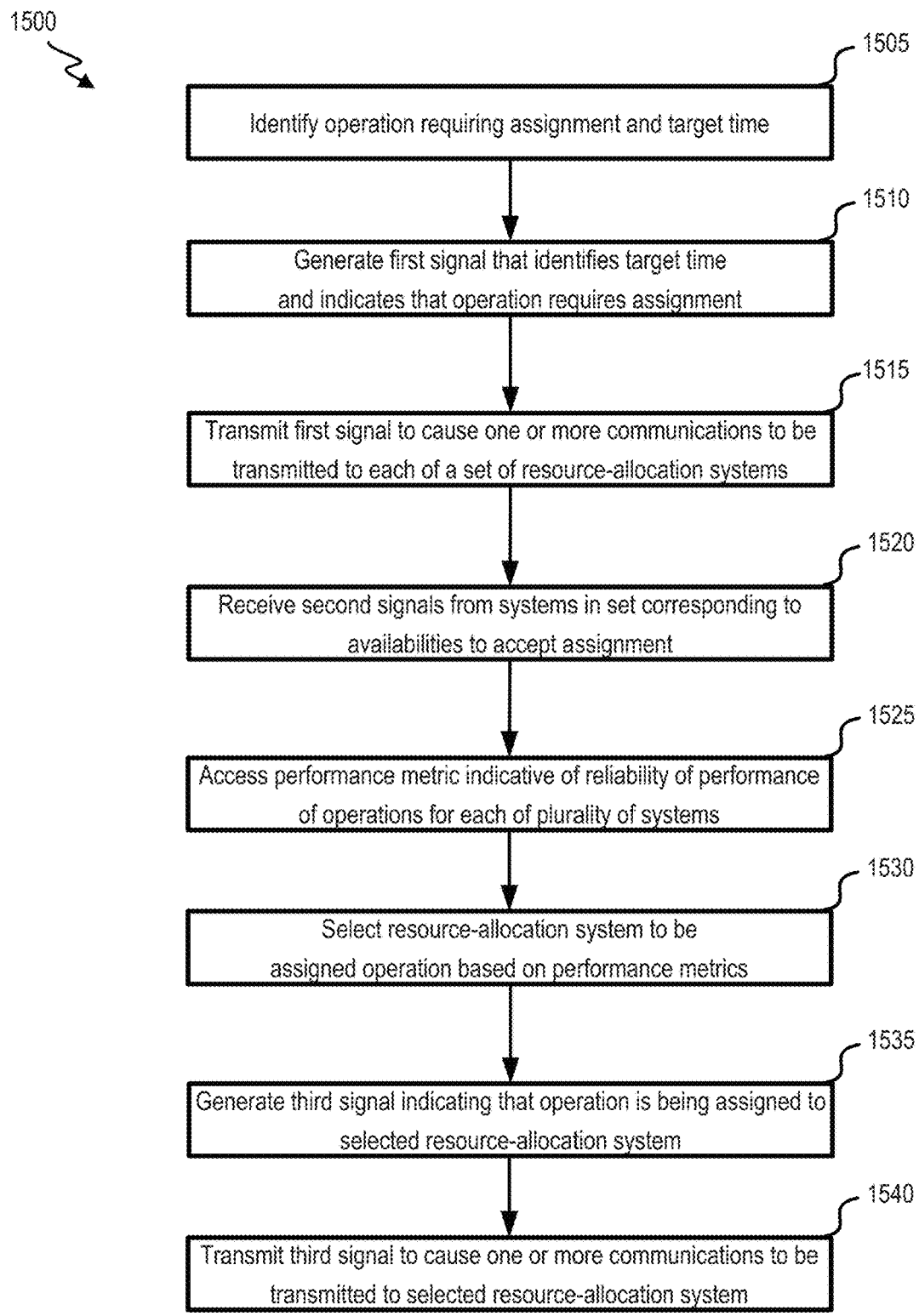
FIG. 15 illustrates a flowchart of a process for assigning operations based at least in part on empirical performance assessments of resource-allocation systems, in accordance with embodiments of the present disclosure.

FIG. 15 illustrates a flowchart of a process 1500 for assigning operations based at least in part on empirical performance assessments of resource-allocation systems, in accordance with certain embodiments of the present disclosure. The process 1500 may begin at block 1505 where an operation requiring assignment to a resource-allocation system 135 may be identified by the load orchestration system 145. Assignment of the operation may result in the assigned resource-allocation system 135 configuring a resource associated with the resource-allocation system 135 to perform the operation. The operation may include, for example, transferring a load between locations, transferring a resource to a load, otherwise making available a resource to a load, applying resource to a load, and/or the like.

A target time for the operation may be identified by the load orchestration system 145 at block 1505. The target time may be based at least in part on a target metric, a characteristic of a load involved in the operation (e.g., stability of a load), a queue of other operations requiring a resource (e.g., also required by the operation or that will be freed upon performance of the operation), etc. In some instances, the target time may be identified via user input and conveyed via an interface of the load orchestration system 145. The target time may include a time at which a defined portion or all of the operation may be to be completed. Thus, in some instances, multiple target times may be identified for an operation.

At block 1510, a first signal corresponding to the operation may be generated by the load orchestration system 145 that identifies the target time and may be indicative that the operation may be requiring assignment. At block 1515, the first signal may be transmitted by the load orchestration system 145 to cause one or more communications to be transmitted to each resource-allocation system 135 of a set of resource-allocation systems 135 via a chat session and/or as a response to a communication for recognition by one of the agents/bots or via requests 134 and corresponding to communications, and the adaptive system 101, in turn, may transmit one or more corresponding communications to each resource-allocation system 135 of the set of resource-allocation systems 135 in accordance with the adaptive directory, formatting, and rerouting features disclosed herein. In some instances, each of the set of resource-allocation systems 135 may be configured to control, schedule, and/or coordinate use of one or more resources. An institution corresponding to the load orchestration system 145 may have an established working relationship with an entity associated with each of the set of resource-allocation systems 135 that supports a coordinated approach for specification of resources to meet priorities of the allocator.

In some instances, the load orchestration system 145 may maintain and/or have access to a data store (e.g., 134 and/or 138) that indicates, for each of a group of resource-allocation systems 135, identifying information (e.g., a name of a corresponding entity), communication-protocol information (e.g., a mode of communication or contact identifier), an identification of each type of resource coordinated by the resource-allocation system 135, a quantity of available resources (e.g., generally or of a type), a resource constraint (e.g., geographic limits as to where a resource may be used or time limits as to when a resource may be used) and/or a performance metric. The set of resource-allocation systems 135 may include all of the group of resource-allocation systems 135 or a subset thereof. The subset may be identified based at least in part on, for example, types of resources associated with the systems 135 (e.g., to selectively include systems 135 associated with types of resources appropriate for the operations), performance metrics (e.g., to selectively include systems associated with above-boundary value metrics), and/or constraints.

At block 1520, second signals may be received by the load orchestration system 145 from each of a plurality of resource-allocation systems 135 in the set of resource-allocation systems 135. In some embodiments, the signal may be entered via a chat session and/or as a response to a communication, and be recognized by one of the agents/bots of the adaptive system 101 which, in turn, may transmit one or more corresponding communications to the load orchestration system 145. Each second signal may correspond to an availability to grant an assignment of the operation. Each second signal may indicate that a resource associated with the resource-allocation system 135 may be available, may include an identifier or specification of the available resource, and/or may identify one or more times (e.g., start times, end times and/or time periods) that the resource may be available.

At block 1525, a performance metric may be accessed by the load orchestration system 145 for each resource-allocation system 135 of the plurality of resource-allocation systems 135. The performance metric may be indicative of a reliability of performance of operations previously assigned to the resource-allocation system 135. The performance metric may reflect and/or be based at least in part on a percentage of operations previously assigned to the system that were completed (or with a defined portion being completed) by a target time and/or a difference between performance times and target times. For example, a performance metric may include an index reflecting a weighted average (e.g., highly weighting recent data) of a delay between a target acquisition time and an actual acquisition time. In some instances, a set of performance metrics may be associated with a single resource-allocation system 135. The performance metrics may be analyzed collectively or one or more select performance metrics (e.g., applying to the identified operation) may be accessed.

At block 1530, a resource-allocation system 135 may be selected by the load orchestration system 145 from amongst the plurality of resource-allocation systems 135 to be assigned the operation. The selection may be based at least in part on the accessed performance metrics. For example, the selection may be biased towards systems associated with high metrics. To illustrate, a resource-allocation system 135 associated with a highest performance metric amongst those accessed may be selected or a first resource-allocation system 135 to have responded to the first signal and to be associated with a performance metric above a boundary value may be selected.

At block 1535, a third signal may be generated by the load orchestration system 145 that indicates that the operation is being assigned to the selected resource-allocation system 135. In some instances, the third signal may include additional information about the operation that was not present in the first signal. For example, the third signal may include a name of a load and/or a more particular location. The third signal may further include an identifier for the operation and/or instructions to report statuses of the operation performance.

At block 1540, the third signal may be transmitted by the load orchestration system 145 to cause one or more communications to be transmitted to the selected resource-allocation system 135 via a chat session and/or as a response to a communication for recognition by one of the agents/bots or via requests 134, and the adaptive system 101, in turn, may transmit one or more corresponding communications to the selected resource-allocation system 135. Thus, process 1500 illustrates a technique for using performance metrics to adjust assignments of operations. Resource-allocation systems 135 associated with performance metrics indicative of consistent high-quality performance may be preferentially notified of potential operation assignments and/or assigned operations.

The above methods may be implemented by computer-program products that direct a computer system to control the actions of the above-described methods and components. Each such computer-program product may comprise sets of instructions (codes) embodied on a computer-readable medium that directs the processor of a computer system to cause corresponding actions. The instructions may be configured to run in sequential order, or in parallel (such as under different processing threads), or in a combination thereof. Special-purpose computer systems disclosed herein include a computer-program product(s) stored in tangible computer-readable memory that directs the systems to perform the above-described methods. The systems include one or more processors that communicate with a number of peripheral devices via a bus subsystem. These peripheral devices may include user output device(s), user input device(s), communications interface(s), and a storage subsystem, such as random access memory (RAM) and non-volatile storage drive (e.g., disk drive, optical drive, solid state drive), which are forms of tangible computer-readable memory.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, hydraulic, pneumatic, and/or electric control connections, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs) or programmable logic controllers (PLCs), field programmable gate arrays (FPGAs), image processors, controllers, micro-controllers, microprocessors, other electronic units designed to perform the functions described above, and/or a combination thereof.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the terms "storage medium," "storage media," "computer-readable medium," "computer-readable media," "processor-readable medium," "processor-readable media," and variations of the term may represent one or more devices for storing data, including read only memory (ROM), random access memory (RAM), magnetic RAM, core memory, magnetic disk storage mediums, optical storage mediums, flash memory devices and/or other machine readable mediums for storing information. The terms, computer-readable media, processor-readable media, and variations of the term, include, but are not limited to portable or fixed storage devices, optical storage devices, wireless channels and various other mediums capable of storing, containing or carrying instruction(s) and/or data.

Certain elements of the system 105-1 may be in direct contact with each other and experience relative motion between their contacting (immediately adjacent) faces. In these instances, it may be sufficient to allow steel-on-steel contact and not experience overly destructive wear characteristics over time with normal use, depending on the quality of the base material of each component. Alternatively, in certain instances where relative motion occurs between faces of two or more components, it may be necessary to incorporate additional media between the components in order to absorb any wear from normal use into the replaceable wear component rather than the steel components. For example, a wear pad mounted between the faces of two sliding components to aid in reducing the friction between the two components as they move past one another and to minimize the amount of actual physical wear on the primary components. The wear pad would be the replaceable component meant to be discarded when physical wear reaches a certain limit.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

While the principles of the disclosure have been described above in connection with specific apparatuses and methods, it is to be clearly understood that this description is made only by way of example and not as limitation on the scope of the disclosure. Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Furthermore, while the figures depicting mechanical parts of the embodiments are drawn to scale, it is to be clearly understood as only by way of example and not as limiting the scope of the disclosure.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

While the principles of the disclosure have been described above in connection with specific apparatuses and methods, it is to be clearly understood that this description is made only by way of example and not as limitation on the scope of the disclosure.

What is claimed:

1. A server system to process data transmissions from a plurality of client devices to create composites for transmission to destination addresses, the server system comprising:
one or more network interfaces;
memory configured to store computer-executable instructions; and
one or more processing devices in communication with the one or more network interfaces and the memory, the one or more processing devices configured to execute the computer-executable instructions to perform operations comprising:
receiving a first set of one or more communications via a medical provider network from a first set of one or more devices, the first set of one or more communications comprising medical-related data and a digital identifier corresponding to a destination specification, wherein the first set of one or more devices corresponds to one or more client devices communicatively couplable to the server system via the medical provider network; and
for each communication of the first set of one or more communications:
processing the communication to identify the digital identifier;
processing the communication to identify the destination specification based at least in part on the digital identifier;
selecting and caching a data portion from the communication;
identifying a second format corresponding to a second communication medium as a function of a current time and a current day, and based at least in part on temporally keyed pattern data of operations during different days mapped to an entity, where:
the second format is different from a first format of the communication, and
the temporally keyed pattern data of the operations during different days mapped to the entity are based at least in part on a set of the operations determined to be responsive to previous communications directed to the entity and correlated to times of day, where the temporally keyed pattern data is used identify best modes of communications for the entity at particular times during particular days based at least in part on response rates after the entity received the previous communications at different times of day;
creating a composite according to the second format identified as corresponding to the second communication medium, and where the composite comprises the selected data portion and the destination specification; and
causing transmission of the composite formatted according to the second format toward an endpoint device in accordance with the destination specification, where the destination specification corresponds to the endpoint device.

2. The server system to process data transmissions from a plurality of client devices to create composites for transmission to destination addresses as recited in claim 1, where the first format of the communication corresponds to a first communication medium via which the communication was received.

3. The server system to process data transmissions from a plurality of client devices to create composites for transmission to destination addresses as recited in claim 2, where the first communication medium is different from the second communication medium, and the second communication medium is selected based at least in part on a determination of whether the communication comprises protected health information.

4. The server system to process data transmissions from a plurality of client devices to create composites for transmission to destination addresses as recited in claim 3, the operations further comprising:

monitoring at least one of the one or more network interfaces to detect one or more transmissions via one or both of the second communication medium and the destination specification, the one or more transmissions indicative of endpoint device operations mapped to the destination specification.

5. The server system to process data transmissions from a plurality of client devices to create composites for transmission to destination addresses as recited in claim 4, the operations further comprising:

based at least in part on the monitoring:
mapping detected endpoint device operations to the destination specification;
developing a set of observation data of the detected endpoint device operations mapped to the destination specification; and
learning attributes for the destination specification based at least in part on the developed set of observation data of the detected endpoint device operations mapped to the destination specification.

6. The server system to process data transmissions from a plurality of client devices to create composites for transmission to destination addresses as recited in claim 5, the operations further comprising:

receiving a second set of one or more communications via the medical provider network from the first set of one or more devices and/or a second set of one or more devices, the second set of one or more communications comprising one or both of the digital identifier and a different digital identifier; and
for each communication of the second set of one or more communications:
processing the communication to identify one or both of the digital identifier and the different digital identifier;
processing the communication to identify at least part of a respective set of observation data from amongst a plurality of sets of observation data based at least in part on the digital identifier and/or the different digital identifier, wherein each respective set of observation data is mapped to a unique set of destination specifications;
creating an additional composite according to a third format identified as corresponding to a third communication medium, where the third format is different from the first format and the second format, and where the additional composite comprises another extracted data portion and a third destination specification; and
causing transmission of the additional composite formatted according to the third format toward the endpoint device in accordance with the third destination specification.

7. The server system to process data transmissions from a plurality of client devices to create composites for transmission to destination addresses as recited in claim 6, the operations further comprising:

for each communication of the second set of one or more communications:
accessing a set of one or more identification rules specified by a stored protocol specification, the set of one or more identification rules comprising criteria for selecting a particular communication medium from a plurality of different communication media and for selecting a particular destination specification from a plurality of destination specifications; and
selecting the third communication medium and the third destination specification based at least in part on the respective set of observation data, the set of one or more identification rules, and the criteria;
where the creating the additional composite according to the third format identified as corresponding to the third communication medium is based at least in part on the selecting.

8. A method for processing data transmissions from a plurality of client devices to create composites for transmission to destination addresses, the method comprising:

receiving by a server system a first set of one or more communications via a medical provider network from a first set of one or more devices, the first set of one or more communications comprising medical-related data and a digital identifier corresponding to a destination specification, wherein the first set of one or more devices corresponds to one or more client devices communicatively couplable to the server system via the medical provider network; and
for each communication of the first set of one or more communications:
processing the communication to identify the digital identifier;
processing the communication to identify the destination specification based at least in part on the digital identifier;
selecting and caching a data portion from the communication;
identifying a second format corresponding to a second communication medium as a function of a current time and a current day, and based at least in part on temporally keyed pattern data of operations during different days mapped to an entity, where:
the second format is different from a first format of the communication, and
the temporally keyed pattern data of the operations during different days mapped to the entity are based at least in part on a set of the operations determined to be responsive to previous communications directed to the entity and correlated to times of day, where the temporally keyed pattern data is used identify best modes of communications for the entity at particular times during particular days based at least in part on response rates after the entity received the previous communications at different times of day;
creating a composite according to the second format identified as corresponding to the second communication medium, and where the composite comprises the selected data portion and the destination specification; and
causing transmission of the composite formatted according to the second format toward an endpoint device in accordance with the destination specification, where the destination specification corresponds to the endpoint device.

9. The method for processing data transmissions from a plurality of client devices to create composites for transmission to destination addresses as recited in claim 8, where the first format of the communication corresponds to a first communication medium via which the communication was received, and the composite is created based at least in part on a determination of whether the communication comprises protected health information.

10. The method for processing data transmissions from a plurality of client devices to create composites for transmission to destination addresses as recited in claim 9, where the first communication medium is different from the second communication medium.

11. The method for processing data transmissions from a plurality of client devices to create composites for transmission to destination addresses as recited in claim 10, the method further comprising:
monitoring a network interface to detect one or more transmissions via one or both of the second communication medium and the destination specification, the one or more transmissions indicative of endpoint device operations mapped to the destination specification.

12. The method for processing data transmissions from a plurality of client devices to create composites for transmission to destination addresses as recited in claim 11, the method further comprising:
based at least in part on the monitoring:
mapping detected endpoint device operations to the destination specification;
developing a set of observation data of the detected endpoint device operations mapped to the destination specification; and
learning attributes for the destination specification based at least in part on the developed set of observation data of the detected endpoint device operations mapped to the destination specification.

13. The method for processing data transmissions from a plurality of client devices to create composites for transmission to destination addresses as recited in claim 12, the method further comprising:
receiving a second set of one or more communications via the medical provider network from the first set of one or more devices and/or a second set of one or more devices, the second set of one or more communications comprising one or both of the digital identifier and a different digital identifier; and
for each communication of the second set of one or more communications:
processing the communication to identify one or both of the digital identifier and the different digital identifier;
processing the communication to identify at least part of a respective set of observation data from amongst a plurality of sets of observation data based at least in part on the digital identifier and/or the different digital identifier, wherein each respective set of observation data is mapped to a unique set of destination specifications;
creating an additional composite according to a third format identified as corresponding to a third communication medium, where the third format is different from the first format and the second format, and where the additional composite comprises another extracted data portion and a third destination specification; and
causing transmission of the additional composite formatted according to the third format toward the endpoint device in accordance with the third destination specification.

14. The method for processing data transmissions from a plurality of client devices to create composites for transmission to destination addresses as recited in claim 13, the method further comprising:
for each communication of the second set of one or more communications:
accessing a set of one or more identification rules specified by a stored protocol specification, the set of one or more identification rules comprising criteria for selecting a particular communication medium from a plurality of different communication media and for selecting a particular destination specification from a plurality of destination specifications; and
selecting the third communication medium and the third destination specification based at least in part on the respective set of observation data, the set of one or more identification rules, and the criteria;
where the creating the additional composite according to the third format identified as corresponding to the third communication medium is based at least in part on the selecting.

15. One or more non-transitory, machine-readable storage devices for storing machine-executable instructions that, when executed by one or more processing devices, cause the one or more processing devices to perform operations comprising:
receiving a first set of one or more communications via a medical provider network from a first set of one or more devices, the first set of one or more communications comprising medical-related data and a digital identifier corresponding to a destination specification, wherein the first set of one or more devices corresponds to one or more client devices communicatively couplable to the one or more processing devices via the medical provider network; and
for each communication of the first set of one or more communications:
processing the communication to identify the digital identifier;
processing the communication to identify the destination specification based at least in part on the digital identifier;
selecting and caching a data portion from the communication;
identifying a second format corresponding to a second communication medium as a function of a current time and a current day, and based at least in part on temporally keyed pattern data of operations during different days mapped to an entity, where:
the second format is different from a first format of the communication, and
the temporally keyed pattern data of the operations during different days mapped to the entity are based at least in part on a set of the operations determined to be responsive to previous communications directed to the entity and correlated to times of day, where the temporally keyed pattern data is used identify best modes of communications for the entity at particular times during particular days based at least in part on response rates after the entity received the previous communications at different times of day;

creating a composite according to the second format identified as corresponding to the second communication medium, and where the composite comprises the selected data portion and the destination specification; and causing transmission of the composite formatted according to the second format toward an endpoint device in accordance with the destination specification, where the destination specification corresponds to the endpoint device.

16. The one or more non-transitory, machine-readable storage devices as recited in claim 15, where the first format of the communication corresponds to a first communication medium via which the communication was received.

17. The one or more non-transitory, machine-readable storage devices as recited in claim 16, where the first communication medium is different from the second communication medium, and the operations further comprise:

determining whether the communication comprises protected health information; and selecting the second communication medium based at least in part on the determination of whether the communication comprises protected health information.

18. The one or more non-transitory, machine-readable storage devices as recited in claim 17, the operations further comprising:

monitoring a network interface to detect one or more transmissions via one or both of the second communication medium and the destination specification, the one or more transmissions indicative of endpoint device operations mapped to the destination specification.

19. The one or more non-transitory, machine-readable storage devices as recited in claim 18, the operations further comprising:

based at least in part on the monitoring:

mapping detected endpoint device operations to the destination specification;

developing a set of observation data of the detected endpoint device operations mapped to the destination specification; and learning attributes for the destination specification based at least in part on the developed set of observation data of the detected endpoint device operations mapped to the destination specification.

20. The one or more non-transitory, machine-readable storage devices as recited in claim 19, the operations further comprising:

receiving a second set of one or more communications via the medical provider network from the first set of one or more devices and/or a second set of one or more devices, the second set of one or more communications comprising one or both of the digital identifier and a different digital identifier; and for each communication of the second set of one or more communications:

processing the communication to identify one or both of the digital identifier and the different digital identifier;

processing the communication to identify at least part of a respective set of observation data from amongst a plurality of sets of observation data based at least in part on the digital identifier and/or the different digital identifier, wherein each respective set of observation data is mapped to a unique set of destination specifications;

creating an additional composite according to a third format identified as corresponding to a third communication medium, where the third format is different from the first format and the second format, and where the additional composite comprises another extracted data portion and a third destination specification; and causing transmission of the additional composite formatted according to the third format toward the endpoint device in accordance with the third destination specification.

* * * * *